(12) United States Patent
Chen et al.

(10) Patent No.: US 12,028,527 B2
(45) Date of Patent: Jul. 2, 2024

(54) VIDEO ENCODER, VIDEO DECODER, AND CORRESPONDING METHOD

(71) Applicant: Huawei Technologies Co., Ltd., Shenzhen (CN)

(72) Inventors: Xu Chen, Shenzhen (CN); Haitao Yang, Shenzhen (CN); Lian Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 82 days.

(21) Appl. No.: 17/561,070

(22) Filed: Dec. 23, 2021

(65) Prior Publication Data

US 2022/0116619 A1    Apr. 14, 2022

Related U.S. Application Data

(63) Continuation of application No. PCT/CN2020/098053, filed on Jun. 24, 2020.

(30) Foreign Application Priority Data

Jun. 24, 2019  (CN) .......................... 201910559986.9
Jun. 29, 2019  (CN) .......................... 201910584158.0

(51) Int. Cl.
*H04N 19/132*    (2014.01)
*H04N 19/105*    (2014.01)
(Continued)

(52) U.S. Cl.
CPC ......... *H04N 19/132* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS

2013/0202037 A1    8/2013  Wang et al.
2017/0332099 A1   11/2017  Lee et al.
(Continued)

FOREIGN PATENT DOCUMENTS

CN    102215407 A    10/2011
CN    103916673 A     7/2014
(Continued)

OTHER PUBLICATIONS

JVET-N0146-v1, Takeshi Chujoh, et al, "Non-CE9: on conditions for DMVR and BDOF," Joint Video Experts Team (JVET) of ITU-T SG 16 WP 3 and ISO/IEC JTC 1/SC 29/WG 11, 14th Meeting: Geneva, CH, Mar. 19-27, 2019, 5 pages.
(Continued)

*Primary Examiner* — Xiaolan Xu
(74) *Attorney, Agent, or Firm* — Conley Rose, P.C.

(57) ABSTRACT

A video encoder, a video decoder, and a corresponding method, where the method includes, when a plurality of preset conditions are satisfied, performing bi-directional optical flow (BDOF) processing on a current picture block to obtain a predicted sample value of the current picture block, where the plurality of preset conditions include at least a condition that a height (H) of the current picture block is greater than or equal to 8, a width (W) of the current picture block is greater than or equal to 8, and a product of W and H is greater than 128. Thus encoding/decoding complexity and prediction accuracy can be balanced to some extent.

19 Claims, 13 Drawing Sheets

(51) Int. Cl.
  *H04N 19/159* (2014.01)
  *H04N 19/176* (2014.01)
  *H04N 19/46* (2014.01)
  *H04N 19/70* (2014.01)
(52) U.S. Cl.
  CPC ......... *H04N 19/176* (2014.11); *H04N 19/46* (2014.11); *H04N 19/70* (2014.11)

(56) References Cited

U.S. PATENT DOCUMENTS

| | | |
|---|---|---|
| 2018/0241998 A1 | 8/2018 | Chen et al. |
| 2018/0249172 A1 | 8/2018 | Chen et al. |
| 2018/0262773 A1 | 9/2018 | Chuang et al. |
| 2018/0309990 A1 | 10/2018 | Alshina et al. |
| 2019/0045214 A1 | 2/2019 | Ikai et al. |
| 2019/0045215 A1 | 2/2019 | Chen et al. |
| 2019/0238880 A1 | 8/2019 | Lee |
| 2020/0314444 A1 | 10/2020 | Lee et al. |
| 2021/0084325 A1* | 3/2021 | Lim ............ H04N 19/105 |
| 2021/0227245 A1 | 7/2021 | Liu et al. |
| 2022/0030266 A1 | 1/2022 | Park et al. |
| 2022/0191540 A1 | 6/2022 | Lim et al. |
| 2022/0224911 A1 | 7/2022 | Park et al. |

FOREIGN PATENT DOCUMENTS

| | | |
|---|---|---|
| CN | 107925775 A | 4/2018 |
| CN | 108781294 A | 11/2018 |
| CN | 111083491 A | 4/2020 |
| EP | 3471417 A1 | 4/2019 |
| JP | 2021518996 A | 8/2021 |
| JP | 2022521542 A | 4/2022 |
| KR | 20190024553 A | 3/2019 |
| RU | 2620723 C2 | 5/2017 |
| TW | 201842766 A | 12/2018 |
| WO | 2017134957 A1 | 8/2017 |
| WO | 2018048265 A1 | 3/2018 |
| WO | 2018060052 A1 | 4/2018 |
| WO | 2018113658 A1 | 6/2018 |
| WO | 2019010156 A1 | 1/2019 |
| WO | 2019031417 A1 | 2/2019 |
| WO | 2019045427 A1 | 3/2019 |
| WO | 2019117640 A1 | 6/2019 |

OTHER PUBLICATIONS

JVET-O0634, Xu Chen et al, "BDOF simplifications," Joint Video Experts Team (JVET) of ITU-T SG 16 WP 3 and ISO/IEC JTC 1/SC 29/WG 11, 15th Meeting: Gothenburg, SE, Jul. 3-12, 2019, 6 pages.

ITU-T H.265, Feb. 2018, "Series H: Audiovisual and Multimedia Systems Infrastructure of audiovisual services-Coding of moving video, High efficiency video coding," 692 pages.

ITU-T H.264, Apr. 2017, "Series H: Audiovisual and Multimedia Systems, Infrastructure of audiovisual services-Coding of moving video, Advanced video coding for generic audiovisual services," 812 pages.

ITU-T H.263, Jan. 2005, "Series H: Audiovisual and Multimedia Systems, Infrastructure of audiovisual services-Coding of moving video, Video coding for low bit rate communication," 226 pages.

ITU-T H.262, Feb. 2012, "Series H: Audiovisual and Multimedia Systems, Infrastructure of audiovisual services-Coding of moving video Information technology-Generic coding of moving pictures and associated audio Information: Video: Frame packing arrangement signalling for 3D content," 238 pages.

JVET-N1001-v8, Benjamin Bross et al., "Versatile Video Coding (Draft 5)," Joint Video Experts Team (JVET) of ITU-T SG 16 WP 3 and 1S0/IEC JTC 1/SC 29/WG 11, 14th Meeting: Geneva, CH, Mar. 19-27, 2019, 397 pages, XP030212626.

Bross, Benjamin et al., Versatile Video Coding (Draft 6), JVET-O2001 (version 6), ITU, Jul. 15, 2019, pp. 1, 234-238, [online], [retrieved on Apr. 27, 2023], Retrieved from the Internet: URL: https://jvet-experts.org/doc_end_user/documents/15_Gothenburg/wg11/JVET-O2001-v6.zip>, JVET-O2001-v6.docx (incl. revision history), 9 pages.

* cited by examiner

VIDEO ENCODER, VIDEO DECODER, AND CORRESPONDING METHOD

CROSS-REFERENCE TO RELATED APPLICATIONS

This is a continuation of International Patent Application No. PCT/CN2020/098053 filed on Jun. 24, 2020, which claims priority to Chinese Patent Application No. 201910559986.9 filed on Jun. 24, 2019 and Chinese Patent Application No. 201910584158.0 filed on Jun. 29, 2019. All of the aforementioned patent applications are hereby incorporated by reference in their entireties.

TECHNICAL FIELD

This application relates to the field of video coding technologies, and in particular, to a video encoder, a video decoder, and a corresponding method.

BACKGROUND

Digital video capabilities can be incorporated into a wide variety of apparatuses, including digital televisions, digital live broadcast systems, wireless broadcast systems, personal digital assistants (PDAs), laptop or desktop computers, tablet computers, e-book readers, digital cameras, digital recording apparatuses, digital media players, video game apparatuses, video game consoles, cellular or satellite radio phones (or smartphones), video conferencing apparatuses, video streaming apparatuses, and the like. Digital video apparatuses implement video compression technologies, for example, video compression technologies described in standards defined by Moving Picture Experts Group (MPEG)-2, MPEG-4, International Telecommunication Union (ITU) Telecommunication Standardization Sector (ITU-T) H.263, and ITU-T H.264/MPEG-4 Part 10: Advanced Video Coding (AVC), the video coding standard H.265/High Efficiency Video Coding (HEVC) standard, and extensions of such standards. The video apparatuses can transmit, receive, encode, decode, and/or store digital video information more efficiently by implementing such video compression technologies.

The video compression technologies are used to perform spatial (intra-picture) prediction and/or temporal (inter-picture) prediction to reduce or remove inherent redundancy in video sequences. In block-based video coding, a video slice (that is, a video frame or a part of a video frame) may be partitioned into picture blocks, and the picture block may also be referred to as a tree block, a coding unit (CU), and/or a coding node. A picture block in a to-be-intra-coded (I) slice of a picture is coded through spatial prediction based on a reference sample in a neighboring block in the same picture. For a picture block in a to-be-inter-coded (P or B) slice of a picture, spatial prediction based on a reference sample in a neighboring block in the same picture or temporal prediction based on a reference sample in another reference picture may be used. The picture may be referred to as a frame, and the reference picture may be referred to as a reference frame.

Various video coding standards including the HEVC standard propose a predictive coding mode used for a picture block. To be specific, a current to-be-coded block is predicted based on a coded video data block. In an intra prediction mode, a current block is predicted based on one or more previously decoded neighboring blocks in a same picture as the current block. In an inter prediction mode, a current block is predicted based on a decoded block in a different picture.

Prediction includes forward prediction, backward prediction, bi-directional prediction, and the like. For bi-directional prediction, a forward prediction block (for example, corresponding to a predicted sample value in a first list) and a backward prediction block (for example, corresponding to a predicted sample value in a second list) need to be respectively obtained based on motion information in a motion compensation process of forward prediction and a motion compensation process of backward prediction, and then a prediction block of a current block is determined based on the forward prediction block and the backward prediction block. How to reduce coding complexity while improving prediction accuracy of a prediction block of a current block is a technical problem being studied by a person skilled in the art.

SUMMARY

Embodiments of the present disclosure disclose a video encoder, a video decoder, and a corresponding method, to balance encoding/decoding complexity and prediction accuracy to some extent.

According to a first aspect, an embodiment of this application provides a video encoding method, and the method includes, when a plurality of preset conditions are satisfied, performing bi-directional optical flow (BDOF) processing on a current picture block, to obtain a predicted sample value of the current picture block, where the plurality of preset conditions include at least a condition that a size of the current picture block satisfies a first preset size. The size of the current picture block is usually represented by a width and a height (briefly written as W×H), and the width and the height are measured by sample (sample or pixel). For example, if the size of the current picture block is 8×8, the first 8 indicates that the width of the current picture block is 8 samples, and the second 8 indicates that the height of the current picture block is 8 samples. For another example, if the size of the current picture block is 8×16, 8 indicates that the width of the current picture block is 8 samples, and 16 indicates that the height of the current picture block is 16 samples.

That a size of the current picture block satisfies a first preset size includes (or is): the height H of the current picture block is greater than or equal to 8, and when a product of the width W and the height H of the current picture block is equal to 64, the width W is not equal to the height H.

Alternatively, that a size of the current picture block satisfies a first preset size includes (or is): the height H of the current picture block is greater than or equal to 8, and the width W of the current picture block is greater than or equal to 8.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes: the height H of the current picture block is greater than 8.

Alternatively, that a size of the current picture block satisfies a first preset size includes: the height H of the current picture block is greater than 8, and the width W of the current picture block is greater than or equal to 8.

The method further includes reconstructing the current picture block based on at least the predicted sample value of the current picture block, and encoding a syntax element into a to-be-transmitted bitstream, where the syntax element is at least used to indicate that bi-directional prediction is applied.

It should be understood that, in a process of performing BDOF on the current picture block, prediction is performed by subblock. To be specific, performing BDOF processing on a current picture block may include performing BDOF processing on a current subblock of the current picture block, to obtain a predicted sample value of the current subblock of the current picture block. The predicted sample value of the current picture block includes predicted sample values of one or more subblocks, and the one or more subblocks include the current subblock. If the current picture block includes only one subblock, a size of the subblock may be equal to that of the current picture block.

It should be noted that before whether to determine (or obtain through prediction) the predicted sample value of the current picture block according to the BDOF technology is determined, there may be another reference condition in addition to the size of the current picture block. The another reference condition is not limited herein. For ease of understanding, the following uses examples for description.

Condition A: There is a high-level syntax identifier sps_b-dof_enabled_flag indicating that the BDOF technology is allowed to be used for a current video sequence.

Condition B: Prediction direction indication information predFlagL0 corresponding to a first list (list1) is equal to 1, and prediction direction indication information predFlagL1 corresponding to a second list (list0) is equal to 1.

Condition C: A picture order count POC_L0 of a reference frame corresponding to a first list (list0), a picture order count POC_L1 of a reference frame corresponding to a second list (list1), and a picture order count POC_Cur of a picture in which the current picture block is located satisfy the following relationship: (POC_L0−POC_Cur)×(POC_L1−POC_Cur)<0. In other words, the picture including the current picture block is between two reference pictures.

Condition D: MotionModelIdc[xCb][yCb] is equal to 0. MotionModelIdc is a motion model index for motion compensation. The MotionModelIdc[xCb][yCb] equal to 0 indicates that a motion model for motion compensation of the current block is translational motion.

Condition E: merge_subblock_flag[x0][y0] is equal to 0, where merge_subblock_flag[x0][y0] equal to 0 indicates that a subblock merge mode is not applied for the current picture block.

Condition F: sym_mvd_flag[x0][y0] is equal to 0. sym_mvd_flag[x0][y0] equal to 0 indicates that mvd_coding (x0, y0, refList, cpIdx) syntax structure is present for the current block.

Condition G: bcwIdx[xCb][yCb] is equal to 0. bcwIdx indicates a bi-directional prediction weight index for the current picture block.

Condition H: cIdx is equal to 0. cIdx represents a colour component index of the current picture block.

Condition I: The size of the current picture block is the first preset size.

Condition J: Both luma_weight_l0_flag[refIdxL0] and luma_weight_l1_flag[refIdxL1] are equal to 0, where luma_weight_l0_flag equal to 0 indicates that weighting factors for a luma component of list0 prediction are not present, and luma_weight_l1_flag equal to 0 indicates that weighting factors for a luma component of list1 prediction are not present.

For example, when all of the conditions A to J are satisfied, it is determined that the BDOF technology may be used to predict the predicted sample value of the current picture block. For example, bdofFlag is set to true. It should be noted that the foregoing conditions are merely examples, and another condition may be further added, or one or more of the foregoing conditions may be replaced, or one or more of the foregoing conditions may be removed.

It should be understood that the current picture block (or a current block) herein may be understood as a picture block that is being processed. For example, in an encoding process, the current picture block is a picture block that is being encoded (an encoding block).

In this embodiment of this application, a condition determining action may be further included. For example, whether the plurality of preset conditions is satisfied is determined.

It may be understood that another case may be further obtained with reference to the foregoing cases, and the another case also falls within the protection scope of this application.

It should be understood that the method in this embodiment of this application may be performed by a video encoder or an electronic device having a video encoding function.

To be specific, a condition for enabling or using the BDOF technology in this solution is different from a condition for enabling or using the BDOF technology in the other approaches, and in particular, requirements for the size of the current picture block are different. The BDOF technology is used for the current picture block having the first preset size, so that a predicted sample value closer to an original sample value can be obtained, and coding complexity can be properly controlled. This balances encoding/decoding complexity and prediction accuracy to some extent, thereby improving coding efficiency.

In an optional solution, the syntax element includes an index (for example, merge_idx[xCb][yCb]) of target candidate motion information, the target candidate motion information includes target candidate motion vectors, reference frame indices, and prediction direction indication information (for example, predFlagL0=1 and predFlagL1=1), the prediction direction indication information is used to indicate that bi-directional prediction is applied, the target candidate motion vectors include a first motion vector corresponding to a first list (that is, list0) and a second motion vector corresponding to a second list (that is, list1), and the reference frame indices include an index (for example, refIdxL0) of a first reference frame corresponding to the first list and an index (for example, refIdxL1) of a second reference frame corresponding to the second list.

In this embodiment of this application, the reference frame index is used to identify a reference picture corresponding to a used motion vector (for example, the first motion vector or the second motion vector) in a specified reference picture list (the first list list0 or the second list list1). The picture may be referred to as a frame, and the reference picture may be referred to as a reference frame.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, the syntax element includes first indices, second indices, prediction direction indication information, and a motion vector difference (MVD), the first indices (for example, mvp_lX_flag[xCb][yCb]) are used to indicate target candidate motion vector predictors, the target candidate motion vector predictors include a first motion vector predictor corresponding to a first list (for example, list0) and a second motion vector predictor corresponding to a second list (for example, list1), and the MVD includes a first MVD corresponding to the first list and/or a second MVD corresponding to the second list (optionally, when a merge with MVD (MMVD) technology is used, only one MVD may be transmitted, and an MVD that is in another direction and that needs to be used by a decoder side may be derived based on the transmitted MVD). The second indices (or reference frame indices) are used to indicate reference frames of the current picture block, and the reference frames include a first reference frame corresponding to the first list and a second reference frame corresponding to the second list. For example, the second indices are refIdxL0 and refIdxL1, refIdxL0 is an index of the first reference frame corresponding to the first list, and refIdxL1 is an index of the second reference frame corresponding to the second list. The prediction direction indication information (for example, predFlagL0=1 and predFlagL1=1) is used to indicate that bi-directional prediction is applied.

A first motion vector (for example, Mv0_L0) corresponding to the first list is obtained based on the first motion vector predictor (for example, Mvp0_L0) corresponding to the first list and the first MVD (for example, MVD0) corresponding to the first list. For example, Mv0_L0=Mvp0_L0+MVD0.

A second motion vector (for example, Mv1_L1) corresponding to the second list is obtained based on the second motion vector predictor (for example, Mvp1_L1) corresponding to the second list and the second MVD (for example, MVD1) corresponding to the second list. For example, Mv1_L1=Mvp1_L1+MVD1.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, the method further includes determining a sample residual based on a sample value of the current picture block and the predicted sample value of the current picture block, and the encoding a syntax element into a to-be-transmitted bitstream includes encoding the syntax element and the sample residual into the to-be-transmitted bitstream. In other words, in addition to the syntax element, the sample residual may be further encoded into the to-be-transmitted bitstream (the sample residual may be obtained through calculation by using a residual calculation unit, and for example, the sample residual is 0 or is not 0). This solution may be applied to an Advanced Motion Vector Prediction (AMVP) mode and a merge mode. In addition, there is also a case in which no sample residual needs to be encoded into a to-be-transmitted bitstream. For example, in a skip mode, no sample residual needs to be encoded into a to-be-transmitted bitstream.

According to a second aspect, an embodiment of this application provides an encoding method, and the method includes, when a size of a current picture block is a second preset size, determining (or obtaining through prediction) a predicted sample value of the current picture block (for example, prediction samples of the current coding unit) in a first processing manner based on a reference sample value corresponding to a first list (that is, list0) and a reference sample value corresponding to a second list (that is, list1), where the first processing manner is not BDOF. In other words, when the size of the current picture block is the second preset size, the BDOF is not allowed to be used to determine the predicted sample value of the current picture block based on the reference sample value corresponding to the first list and the reference sample value corresponding to the second list. The size of the current picture block is usually represented by a width and a height (briefly written as W×H), and the width and the height are measured by sample (sample or pixel). The second preset size includes 8×8 (the first 8 indicates that the width of the current picture block is 8 samples, and the second 8 indicates that the height of the current picture block is 8 samples), 4×N (4 indicates that the width of the current picture block is 4 samples, N indicates that the height of the current picture block is N samples, and other sizes are deduced by analogy), 8×16, or 16×8. N is a power of 2 and is greater than or equal to 8. For example, a value of N may be 16, 32, 64, or the like.

In this embodiment of this application, the reference sample value corresponding to the first list and the reference sample value corresponding to the second list are respectively obtained through prediction based on a first motion vector (for example, Mv0_L0) corresponding to the first list (that is, list0) and a second motion vector (for example, Mv1_L1) corresponding to the second list (that is, list1). For example, the reference sample value corresponding to the first list (that is, list0) can be determined based on the first motion vector (for example, Mv0_L0) corresponding to the first list (that is, list0), and the reference sample value corresponding to the second list (that is, list1) can be determined based on the second motion vector (for example, Mv1_L1) corresponding to the second list (that is, list1).

Then, the method includes reconstructing the current picture block based on at least the predicted sample value of the current picture block. The "at least" herein indicates that the predicted sample value of the current picture block needs to be used to reconstruct the current picture block, and other information may also be used.

Subsequently, the method includes encoding a syntax element into a to-be-transmitted bitstream, where the syntax element is at least used to indicate that bi-directional prediction is applied.

It should be understood that the current picture block (or a current block) herein may be understood as a picture block that is being processed. For example, in an encoding process, the current picture block is a picture block that is being encoded (an encoding block).

Further, the foregoing described case that the second preset size includes 8×8, 4×N, 8×16, or 16×8 may also be limited to: the second preset size is 8×8, 4×N, 8×16, or 16×8. In other words, the BDOF is prohibited from being used for one of the sizes 8×8, 4×N, 8×16, and 16×8 that are listed above, or the BDOF may be prohibited from being used for a plurality of sizes thereof. The following uses examples for description.

Example 1: The second preset size includes (or is) 8×8. In other words, in this embodiment of this application, the BDOF is prohibited from being used for the size 8×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is 8×8, obtaining the predicted sample value of the current picture block through prediction in the first processing manner based on the reference sample value corresponding to the first list and the reference sample value corresponding to the second list.

Example 2: The second preset size includes (or is) 4×N. In other words, in this embodiment of this application, the BDOF is prohibited from being used for the size 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is 4×N, obtaining the predicted sample value of the current picture block through prediction in the first processing manner based on the reference sample value corresponding to the first list and the reference sample value corresponding to the second list, where N is greater than or equal to 8.

Example 3: The second preset size includes (or is) 8×8 or 4×N. In other words, in this embodiment of this application, the BDOF is prohibited from being used for the sizes 8×8 and 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is either of 8×8 and 4×N, obtaining the predicted sample value of the current picture block through prediction in the first processing manner based on the reference sample value corresponding to the first list and the reference sample value corresponding to the second list, where N is greater than or equal to 8.

Example 4: The second preset size includes (or is) 8×8, 4×N, 8×16, or 16×8, where N is greater than or equal to 8. In other words, in this embodiment of this application, the BDOF is prohibited from being used for the sizes 8×8, 4×N, 8×16, and 16×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is any one of 8×8, 4×N, 8×16, and 16×8, obtaining the predicted sample value of the current picture block through prediction in the first processing manner based on the reference sample value corresponding to the first list and the reference sample value corresponding to the second list.

Example 5: The second preset size includes (or is) N×8, where N is greater than or equal to 4. In other words, in this embodiment of this application, the BDOF is prohibited from being used for the size N×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is N×8, obtaining the predicted sample value of the current picture block through prediction in the first processing manner based on the reference sample value corresponding to the first list and the reference sample value corresponding to the second list.

Example 6: The second preset size includes (or is) N×8 or 4×N, where N is greater than or equal to 4. In other words, in this embodiment of this application, the BDOF is prohibited from being used for the size N×8 or 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is N×8 or 4×N, obtaining the predicted sample value of the current picture block through prediction in the first processing manner based on the reference sample value corresponding to the first list and the reference sample value corresponding to the second list. In addition, because the BDOF is also prohibited from being used for a size M×4 in some scenarios, in this application, when the BDOF is prohibited from being used for the second preset size, the BDOF may be further prohibited from being used for the size M×4, where M is an integer greater than or equal to 4.

It may be understood that another case may be further obtained with reference to the foregoing cases, and the another case also falls within the protection scope of this application.

It should be understood that the method in this embodiment of this application may be performed by a video encoder or an electronic device having a video encoding function.

According to the foregoing method, features of current picture blocks of various sizes are fully considered when the BDOF technology is used. When the size of the current picture block is the second preset size, the predicted sample value of the current picture block is determined according to a technology other than the BDOF technology. This significantly reduces coding complexity, and improves coding efficiency.

In an optional solution, determining a predicted sample value of the current picture block in a first processing manner based on a reference sample value corresponding to a first list and a reference sample value corresponding to a second list includes performing weighted calculation on sample values having a same location in the reference sample value corresponding to the first list and the reference sample value corresponding to the second list, to obtain the predicted sample value of the current picture block, or obtaining the predicted sample value of the current picture block through prediction based on the reference sample value corresponding to the first list and the reference sample value corresponding to the second list according to an MMVD technology, or obtaining the predicted sample value of the current picture block through prediction based on the reference sample value corresponding to the first list and the reference sample value corresponding to the second list according to a combined inter/intra prediction (CIIP) technology.

In this embodiment of this application, whether the weighted calculation manner, the MMVD technology, the CIIP technology, or another prediction technology is used may be determined by using a corresponding condition, or may be indicated by using corresponding indication information.

It should be noted that the BDOF technology is equivalent to a patch optimization technology for a conventional technology for predicting a predicted sample value of a current picture block. In many scenarios, a predicted sample value closer to a real sample value of the current picture block can be obtained according to the BDOF technology. Therefore, a sample residual obtained based on the predicted sample value is smaller, so that coding efficiency can be improved. The foregoing weighted calculation manner may be considered as a conventional technology for obtaining a predicted sample value of a current picture block, and the foregoing MMVD technology and CIIP technology each may be considered as a patch optimization technology for a conventional technology. In this embodiment of this application, when the size of the current picture block is the second preset size, the predicted sample value of the current picture block is determined according to a conventional technology (for example, the weighted calculation manner) or another patch optimization technology (for example, MMVD or CIIP) rather than the BDOF technology. This can significantly reduce coding complexity, and improve coding efficiency.

In an optional solution, the method further includes when a plurality of preset conditions is satisfied, performing BDOF processing on a current picture block, to obtain a predicted sample value of the current picture block, where the plurality of preset conditions includes at least a condition that a size of the current picture block satisfies a first preset size.

That a size of the current picture block satisfies a first preset size includes: the height H of the current picture block is greater than or equal to 8, and when a product of the width W and the height H of the current picture block is equal to 64, the width W is not equal to the height H.

Alternatively, that a size of the current picture block satisfies a first preset size includes (or is): the height H of the current picture block is greater than or equal to 8, and the width W of the current picture block is greater than or equal to 8.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes: the height H of the current picture block is greater than 8.

Alternatively, that a size of the current picture block satisfies a first preset size includes: the height H of the current picture block is greater than 8, and the width W of the current picture block is greater than or equal to 8.

The method further includes: reconstructing the current picture block based on at least the predicted sample value of the current picture block.

To be specific, a condition for enabling or using the BDOF technology in this solution is different from a condition for enabling or using the BDOF technology in the other approaches, and in particular, requirements for the size of the current picture block are different. The BDOF technology is used for the current picture block having the first preset size, so that a predicted sample value closer to an original sample value can be obtained, and coding complexity can be properly controlled. This balances encoding/decoding complexity and prediction accuracy to some extent, thereby improving coding efficiency.

It should be noted that before whether to determine (or obtain through prediction) the predicted sample value of the current picture block based on the reference sample value corresponding to the first list and the reference sample value corresponding to the second list according to the BDOF technology is determined, there may be another reference condition in addition to the size of the current picture block. The another reference condition is not limited herein. For ease of understanding, the following uses examples for description.

Condition A: There is a high-level syntax identifier sps_bdof_enabled_flag indicating that the BDOF technology is allowed to be used for a current video sequence.

Condition B: Prediction direction indication information predFlagL0 corresponding to a first list (list1) is equal to 1, and prediction direction indication information predFlagL1 corresponding to a second list (list0) is equal to 1.

Condition C: A picture order count POC_L0 of a reference frame corresponding to a first list (list0), a picture order count POC_L1 of a reference frame corresponding to a second list (list1), and a picture order count POC_Cur of a picture in which the current picture block is located satisfy the following relationship: (POC_L0−POC_Cur)×(POC_L1−POC_Cur)<0. In other words, the picture including the current picture block is between two reference pictures.

Condition D: MotionModelIdc[xCb][yCb] is equal to 0. MotionModelIdc is a motion model index for motion compensation. The MotionModelIdc[xCb][yCb] equal to 0 indicates that a motion model for motion compensation of the current block is translational motion.

Condition E: merge_subblock_flag[x0][y0] is equal to 0, where merge_subblock_flag[x0][y0] equal to 0 indicates that a subblock merge mode is not applied for the current picture block.

Condition F: sym_mvd_flag[x0][y0] is equal to 0. sym_mvd_flag[x0][y0] equal to 0 indicates that mvd_coding (x0, y0, refList, cpIdx) syntax structure is present for the current block.

Condition G: bcwIdx[xCb][yCb] is equal to 0. bcwIdx indicates a bi-directional prediction weight index for the current picture block.

Condition H: cIdx is equal to 0. cIdx represents a colour component index of the current picture block.

Condition I: The size of the current picture block is the first preset size.

Condition J: Both luma_weight_l0_flag[refIdxL0] and luma_weight_l1_flag[refIdxL1] are equal to 0, where luma_weight_l0_flag equal to 0 indicates that weighting factors for a luma component of list0 prediction are not present, and luma_weight_l1_flag equal to 0 indicates that weighting factors for a luma component of list1 prediction are not present.

For example, when all of the conditions A to J are satisfied, it is determined that the BDOF technology may be used to predict the predicted sample value of the current picture block. For example, bdofFlag is set to true. It should be noted that the foregoing conditions are merely examples, and another condition may be further added, or one or more of the foregoing conditions may be replaced, or one or more of the foregoing conditions may be removed.

In an optional solution, the syntax element includes an index (for example, merge_idx[xCb][yCb]) of target candidate motion information, the target candidate motion information includes target candidate motion vectors, reference frame indices, and prediction direction indication information (for example, predFlagL0=1 and predFlagL1=1), the prediction direction indication information is used to indicate that bi-directional prediction is applied, the target candidate motion vectors include the first motion vector corresponding to the first list (that is, list0) and the second motion vector corresponding to the second list (that is, list1), and the reference frame indices include an index (for example, refIdxL0) of a first reference frame corresponding to the first list and an index (for example, refIdxL1) of a second reference frame corresponding to the second list.

In this embodiment of this application, the reference frame index is used to identify a reference picture corresponding to a used motion vector (for example, the first motion vector or the second motion vector) in a specified reference picture list (the first list list0 or the second list list1). The picture may be referred to as a frame, and the reference picture may be referred to as a reference frame.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, the syntax element includes first indices, second indices, prediction direction indication information, and an MVD, the first indices (for example, mvp_lX_flag[xCb][yCb]) are used to indicate target candidate motion vector predictors, the target candidate motion vector predictors include a first motion vector predictor corresponding to the first list (for example, list0) and a second motion vector predictor corresponding to the second list (for example, list1), and the MVD includes a first MVD corresponding to the first list and/or a second MVD corresponding to the second list (optionally, when the MMVD technology is used, only one MVD may be transmitted, and an MVD that is in another direction and that needs to be used by a decoder side may be derived based on the transmitted MVD). The second indices (or reference frame indices) are used to indicate reference frames of the current picture block, and the reference frames include a first reference frame corresponding to the first list and a second reference frame corresponding to the second list. For example, the second indices are refIdxL0 and refIdxL1, refIdxL0 is an index of the first reference frame corresponding to the first list, and refIdxL1 is an index of the second reference frame corresponding to the second list. The prediction direction indication information (for example, predFlagL0=1 and predFlagL1=1) is used to indicate that bi-directional prediction is applied.

The first motion vector (for example, Mv0_L0) corresponding to the first list is obtained based on the first motion vector predictor (for example, Mvp0_L0) corresponding to the first list and the first MVD (for example, MVD0) corresponding to the first list. For example, Mv0_L0=Mvp0_L0+MVD0.

The second motion vector (for example, Mv1_L1) corresponding to the second list is obtained based on the second motion vector predictor (for example, Mvp1_L1) corresponding to the second list and the second MVD (for example, MVD1) corresponding to the second list. For example, Mv1_L1=Mvp1_L1+MVD1.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, the method may further include determining a sample residual based on a sample value of the current picture block and the predicted sample value of the current picture block, and encoding a syntax element into a to-be-transmitted bitstream includes encoding the syntax element and the sample residual into the to-be-transmitted bitstream.

According to a third aspect, an embodiment of this application provides a decoding method, and the method includes parsing a bitstream to obtain a syntax element, where the syntax element is at least used to indicate that bi-directional prediction is applied, and when a plurality of preset conditions are satisfied, performing BDOF processing on a current picture block, to obtain a predicted sample value of the current picture block, where the plurality of preset conditions include at least a condition that a size of the current picture block satisfies a first preset size. The size of the current picture block is usually represented by a width and a height (briefly written as W×H), and the width and the height are measured by sample (sample or pixel). For example, if the size of the current picture block is 8×8, the first 8 indicates that the width of the current picture block is 8 samples, and the second 8 indicates that the height of the current picture block is 8 samples. For another example, if the size of the current picture block is 8×16, 8 indicates that the width of the current picture block is 8 samples, and 16 indicates that the height of the current picture block is 16 samples.

That a size of the current picture block satisfies a first preset size includes (or is): the height H of the current picture block is greater than or equal to 8, and when a product of the width W and the height H of the current picture block is equal to 64, the width W is not equal to the height H.

Alternatively, that a size of the current picture block satisfies a first preset size includes (or is): the height H of the current picture block is greater than or equal to 8, and the width W of the current picture block is greater than or equal to 8.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes: the height H of the current picture block is greater than 8.

Alternatively, that a size of the current picture block satisfies a first preset size includes: the height H of the current picture block is greater than 8, and the width W of the current picture block is greater than or equal to 8.

The method further includes determining a sample value of the current picture block based on at least the predicted sample value of the current picture block, where the predicted sample value of the current picture block includes predicted sample values of one or more subblocks.

It should be noted that before whether to determine (or obtain through prediction) the predicted sample value of the current picture block based on a reference sample value corresponding to a first list and a reference sample value corresponding to a second list according to the BDOF technology is determined, there may be another reference condition in addition to the size of the current picture block. The another reference condition is not limited herein. For ease of understanding, the following uses examples for description.

Condition A: There is a high-level syntax identifier sps_bdof_enabled_flag indicating that the BDOF technology is allowed to be used for a current video sequence.

Condition B: Prediction direction indication information predFlagL0 corresponding to a first list (list1) is equal to 1, and prediction direction indication information predFlagL1 corresponding to a second list (list0) is equal to 1.

Condition C: A picture order count POC_L0 of a reference frame corresponding to a first list (list0), a picture order count POC_L1 of a reference frame corresponding to a second list (list1), and a picture order count POC_Cur of a picture in which the current picture block is located satisfy the following relationship: (POC_L0−POC_Cur)× (POC_L1−POC_Cur)<0. In other words, the picture including the current picture block is between two reference pictures.

Condition D: MotionModelIdc[xCb][yCb] is equal to 0. MotionModelIdc is a motion model index for motion compensation. The MotionModelIdc[xCb][yCb] equal to 0 indicates that a motion model for motion compensation of the current block is translational motion.

Condition E: merge_subblock_flag[x0][y0] is equal to 0, where merge_subblock_flag[x0][y0] equal to 0 indicates that a subblock merge mode is not applied for the current picture block.

Condition F: sym_mvd_flag[x0][y0] is equal to 0. sym_mvd_flag[x0][y0] equal to 0 indicates that mvd_coding (x0, y0, refList, cpIdx) syntax structure is present for the current block.

Condition G: bcwIdx[xCb][yCb] is equal to 0. bcwIdx indicates a bi-directional prediction weight index for the current picture block.

Condition H: cIdx is equal to 0. cIdx represents a colour component index of the current picture block.

Condition I: The size of the current picture block is the first preset size.

Condition J: Both luma_weight_l0_flag[refIdxL0] and luma_weight_l1_flag[refIdxL1] are equal to 0, where luma_weight_l0_flag equal to 0 indicates that weighting factors for a luma component of list0 prediction are not present, and luma_weight_l1_flag equal to 0 indicates that weighting factors for a luma component of list1 prediction are not present.

For example, when all of the conditions A to J are satisfied, it is determined that the BDOF technology may be used to predict the predicted sample value of the current picture block. For example, bdofFlag is set to true. It should be noted that the foregoing conditions are merely examples, and another condition may be further added, or one or more of the foregoing conditions may be replaced, or one or more of the foregoing conditions may be removed.

It should be understood that the current picture block (or a current block) herein may be understood as a picture block that is being processed. For example, in a decoding process, the current picture block is a picture block that is being decoded (a decoding block).

In this embodiment of this application, a condition determining action may be further included. For example, whether the plurality of preset conditions is satisfied is determined.

It may be understood that another case may be further obtained with reference to the foregoing cases, and the another case also falls within the protection scope of this application.

It should be understood that the method in this embodiment of this application may be performed by a video decoder or an electronic device having a video decoding function.

To be specific, a condition for enabling or using the BDOF technology in this solution is different from a condition for enabling or using the BDOF technology in the other approaches, and in particular, requirements for the size of the current picture block are different. The BDOF technology is used for the current picture block having the first preset size, so that a predicted sample value closer to an original sample value can be obtained, and coding complexity can be properly controlled. This balances encoding/ decoding complexity and prediction accuracy to some extent, thereby improving coding efficiency.

In an optional solution, the syntax element includes an index (for example, merge_idx[xCb][yCb]) of target candidate motion information, the target candidate motion information includes target candidate motion vectors, reference frame indices, and prediction direction indication information (for example, predFlagL0=1 and predFlagL1=1), the prediction direction indication information is used to indicate that bi-directional prediction is applied, the target candidate motion vectors include a first motion vector corresponding to a first list (that is, list0) and a second motion vector corresponding to a second list (that is, list1), and the reference frame indices include an index (for example, refIdxL0) of a first reference frame corresponding to the first list and an index (for example, refIdxL1) of a second reference frame corresponding to the second list.

In this embodiment of this application, the reference frame index is used to identify a reference picture corresponding to a used motion vector (for example, the first motion vector or the second motion vector) in a specified reference picture list (the first list list0 or the second list list1). The picture may be referred to as a frame, and the reference picture may be referred to as a reference frame.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, the syntax element includes first indices, second indices, prediction direction indication information, and a MVD, the first indices (for example, mvp_lX_flag[xCb][yCb]) are used to indicate target candidate motion vector predictors, the target candidate motion vector predictors include a first motion vector predictor corresponding to a first list (for example, list0) and a second motion vector predictor corresponding to a second list (for example, list1), and the MVD includes a first MVD corresponding to the first list and/or a second MVD corresponding to the second list (for example, when only one MVD is included, an MVD that is not transmitted may be derived based on the transmitted MVD). The second indices (which are also referred to as reference frame indices) are used to indicate reference frames of the current picture block, and the reference frames include a first reference frame corresponding to the first list and a second reference frame corresponding to the second list. For example, the second indices are refIdxL0 and refIdxL1, refIdxL0 is an index of the first reference frame corresponding to the first list, and refIdxL1 is an index of the second reference frame corresponding to the second list. The prediction direction indication information (for example, predFlagL0=1 and predFlagL1=1) is used to indicate that bi-directional prediction is applied.

A first motion vector (for example, Mv0_L0) corresponding to the first list is obtained based on the first motion vector predictor (for example, Mvp0_L0) corresponding to the first list and the first MVD (for example, MVD0) corresponding to the first list. For example, Mv0_L0=Mvp0_L0+MVD0.

A second motion vector (for example, Mv1_L1) corresponding to the second list is obtained based on the second motion vector predictor (for example, Mvp1_L1) corresponding to the second list and the second MVD (for example, MVD1) corresponding to the second list. For example, Mv1_L1=Mvp1_L1+MVD1.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, parsing a bitstream to obtain a syntax element includes parsing the bitstream to obtain a sample residual and the syntax element, and determining a sample value of the current picture block based on at least the predicted sample value of the current picture block includes determining the sample value of the current picture block based on the sample residual and the predicted sample value of the current picture block.

According to a fourth aspect, an embodiment of this application provides a decoding method, and the method includes parsing a bitstream to obtain a syntax element, where the syntax element is at least used to indicate that bi-directional prediction is applied, and when a size of a current picture block is a second preset size, determining (or obtaining through prediction) a predicted sample value of the current picture block (for example, prediction samples of the current coding unit) in a first processing manner based on a reference sample value corresponding to a first list (that is, list0) and a reference sample value corresponding to a second list (that is, list1), where the first processing manner is not BDOF. In other words, when the size of the current picture block is the second preset size, the BDOF is not allowed to be used to determine the predicted sample value of the current picture block based on the reference sample value corresponding to the first list and the reference sample value corresponding to the second list. The size of the current picture block is usually represented by a width and a height (briefly written as W×H), and the width and the height are measured by sample (sample or pixel). The second preset size includes 8×8 (the first 8 indicates that the width of the current picture block is 8 samples, and the second 8 indicates that the height of the current picture block is 8 samples), 4×N (4 indicates that the width of the current picture block is 4 samples, N indicates that the height of the current picture block is N samples, and other sizes are deduced by analogy), 8×16, or 16×8. N is a power of 2 and is greater than or equal to 8. For example, a value of N may be 16, 32, 64, or the like.

In this embodiment of this application, the reference sample value corresponding to the first list and the reference sample value corresponding to the second list are respectively obtained through prediction based on a first motion vector (for example, Mv0_L0) corresponding to the first list (that is, list0) and a second motion vector (for example, Mv1_L1) corresponding to the second list (that is, list1). For example, the reference sample value corresponding to the first list (that is, list0) can be determined based on the first motion vector (for example, Mv0_L0) corresponding to the first list (that is, list0), and the reference sample value corresponding to the second list (that is, list1) can be determined based on the second motion vector (for example, Mv1_L1) corresponding to the second list (that is, list1).

The method further includes determining a sample value of the current picture block based on at least the predicted sample value of the current picture block.

It should be understood that the current picture block (or a current block) herein may be understood as a picture block that is being processed. For example, in a decoding process, the current picture block is a picture block that is being decoded (a decoding block).

Further, the foregoing described case that the second preset size includes 8×8, 4×N, 8×16, or 16×8 may also be limited to: the second preset size is 8×8, 4×N, 8×16, or 16×8. In other words, the BDOF is prohibited from being used for one of the sizes 8×8, 4×N, 8×16, and 16×8 that are listed above, or the BDOF may be prohibited from being used for a plurality of sizes thereof. The following uses examples for description.

Example 1: The second preset size includes (or is) 8×8. In other words, in this embodiment of this application, the BDOF is prohibited from being used for the size 8×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is 8×8, obtaining the predicted sample value of the current picture block through prediction in the first processing manner based on the reference sample value corresponding to the first list and the reference sample value corresponding to the second list.

Example 2: The second preset size includes (or is) 4×N. In other words, in this embodiment of this application, the BDOF is prohibited from being used for the size 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is 4×N, obtaining the predicted sample value of the current picture block through prediction in the first processing manner based on the reference sample value corresponding to the first list and the reference sample value corresponding to the second list, where N is greater than or equal to 8.

Example 3: The second preset size includes (or is) 8×8 or 4×N. In other words, in this embodiment of this application, the BDOF is prohibited from being used for the sizes 8×8 and 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is either of 8×8 and 4×N, obtaining the predicted sample value of the current picture block through prediction in the first processing manner based on the reference sample value corresponding to the first list and the reference sample value corresponding to the second list, where N is greater than or equal to 8.

Example 4: The second preset size includes (or is) 8×8, 4×N, 8×16, or 16×8, where N is greater than or equal to 8. In other words, in this embodiment of this application, the BDOF is prohibited from being used for the sizes 8×8, 4×N, 8×16, and 16×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is any one of 8×8, 4×N, 8×16, and 16×8, obtaining the predicted sample value of the current picture block through prediction in the first processing manner based on the reference sample value corresponding to the first list and the reference sample value corresponding to the second list, where N is greater than or equal to 8.

Example 5: The second preset size includes (or is) N×8, where N is greater than or equal to 4. In other words, in this embodiment of this application, the BDOF is prohibited from being used for the size N×8. In this case, obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is N×8, obtaining the predicted sample value of the current picture block through prediction in the first processing manner based on the reference sample value corresponding to the first list and the reference sample value corresponding to the second list.

Example 6: The second preset size includes (or is) N×8 or 4×N, where N is greater than or equal to 4. In other words, in this embodiment of this application, the BDOF is prohibited from being used for the size N×8 or 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is N×8 or 4×N, obtaining the predicted sample value of the current picture block through prediction in the first processing manner based on the reference sample value corresponding to the first list and the reference sample value corresponding to the second list.

In addition, because the BDOF is also prohibited from being used for a size M×4 in some scenarios, in this application, when the BDOF is prohibited from being used for the second preset size, the BDOF may be further prohibited from being used for the size M×4, where M is an integer greater than or equal to 4.

It may be understood that another case may be further obtained with reference to the foregoing cases, and the another case also falls within the protection scope of this application.

It should be understood that the method in this embodiment of this application may be performed by a video decoder or an electronic device having a video decoding function.

According to the foregoing method, features of current picture blocks of various sizes are fully considered when the BDOF technology is used. When the size of the current picture block is the second preset size, the predicted sample value of the current picture block is determined according to a technology other than the BDOF technology. This significantly reduces coding complexity, and improves coding efficiency.

In an optional solution, the obtaining a predicted sample value of the current picture block through prediction in a first processing manner based on a reference sample value corresponding to a first list and a reference sample value corresponding to a second list includes performing weighted calculation on sample values having a same location in the reference sample value corresponding to the first list and the reference sample value corresponding to the second list, to obtain the predicted sample value of the current picture block, or obtaining the predicted sample value of the current picture block through prediction based on the reference sample value corresponding to the first list and the reference sample value corresponding to the second list according to an MMVD technology, or obtaining the predicted sample value of the current picture block through prediction based on the reference sample value corresponding to the first list and the reference sample value corresponding to the second list according to a CLIP technology, or obtaining the predicted sample value of the current picture block through prediction based on the reference sample value corresponding to the first list and the reference sample value corresponding to the second list according to a decoder-side motion vector refinement (DMVR) technology.

In this embodiment of this application, whether the weighted calculation manner, the MMVD technology, or the CIIP technology is used may be determined by using a corresponding condition, or may be indicated by using corresponding indication information.

It should be noted that the BDOF technology is equivalent to a patch optimization technology for a conventional technology for predicting a predicted sample value of a current picture block. In many scenarios, a predicted sample value closer to a real sample value of the current picture block can be obtained according to the BDOF technology. Therefore, a sample residual obtained based on the predicted sample value is smaller, so that coding efficiency can be improved. Thus, the BDOF technology is usually used on an encoder side. To more accurately restore a predicted sample value, the BDOF technology is also correspondingly used on a decoder side. The foregoing weighted calculation manner may be considered as a conventional technology for obtaining a predicted sample value of a current picture block, and the foregoing MMVD technology, CIIP technology, and DMVR technology each may be considered as a patch optimization technology for a conventional technology. In this embodiment of this application, when the size of the current picture block is the second preset size, the predicted sample value of the current picture block is determined according to a conventional technology (for example, the weighted calculation manner) or another patch optimization technology (for example, MMVD, CIIP, or DMVR) rather than the BDOF technology. This can significantly reduce decoding complexity, and improve decoding efficiency.

In an optional solution, the method further includes: when a plurality of preset conditions is satisfied, performing BDOF processing on a current picture block, to obtain a predicted sample value of the current picture block, where the plurality of preset conditions includes at least a condition that a size of the current picture block satisfies a first preset size.

That a size of the current picture block satisfies a first preset size includes (or is): the height H of the current picture block is greater than or equal to 8, and when a product of the width W and the height H of the current picture block is equal to 64, the width W is not equal to the height H.

Alternatively, that a size of the current picture block satisfies a first preset size includes (or is): the height H of the current picture block is greater than or equal to 8, and the width W of the current picture block is greater than or equal to 8.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes: the height H of the current picture block is greater than 8.

Alternatively, that a size of the current picture block satisfies a first preset size includes: the height H of the current picture block is greater than 8, and the width W of the current picture block is greater than or equal to 8.

The method further includes: reconstructing the current picture block based on at least the predicted sample value of the current picture block.

To be specific, a condition for enabling or using the BDOF technology in this solution is different from a condition for enabling or using the BDOF technology in the other approaches, and in particular, requirements for the size of the current picture block are different. The BDOF technology is used for the current picture block having the first preset size, so that a predicted sample value closer to an original sample value can be obtained, and coding complexity can be properly controlled. This balances encoding/decoding complexity and prediction accuracy to some extent, thereby improving coding efficiency.

It should be noted that before whether to determine (or obtain through prediction) the predicted sample value of the current picture block based on the reference sample value corresponding to the first list and the reference sample value corresponding to the second list according to the BDOF technology is determined, there may be another reference condition in addition to the size of the current picture block. The another reference condition is not limited herein. For ease of understanding, the following uses examples for description.

Condition A: There is a high-level syntax identifier sps_bdof_enabled_flag indicating that the BDOF technology is allowed to be used for a current video sequence.

Condition B: Prediction direction indication information predFlagL0 corresponding to a first list (list1) is equal to 1, and prediction direction indication information predFlagL1 corresponding to a second list (list0) is equal to 1.

Condition C: A picture order count POC_L0 of a reference frame corresponding to a first list (list0), a picture order count POC_L1 of a reference frame corresponding to a second list (list1), and a picture order count POC_Cur of a picture in which the current picture block is located satisfy the following relationship: (POC_L0−POC_Cur)× (POC_L1−POC_Cur)<0. In other words, the picture including the current picture block is between two reference pictures.

Condition D: MotionModelIdc[xCb][yCb] is equal to 0. MotionModelIdc is a motion model index for motion compensation. The MotionModelIdc[xCb][yCb] equal to 0 indicates that a motion model for motion compensation of the current block is translational motion.

Condition E: merge_subblock_flag[x0][y0] is equal to 0, where merge_subblock_flag[x0][y0] equal to 0 indicates that a subblock merge mode is not applied for the current picture block.

Condition F: sym_mvd_flag[x0][y0] is equal to 0. sym_mvd_flag[x0][y0] equal to 0 indicates that mvd_coding (x0, y0, refList, cpIdx) syntax structure is present for the current block.

Condition G: bcwIdx[xCb][yCb] is equal to 0. bcwIdx indicates a bi-directional prediction weight index for the current picture block.

Condition H: cIdx is equal to 0. cIdx represents a colour component index of the current picture block.

Condition I: The size of the current picture block is the first preset size.

Condition J: Both luma_weight_l0_flag[refIdxL0] and luma_weight_l1_flag[refIdxL1] are equal to 0, where luma_weight_l0_flag equal to 0 indicates that weighting factors for a luma component of list0 prediction are not present, and luma_weight_l1_flag equal to 0 indicates that weighting factors for a luma component of list1 prediction are not present.

For example, when all of the conditions A to J are satisfied, it is determined that the BDOF technology may be used to predict the predicted sample value of the current picture block. For example, bdofFlag is set to true. It should be noted that the foregoing conditions are merely examples, and another condition may be further added, or one or more of the foregoing conditions may be replaced, or one or more of the foregoing conditions may be removed.

In an optional solution, the syntax element includes an index (for example, merge_idx[xCb][yCb]) of target candidate motion information, the target candidate motion information includes target candidate motion vectors, reference frame indices, and prediction direction indication information (for example, predFlagL0=1 and predFlagL1=1), the prediction direction indication information is used to indicate that bi-directional prediction is applied, the target candidate motion vectors include the first motion vector corresponding to the first list (that is, list0) and the second motion vector corresponding to the second list (that is, list1), and the reference frame indices include an index (for example, refIdxL0) of a first reference frame corresponding to the first list and an index (for example, refIdxL1) of a second reference frame corresponding to the second list.

In this embodiment of this application, the reference frame index is used to identify a reference picture corresponding to a used motion vector (for example, the first motion vector or the second motion vector) in a specified reference picture list (the first list list0 or the second list list1). The picture may be referred to as a frame, and the reference picture may be referred to as a reference frame.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, the syntax element includes first indices, second indices, prediction direction indication information, and an MVD, the first indices (for example, mvp_lX_flag[xCb][yCb]) are used to indicate target candidate motion vector predictors, the target candidate motion vector predictors include a first motion vector predictor corresponding to the first list (for example, list0) and a second motion vector predictor corresponding to the second list (for example, list1), and the MVD includes a first MVD corresponding to the first list and/or a second MVD corresponding to the second list (optionally, when the MMVD technology is used, only one MVD may be transmitted, and an MVD that is in another direction and that needs to be used by a decoder side may be derived based on the transmitted MVD). The second indices (which are also referred to as reference frame indices) are used to indicate reference frames of the current picture block, and the reference frames include a first reference frame corresponding to the first list and a second reference frame corresponding to the second list. For example, the second indices are refIdxL0 and refIdxL1, refIdxL0 is an index of the first reference frame corresponding to the first list, and refIdxL1 is an index of the second reference frame corresponding to the second list. The prediction direction indication information (for example, predFlagL0=1 and predFlagL1=1) is used to indicate that bi-directional prediction is applied.

The first motion vector (for example, Mv0_L0) corresponding to the first list is obtained based on the first motion vector predictor (for example, Mvp0_L0) corresponding to the first list and the first MVD (for example, MVD0) corresponding to the first list. For example, Mv0_L0=Mvp0_L0+MVD0.

The second motion vector (for example, Mv1_L1) corresponding to the second list is obtained based on the second motion vector predictor (for example, Mvp1_L1) corresponding to the second list and the second MVD (for example, MVD1) corresponding to the second list. For example, Mv1_L1=Mvp1_L1+MVD1.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, parsing a bitstream to obtain a syntax element includes parsing the bitstream to obtain a sample residual and the syntax element, and determining a sample value of the current picture block based on at least the predicted sample value of the current picture block includes determining the sample value of the current picture block based on the sample residual and the predicted sample value of the current picture block.

According to a fifth aspect, an embodiment of this application provides an inter prediction method, and the method includes determining whether a current picture block satisfies a plurality of preset conditions, and when the plurality of preset conditions are satisfied, performing BDOF processing on the current picture block, to obtain a predicted sample value of the current picture block, where the plurality of preset conditions include at least a condition that a size of the current picture block satisfies a first preset size. The size of the current picture block is usually represented by a width and a height (briefly written as W×H), and the width and the height are measured by sample (sample or pixel). For example, if the size of the current picture block is 8×8, the first 8 indicates that the width of the current picture block is 8 samples, and the second 8 indicates that the height of the current picture block is 8 samples. For another example, if the size of the current picture block is 8×16, 8 indicates that the width of the current picture block is 8 samples, and 16 indicates that the height of the current picture block is 16 samples.

That a size of the current picture block satisfies a first preset size includes (or is): the height H of the current picture block is greater than or equal to 8, and when a product of the width W and the height H of the current picture block is equal to 64, the width W is not equal to the height H.

Alternatively, that a size of the current picture block satisfies a first preset size includes (or is): the height H of the current picture block is greater than or equal to 8, and the width W of the current picture block is greater than or equal to 8.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes: the height H of the current picture block is greater than 8.

Alternatively, that a size of the current picture block satisfies a first preset size includes: the height H of the current picture block is greater than 8, and the width W of the current picture block is greater than or equal to 8.

It should be noted that before whether to determine (or obtain through prediction) the predicted sample value of the current picture block based on a reference sample value corresponding to a first list and a reference sample value corresponding to a second list according to the BDOF technology is determined, there may be another reference condition in addition to the size of the current picture block. The another reference condition is not limited herein. For ease of understanding, the following uses examples for description.

Condition A: There is a high-level syntax identifier sps_bdof_enabled_flag indicating that the BDOF technology is allowed to be used for a current video sequence.

Condition B: Prediction direction indication information predFlagL0 corresponding to a first list (list1) is equal to 1, and prediction direction indication information predFlagL1 corresponding to a second list (list0) is equal to 1.

Condition C: A picture order count POC_L0 of a reference frame corresponding to a first list (list0), a picture order count POC_L1 of a reference frame corresponding to a second list (list1), and a picture order count POC_Cur of a picture in which the current picture block is located satisfy the following relationship: (POC_L0−POC_Cur)×(POC_L1−POC_Cur)<0. In other words, the picture including the current picture block is between two reference pictures.

Condition D: MotionModelIdc[xCb][yCb] is equal to 0. MotionModelIdc is a motion model index for motion compensation. The MotionModelIdc[xCb][yCb] equal to 0 indicates that a motion model for motion compensation of the current block is translational motion.

Condition E: merge_subblock_flag[x0][y0] is equal to 0, where merge_subblock_flag[x0][y0] equal to 0 indicates that a subblock merge mode is not applied for the current picture block.

Condition F: sym_mvd_flag[x0][y0] is equal to 0. sym_mvd_flag[x0][y0] equal to 0 indicates that mvd_coding (x0, y0, refList, cpIdx) syntax structure is present for the current block.

Condition G: bcwIdx[xCb][yCb] is equal to 0. bcwIdx indicates a bi-directional prediction weight index for the current picture block.

Condition H: cIdx is equal to 0. cIdx represents a colour component index of the current picture block.

Condition I: The size of the current picture block is the first preset size.

Condition J: Both luma_weight_l0_flag[refIdxL0] and luma_weight_l1_flag[refIdxL1] are equal to 0, where luma_weight_l0_flag equal to 0 indicates that weighting factors for a luma component of list0 prediction are not present, and luma_weight_l1_flag equal to 0 indicates that weighting factors for a luma component of list1 prediction are not present.

For example, when all of the conditions A to J are satisfied, it is determined that the BDOF technology may be used to predict the predicted sample value of the current picture block. For example, bdofFlag is set to true. It should be noted that the foregoing conditions are merely examples, and another condition may be further added, or one or more of the foregoing conditions may be replaced, or one or more of the foregoing conditions may be removed.

It should be understood that the current picture block (which is also referred to as a current block) herein may be understood as a picture block that is being processed. For example, in an encoding process, the current picture block is a picture block that is being encoded (an encoding block). Certainly, the current picture block herein may be alternatively understood as a picture block that is being processed.

For example, in a decoding process, the current picture block is a picture block that is being decoded (a decoding block).

In an optional solution, the method further includes, when at least one of the plurality of preset conditions is not satisfied, skipping performing BDOF processing on the current picture block. To be specific, a predicted sample value of the current picture block may be obtained through prediction in a first processing manner based on a reference sample value corresponding to a first list and a reference sample value corresponding to a second list. The first processing manner is not BDOF. For details, refer to related parts in this specification. Details are not described herein again.

It may be understood that another case may be further obtained with reference to the foregoing cases, and the another case also falls within the protection scope of this application.

It should be understood that the method in this embodiment of this application may be performed by a video encoder or an electronic device having a video encoding function, or may be performed by a video decoder or an electronic device having a video decoding function. For example, the method may be performed by an inter prediction unit in these devices.

To be specific, a condition for enabling or using the BDOF technology in this solution is different from a condition for enabling or using the BDOF technology in the other approaches, and in particular, requirements for the size of the current picture block are different. The BDOF technology is used for the current picture block having the first preset size, so that a predicted sample value closer to an original sample value can be obtained, and coding complexity can be properly controlled. This balances encoding/decoding complexity and prediction accuracy to some extent, thereby improving coding efficiency.

According to a sixth aspect, an embodiment of this application provides a video encoding device, and the encoding device includes an inter prediction unit, a reconstruction unit, and an entropy encoding unit.

The inter prediction unit is configured to, when a plurality of preset conditions are satisfied, perform BDOF processing on a current picture block, to obtain a predicted sample value of the current picture block, where the plurality of preset conditions include at least a condition that a size of the current picture block satisfies a first preset size. The size of the current picture block is usually represented by a width and a height (briefly written as W×H), and the width and the height are measured by sample (sample or pixel). For example, if the size of the current picture block is 8×8, the first 8 indicates that the width of the current picture block is 8 samples, and the second 8 indicates that the height of the current picture block is 8 samples. For another example, if the size of the current picture block is 8×16, 8 indicates that the width of the current picture block is 8 samples, and 16 indicates that the height of the current picture block is 16 samples.

That a size of the current picture block satisfies a first preset size includes (or is): the height H of the current picture block is greater than or equal to 8, and when a product of the width W and the height H of the current picture block is equal to 64, the width W is not equal to the height H.

Alternatively, that a size of the current picture block satisfies a first preset size includes (or is): the height H of the current picture block is greater than or equal to 8, and the width W of the current picture block is greater than or equal to 8.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes: the height H of the current picture block is greater than 8.

Alternatively, that a size of the current picture block satisfies a first preset size includes: the height H of the current picture block is greater than 8, and the width W of the current picture block is greater than or equal to 8.

The reconstruction unit is configured to reconstruct the current picture block based on at least the predicted sample value of the current picture block.

The entropy encoding unit is configured to encode a syntax element into a to-be-transmitted bitstream, where the syntax element is at least used to indicate that bi-directional prediction is applied.

It should be noted that before whether to determine (or obtain through prediction) the predicted sample value of the current picture block based on a reference sample value corresponding to a first list and a reference sample value corresponding to a second list according to the BDOF technology is determined, there may be another reference condition in addition to the size of the current picture block. The another reference condition is not limited herein. For ease of understanding, the following uses examples for description.

Condition A: There is a high-level syntax identifier sps_bdof_enabled_flag indicating that the BDOF technology is allowed to be used for a current video sequence.

Condition B: Prediction direction indication information predFlagL0 corresponding to a first list (list1) is equal to 1, and prediction direction indication information predFlagL1 corresponding to a second list (list0) is equal to 1.

Condition C: A picture order count POC_L0 of a reference frame corresponding to a first list (list0), a picture order count POC_L1 of a reference frame corresponding to a second list (list1), and a picture order count POC_Cur of a picture in which the current picture block is located satisfy the following relationship: (POC_L0−POC_Cur)×(POC_L1−POC_Cur)<0. In other words, the picture including the current picture block is between two reference pictures.

Condition D: MotionModelIdc[xCb][yCb] is equal to 0. MotionModelIdc is a motion model index for motion compensation. The MotionModelIdc[xCb][yCb] equal to 0 indicates that a motion model for motion compensation of the current picture block is translational motion.

Condition E: merge_subblock_flag[x0][y0] is equal to 0, where merge_subblock_flag[x0][y0] equal to 0 indicates that a subblock merge mode is not applied for the current picture block.

Condition F: sym_mvd_flag[x0][y0] is equal to 0. sym_mvd_flag[x0][y0] equal to 0 indicates that mvd_coding (x0, y0, refList, cpIdx) syntax structure is present for the current block.

Condition G: bcwIdx[xCb][yCb] is equal to 0. bcwIdx indicates a bi-directional prediction weight index for the current picture block.

Condition H: cIdx is equal to 0. cIdx represents a colour component index of the current picture block.

Condition I: The size of the current picture block is the first preset size.

Condition J: Both luma_weight_l0_flag[refIdxL0] and luma_weight_l1_flag[refIdxL1] are equal to 0, where luma_weight_l0_flag equal to 0 indicates that weighting factors for a luma component of list0 prediction are not present, and luma_weight_l1_flag equal to 0 indicates that weighting factors for a luma component of list1 prediction are not present.

For example, when all of the conditions A to J are satisfied, it is determined that the BDOF technology may be used to predict the predicted sample value of the current picture block. For example, bdofFlag is set to true. It should be noted that the foregoing conditions are merely examples, and another condition may be further added, or one or more of the foregoing conditions may be replaced, or one or more of the foregoing conditions may be removed.

It should be understood that the current picture block (or a current block) herein may be understood as a picture block that is being processed. For example, in an encoding process, the current picture block is a picture block that is being encoded (an encoding block).

In this embodiment of this application, a condition determining action may be further included. For example, the inter prediction unit is further configured to determine whether the plurality of preset conditions are satisfied.

It may be understood that another case may be further obtained with reference to the foregoing cases, and the another case also falls within the protection scope of this application.

To be specific, a condition for enabling or using the BDOF technology in this solution is different from a condition for enabling or using the BDOF technology in the other approaches, and in particular, requirements for the size of the current picture block are different. The BDOF technology is used for the current picture block having the first preset size, so that a predicted sample value closer to an original sample value can be obtained, and coding complexity can be properly controlled. This balances encoding/decoding complexity and prediction accuracy to some extent, thereby improving coding efficiency.

In an optional solution, the syntax element includes an index (for example, merge_idx[xCb][yCb]) of target candidate motion information, the target candidate motion information includes target candidate motion vectors, reference frame indices, and prediction direction indication information (for example, predFlagL0=1 and predFlagL1=1), the prediction direction indication information is used to indicate that bi-directional prediction is applied, the target candidate motion vectors include a first motion vector corresponding to a first list (that is, list0) and a second motion vector corresponding to a second list (that is, list1), and the reference frame indices include an index (for example, refIdxL0) of a first reference frame corresponding to the first list and an index (for example, refIdxL1) of a second reference frame corresponding to the second list.

In this embodiment of this application, the reference frame index is used to identify a reference picture corresponding to a used motion vector (for example, the first motion vector or the second motion vector) in a specified reference picture list (the first list list0 or the second list list1). The picture may be referred to as a frame, and the reference picture may be referred to as a reference frame.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, the syntax element includes first indices, second indices, prediction direction indication information, and an MVD, the first indices (for example, mvp_lX_flag[xCb][yCb]) are used to indicate target candidate motion vector predictors, the target candidate motion vector predictors include a first motion vector predictor corresponding to a first list (for example, list0) and a second motion vector predictor corresponding to a second list (for example, list1), and the MVD includes a first MVD corresponding to the first list and/or a second MVD corresponding to the second list (optionally, when an MMVD technology is used, only one MVD may be transmitted, and an MVD that is in another direction and that needs to be used by a decoder side may be derived based on the transmitted MVD). The second indices (or reference frame indices) are used to indicate reference frames of the current picture block, and the reference frames include a first reference frame corresponding to the first list and a second reference frame corresponding to the second list. For example, the second indices are refIdxL0 and refIdxL1, refIdxL0 is an index of the first reference frame corresponding to the first list, and refIdxL1 is an index of the second reference frame corresponding to the second list. The prediction direction indication information (for example, predFlagL0=1 and predFlagL1=1) is used to indicate that bi-directional prediction is applied.

A first motion vector (for example, Mv0_L0) corresponding to the first list is obtained based on the first motion vector predictor (for example, Mvp0_L0) corresponding to the first list and the first MVD (for example, MVD0) corresponding to the first list. For example, Mv0_L0=Mvp0_L0+MVD0.

A second motion vector (for example, Mv1_L1) corresponding to the second list is obtained based on the second motion vector predictor (for example, Mvp1_L1) corresponding to the second list and the second MVD (for example, MVD1) corresponding to the second list. For example, Mv1_L1=Mvp1_L1+MVD1.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, the video encoding device further includes a residual calculation unit configured to determine a sample residual based on a sample value of the current picture block and the predicted sample value of the current picture block, and the entropy encoding unit is configured to encode the syntax element and the sample residual into the to-be-transmitted bitstream. In other words, in addition to the syntax element, the sample residual may be further encoded into the to-be-transmitted bitstream (the sample residual may be obtained through calculation by using the residual calculation unit). This solution may be applied to an AMVP mode and a merge mode. In addition, there is also a case in which no sample residual needs to be encoded into a to-be-transmitted bitstream. For example, in a skip mode, no sample residual needs to be encoded into a to-be-transmitted bitstream.

According to a seventh aspect, an embodiment of this application provides a video encoding device, and the video encoding device includes an inter prediction unit, a reconstruction unit, and an entropy encoding unit.

The inter prediction unit is configured to when a size of a current picture block is a second preset size, determine (or obtain through prediction) a predicted sample value of the current picture block (for example, prediction samples of the current coding unit) in a first processing manner based on a reference sample value corresponding to a first list (that is, list0) and a reference sample value corresponding to a second list (that is, list1), where the first processing manner is not BDOF. In other words, when the size of the current picture block is the second preset size, the BDOF is not allowed to be used to determine the predicted sample value of the current picture block based on the reference sample value corresponding to the first list and the reference sample value corresponding to the second list. The size of the current picture block is usually represented by a width and a height (briefly written as W×H), and the width and the height are measured by sample (sample or pixel). The second preset size includes 8×8 (the first 8 indicates that the width of the current picture block is 8 samples, and the second 8 indicates that the height of the current picture block is 8 samples), 4×N (4 indicates that the width of the current picture block is 4 samples, N indicates that the height of the current picture block is N samples, and other sizes are deduced by analogy), 8×16, or 16×8. N is a power of 2 and is greater than or equal to 8. For example, a value of N may be 16, 32, 64, or the like.

In this embodiment of this application, the reference sample value corresponding to the first list and the reference sample value corresponding to the second list are respectively obtained through prediction based on a first motion vector (for example, Mv0_L0) corresponding to the first list (that is, list0) and a second motion vector (for example, Mv1_L1) corresponding to the second list (that is, list1). For example, the reference sample value corresponding to the first list (that is, list0) can be determined based on the first motion vector (for example, Mv0_L0) corresponding to the first list (that is, list0), and the reference sample value corresponding to the second list (that is, list1) can be determined based on the second motion vector (for example, Mv1_L1) corresponding to the second list (that is, list1).

The reconstruction unit is configured to reconstruct the current picture block based on at least the predicted sample value of the current picture block. The "at least" herein indicates that the predicted sample value of the current picture block needs to be used to reconstruct the current picture block, and other information may also be used.

The entropy encoding unit is configured to encode a syntax element into a to-be-transmitted bitstream, where the syntax element is at least used to indicate that bi-directional prediction is applied.

It should be understood that the current picture block (which is also referred to as a current block) herein may be understood as a picture block that is being processed. For example, in an encoding process, the current picture block is a picture block that is being encoded (an encoding block).

Further, the foregoing described case that the second preset size includes 8×8, 4×N, 8×16, or 16×8 may also be limited to the second preset size is 8×8, 4×N, 8×16, or 16×8. In other words, the BDOF is prohibited from being used for one of the sizes 8×8, 4×N, 8×16, and 16×8 that are listed above, or the BDOF may be prohibited from being used for a plurality of sizes thereof. The following uses examples for description.

Example 1: The second preset size includes (or is) 8×8. In other words, in this embodiment of this application, the BDOF is prohibited from being used for the size 8×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is 8×8, obtaining the predicted sample value of the current picture block through prediction in the first processing manner based on the reference sample value corresponding to the first list and the reference sample value corresponding to the second list.

Example 2: The second preset size includes (or is) 4×N. In other words, in this embodiment of this application, the BDOF is prohibited from being used for the size 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is 4×N, obtaining the predicted sample value of the current picture block through prediction in the first processing manner based on the reference sample value corresponding to the first list and the reference sample value corresponding to the second list, where N is greater than or equal to 8.

Example 3: The second preset size includes (or is) 8×8 or 4×N. In other words, in this embodiment of this application, the BDOF is prohibited from being used for the sizes 8×8 and 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is either of 8×8 and 4×N, obtaining the predicted sample value of the current picture block through prediction in the first processing manner based on the reference sample value corresponding to the first list and the reference sample value corresponding to the second list, where N is greater than or equal to 8.

Example 4: The second preset size includes (or is) 8×8, 4×N, 8×16, or 16×8, where N is greater than or equal to 8. In other words, in this embodiment of this application, the BDOF is prohibited from being used for the sizes 8×8, 4×N, 8×16, and 16×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is any one of 8×8, 4×N, 8×16, and 16×8, obtaining the predicted sample value of the current picture block through prediction in the first processing manner based on the reference sample value corresponding to the first list and the reference sample value corresponding to the second list, where N is greater than or equal to 8.

Example 5: The second preset size includes (or is) N×8, where N is greater than or equal to 4. In other words, in this embodiment of this application, the BDOF is prohibited from being used for the size N×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is N×8, obtaining the predicted sample value of the current picture block through prediction in the first processing manner based on the reference sample value corresponding to the first list and the reference sample value corresponding to the second list.

Example 6: The second preset size includes (or is) N×8 or 4×N, where N is greater than or equal to 4. In other words, in this embodiment of this application, the BDOF is prohibited from being used for the size N×8 or 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is N×8 or 4×N, obtaining the predicted sample value of the current picture block through prediction in the first processing manner based on the reference sample value corresponding to the first list and the reference sample value corresponding to the second list.

In addition, because the BDOF is also prohibited from being used for a size M×4 in some scenarios, in this application, when the BDOF is prohibited from being used for the second preset size, the BDOF may be further prohibited from being used for the size M×4, where M is an integer greater than or equal to 4.

It may be understood that another case may be further obtained with reference to the foregoing cases, and the another case also falls within the protection scope of this application.

According to the foregoing method, features of current picture blocks of various sizes are fully considered when the BDOF technology is used. When the size of the current picture block is the second preset size, the predicted sample value of the current picture block is determined according to a technology other than the BDOF technology. This significantly reduces coding complexity, and improves coding efficiency.

In an optional solution, in a process of determining the predicted sample value of the current picture block in the first processing manner based on the reference sample value corresponding to the first list and the reference sample value corresponding to the second list, the inter prediction unit is configured to perform weighted calculation on sample values having a same location in the reference sample value corresponding to the first list and the reference sample value corresponding to the second list, to obtain the predicted sample value of the current picture block, or obtain the predicted sample value of the current picture block through prediction based on the reference sample value corresponding to the first list and the reference sample value corresponding to the second list according to an MMVD technology, or obtain the predicted sample value of the current picture block through prediction based on the reference sample value corresponding to the first list and the reference sample value corresponding to the second list according to a CIIP technology.

In this embodiment of this application, whether the weighted calculation manner, the MMVD technology, or the CIIP technology is used may be determined by using a corresponding condition, or may be indicated by using corresponding indication information.

It should be noted that the BDOF technology is equivalent to a patch optimization technology for a conventional technology for predicting a predicted sample value of a current picture block. In many scenarios, a predicted sample value closer to a real sample value of the current picture block can be obtained according to the BDOF technology. Therefore, a sample residual obtained based on the predicted sample value is smaller, so that coding efficiency can be improved. The foregoing weighted calculation manner may be considered as a conventional technology for obtaining a predicted sample value of a current picture block, and the foregoing MMVD technology and CIIP technology each may be considered as a patch optimization technology for a conventional technology. In this embodiment of this application, when the size of the current picture block is the second preset size, the predicted sample value of the current picture block is determined according to a conventional technology (for example, the weighted calculation manner) or another patch optimization technology (for example, MMVD or CIIP) rather than the BDOF technology. This can significantly reduce coding complexity, and improve coding efficiency.

In an optional solution, the inter prediction unit is further configured to when a plurality of preset conditions are satisfied, perform BDOF processing on a current picture block, to obtain a predicted sample value of the current picture block, where the plurality of preset conditions include at least a condition that a size of the current picture block satisfies a first preset size.

That a size of the current picture block satisfies a first preset size includes the height H of the current picture block is greater than or equal to 8, and when a product of the width W and the height H of the current picture block is equal to 64, the width W is not equal to the height H.

Alternatively, that a size of the current picture block satisfies a first preset size includes (or is): the height H of the current picture block is greater than or equal to 8, and the width W of the current picture block is greater than or equal to 8.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes: the height H of the current picture block is greater than 8.

Alternatively, that a size of the current picture block satisfies a first preset size includes: the height H of the current picture block is greater than 8, and the width W of the current picture block is greater than or equal to 8.

The reconstruction unit is further configured to reconstruct the current picture block based on at least the predicted sample value of the current picture block.

To be specific, a condition for enabling or using the BDOF technology in this solution is different from a condition for enabling or using the BDOF technology in the other approaches, and in particular, requirements for the size of the current picture block are different. The BDOF technology is used for the current picture block having the first preset size, so that a predicted sample value closer to an original sample value can be obtained, and coding complexity can be properly controlled. This balances encoding/decoding complexity and prediction accuracy to some extent, thereby improving coding efficiency.

It should be noted that before whether to determine (or obtain through prediction) the predicted sample value of the current picture block based on the reference sample value corresponding to the first list and the reference sample value corresponding to the second list according to the BDOF technology is determined, there may be another reference condition in addition to the size of the current picture block. The another reference condition is not limited herein. For ease of understanding, the following uses examples for description.

Condition A: There is a high-level syntax identifier sps_bdof_enabled_flag indicating that the BDOF technology is allowed to be used for a current video sequence.

Condition B: Prediction direction indication information predFlagL0 corresponding to a first list (list1) is equal to 1, and prediction direction indication information predFlagL1 corresponding to a second list (list0) is equal to 1.

Condition C: A picture order count POC_L0 of a reference frame corresponding to a first list (list0), a picture order count POC_L1 of a reference frame corresponding to a second list (list1), and a picture order count POC_Cur of a picture in which the current picture block is located satisfy the following relationship: (POC_L0−POC_Cur)×(POC_L1−POC_Cur)<0. In other words, the picture including the current picture block is between two reference pictures.

Condition D: MotionModelIdc[xCb][yCb] is equal to 0. MotionModelIdc is a motion model index for motion compensation. The MotionModelIdc[xCb][yCb] equal to 0 indicates that a motion model for motion compensation of the current block is translational motion.

Condition E: merge_subblock_flag[x0][y0] is equal to 0, where merge_subblock_flag[x0][y0] equal to 0 indicates that a subblock merge mode is not applied for the current picture block.

Condition F: sym_mvd_flag[x0][y0] is equal to 0. sym_mvd_flag[x0][y0] equal to 0 indicates that mvd_coding (x0, y0, refList, cpIdx) syntax structure is present for the current block.

Condition G: bcwIdx[xCb][yCb] is equal to 0. bcwIdx indicates a bi-directional prediction weight index for the current picture block.

Condition H: cIdx is equal to 0. cIdx represents a colour component index of the current picture block.

Condition I: The size of the current picture block is the first preset size.

Condition J: Both luma_weight_l0_flag[refIdxL0] and luma_weight_l1_flag[refIdxL1] are equal to 0, where luma_weight_l0_flag equal to 0 indicates that weighting factors for a luma component of list0 prediction are not present, and luma_weight_l1_flag equal to 0 indicates that weighting factors for a luma component of list1 prediction are not present.

For example, when all of the conditions A to J are satisfied, it is determined that the BDOF technology may be used to predict the predicted sample value of the current picture block. For example, bdofFlag is set to true. It should be noted that the foregoing conditions are merely examples, and another condition may be further added, or one or more of the foregoing conditions may be replaced, or one or more of the foregoing conditions may be removed.

In an optional solution, the syntax element includes an index (for example, merge_idx[xCb][yCb]) of target candidate motion information, the target candidate motion information includes target candidate motion vectors, reference frame indices, and prediction direction indication information (for example, predFlagL0=1 and predFlagL1=1), the prediction direction indication information is used to indicate that bi-directional prediction is applied, the target candidate motion vectors include the first motion vector corresponding to the first list (that is, list0) and the second motion vector corresponding to the second list (that is, list1), and the reference frame indices include an index (for example, refIdxL0) of a first reference frame corresponding to the first list and an index (for example, refIdxL1) of a second reference frame corresponding to the second list.

In this embodiment of this application, the reference frame index is used to identify a reference picture corresponding to a used motion vector (for example, the first motion vector or the second motion vector) in a specified reference picture list (the first list list0 or the second list list1). The picture may be referred to as a frame, and the reference picture may be referred to as a reference frame.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward"

respectively correspond to a reference picture list0 (list0, namely, the foregoing first list) and a reference picture list1 (list1, namely, the foregoing second list) of a current picture.

In an optional solution, the syntax element includes first indices, second indices, prediction direction indication information, and an MVD, the first indices (for example, mvp_lX_flag[xCb][yCb]) are used to indicate target candidate motion vector predictors, the target candidate motion vector predictors include a first motion vector predictor corresponding to the first list (for example, list0) and a second motion vector predictor corresponding to the second list (for example, list1), and the MVD includes a first MVD corresponding to the first list and/or a second MVD corresponding to the second list (optionally, when the MMVD technology is used, only one MVD may be transmitted, and an MVD that is in another direction and that needs to be used by a decoder side may be derived based on the transmitted MVD). The second indices (which are also referred to as reference frame indices) are used to indicate reference frames of the current picture block, and the reference frames include a first reference frame corresponding to the first list and a second reference frame corresponding to the second list. For example, the second indices are refIdxL0 and refIdxL1, refIdxL0 is an index of the first reference frame corresponding to the first list, and refIdxL1 is an index of the second reference frame corresponding to the second list. The prediction direction indication information (for example, predFlagL0=1 and predFlagL1=1) is used to indicate that bi-directional prediction is applied.

The first motion vector (for example, Mv0_L0) corresponding to the first list is obtained based on the first motion vector predictor (for example, Mvp0_L0) corresponding to the first list and the first MVD (for example, MVD0) corresponding to the first list. For example, Mv0_L0=Mvp0_L0+MVD0.

The second motion vector (for example, Mv1_L1) corresponding to the second list is obtained based on the second motion vector predictor (for example, Mvp1_L1) corresponding to the second list and the second MVD (for example, MVD1) corresponding to the second list. For example, Mv1_L1=Mvp1_L1+MVD1.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, the video encoding device further includes a residual calculation unit configured to determine a sample residual based on a sample value of the current picture block and the predicted sample value of the current picture block, and the entropy encoding unit is further configured to encode the syntax element and the sample residual into the to-be-transmitted bitstream.

According to an eighth aspect, an embodiment of this application provides a video decoding device, and the video decoding device includes an entropy decoding unit, an inter prediction unit, and a reconstruction unit.

The entropy decoding unit is configured to parse a bitstream to obtain a syntax element, where the syntax element is at least used to indicate that bi-directional prediction is applied.

The inter prediction unit is configured to, when a plurality of preset conditions are satisfied, perform BDOF processing on a current picture block, to obtain a predicted sample value of the current picture block, where the plurality of preset conditions include at least a condition that a size of the current picture block satisfies a first preset size. The size of the current picture block is usually represented by a width and a height (briefly written as W×H), and the width and the height are measured by sample (sample or pixel). For example, if the size of the current picture block is 8×8, the first 8 indicates that the width of the current picture block is 8 samples, and the second 8 indicates that the height of the current picture block is 8 samples. For another example, if the size of the current picture block is 8×16, 8 indicates that the width of the current picture block is 8 samples, and 16 indicates that the height of the current picture block is 16 samples.

That a size of the current picture block satisfies a first preset size includes (or is): the height H of the current picture block is greater than or equal to 8, and when a product of the width W and the height H of the current picture block is equal to 64, the width W is not equal to the height H.

Alternatively, that a size of the current picture block satisfies a first preset size includes (or is): the height H of the current picture block is greater than or equal to 8, and the width W of the current picture block is greater than or equal to 8.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes: the height H of the current picture block is greater than 8.

Alternatively, that a size of the current picture block satisfies a first preset size includes: the height H of the current picture block is greater than 8, and the width W of the current picture block is greater than or equal to 8.

The reconstruction unit is configured to determine a sample value of the current picture block based on at least the predicted sample value of the current picture block.

It should be noted that before whether to determine (or obtain through prediction) the predicted sample value of the current picture block based on a reference sample value corresponding to a first list and a reference sample value corresponding to a second list according to the BDOF technology is determined, there may be another reference condition in addition to the size of the current picture block.

The another reference condition is not limited herein. For ease of understanding, the following uses examples for description.

Condition A: There is a high-level syntax identifier sps_bdof_enabled_flag indicating that the BDOF technology is allowed to be used for a current video sequence.

Condition B: Prediction direction indication information predFlagL0 corresponding to a first list (list1) is equal to 1, and prediction direction indication information predFlagL1 corresponding to a second list (list0) is equal to 1.

Condition C: A picture order count POC_L0 of a reference frame corresponding to a first list (list0), a picture order count POC_L1 of a reference frame corresponding to a second list (list1), and a picture order count POC_Cur of a picture in which the current picture block is located satisfy the following relationship: (POC_L0−POC_Cur)×(POC_L1−POC_Cur)<0. In other words, the picture including the current picture block is between two reference pictures.

Condition D: MotionModelIdc[xCb][yCb] is equal to 0. MotionModelIdc is a motion model index for motion compensation. The MotionModelIdc[xCb][yCb] equal to 0 indicates that a motion model for motion compensation of the current block is translational motion.

Condition E: merge_subblock_flag[x0][y0] is equal to 0, where merge_subblock_flag[x0][y0] equal to 0 indicates that a subblock merge mode is not applied for the current picture block.

Condition F: sym_mvd_flag[x0][y0] is equal to 0. sym_mvd_flag[x0][y0] equal to 0 indicates that mvd_coding (x0, y0, refList, cpIdx) syntax structure is present for the current block.

Condition G: bcwIdx[xCb][yCb] is equal to 0. bcwIdx indicates a bi-directional prediction weight index for the current picture block.

Condition H: cIdx is equal to 0. cIdx represents a colour component index of the current picture block.

Condition I: The size of the current picture block is the first preset size.

Condition J: Both luma_weight_l0_flag[refIdxL0] and luma_weight_l1_flag[refIdxL1] are equal to 0, where luma_weight_l0_flag equal to 0 indicates that weighting factors for a luma component of list0 prediction are not present, and luma_weight_l1_flag equal to 0 indicates that weighting factors for a luma component of list1 prediction are not present.

For example, when all of the conditions A to J are satisfied, it is determined that the BDOF technology may be used to predict the predicted sample value of the current picture block. For example, bdofFlag is set to true. It should be noted that the foregoing conditions are merely examples, and another condition may be further added, or one or more of the foregoing conditions may be replaced, or one or more of the foregoing conditions may be removed.

It should be understood that the current picture block (which is also referred to as a current block) herein may be understood as a picture block that is being processed. For example, in a decoding process, the current picture block is a picture block that is being decoded (a decoding block).

In this embodiment of this application, a condition determining action may be further included. For example, the inter prediction unit is further configured to determine whether the plurality of preset conditions are satisfied.

It may be understood that another case may be further obtained with reference to the foregoing cases, and the another case also falls within the protection scope of this application.

To be specific, a condition for enabling or using the BDOF technology in this solution is different from a condition for enabling or using the BDOF technology in the other approaches, and in particular, requirements for the size of the current picture block are different. The BDOF technology is used for the current picture block having the first preset size, so that a predicted sample value closer to an original sample value can be obtained, and coding complexity can be properly controlled. This balances encoding/decoding complexity and prediction accuracy to some extent, thereby improving coding efficiency.

In an optional solution, the syntax element includes an index (for example, merge_idx[xCb][yCb]) of target candidate motion information, the target candidate motion information includes target candidate motion vectors, reference frame indices, and prediction direction indication information (for example, predFlagL0=1 and predFlagL1=1), the prediction direction indication information is used to indicate that bi-directional prediction is applied, the target candidate motion vectors include a first motion vector corresponding to a first list (that is, list0) and a second motion vector corresponding to a second list (that is, list1), and the reference frame indices include an index (for example, refIdxL0) of a first reference frame corresponding to the first list and an index (for example, refIdxL1) of a second reference frame corresponding to the second list.

In this embodiment of this application, the reference frame index is used to identify a reference picture corresponding to a used motion vector (for example, the first motion vector or the second motion vector) in a specified reference picture list (the first list list0 or the second list list1). The picture may be referred to as a frame, and the reference picture may be referred to as a reference frame.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, the syntax element includes first indices, second indices, prediction direction indication information, and a MVD, the first indices (for example, mvp_lX_flag[xCb][yCb]) are used to indicate target candidate motion vector predictors, the target candidate motion vector predictors include a first motion vector predictor corresponding to a first list (for example, list0) and a second motion vector predictor corresponding to a second list (for example, list1), and the MVD includes a first MVD corresponding to the first list and/or a second MVD corresponding to the second list (for example, when only one MVD is included, an MVD that is not transmitted may be derived based on the transmitted MVD). The second indices (or reference frame indices) are used to indicate reference frames of the current picture block, and the reference frames include a first reference frame corresponding to the first list and a second reference frame corresponding to the second list. For example, the second indices are refIdxL0 and refIdxL1, refIdxL0 is an index of the first reference frame corresponding to the first list, and refIdxL1 is an index of the second reference frame corresponding to the second list. The prediction direction indication information (for example, predFlagL0=1 and predFlagL1=1) is used to indicate that bi-directional prediction is applied.

A first motion vector (for example, Mv0_L0) corresponding to the first list is obtained based on the first motion vector predictor (for example, Mvp0_L0) corresponding to the first list and the first MVD (for example, MVD0) corresponding to the first list. For example, Mv0_L0=Mvp0_L0+MVD0.

A second motion vector (for example, Mv1_L1) corresponding to the second list is obtained based on the second motion vector predictor (for example, Mvp1_L1) corresponding to the second list and the second MVD (for example, MVD1) corresponding to the second list. For example, Mv1_L1=Mvp1_L1+MVD1.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, the entropy decoding unit is configured to parse the bitstream to obtain a sample residual and the syntax element, and the reconstruction unit is configured to determine the sample value of the current picture block based on the sample residual and the predicted sample value of the current picture block.

According to a ninth aspect, an embodiment of this application provides a video decoding device, and the video decoding device includes an entropy decoding unit, an inter prediction unit, and a reconstruction unit.

The entropy decoding unit is configured to parse a bitstream to obtain a syntax element, where the syntax element is at least used to indicate that bi-directional prediction is applied.

The inter prediction unit is configured to, when a size of a current picture block is a second preset size, determine (or obtain through prediction) a predicted sample value of the current picture block (for example, prediction samples of the current coding unit) in a first processing manner based on a reference sample value corresponding to a first list (that is, list0) and a reference sample value corresponding to a second list (that is, list1), where the first processing manner is not BDOF. In other words, when the size of the current picture block is the second preset size, the BDOF is not allowed to be used to determine the predicted sample value of the current picture block based on the reference sample value corresponding to the first list and the reference sample value corresponding to the second list. The size of the current picture block is usually represented by a width and a height (briefly written as W×H), and the width and the height are measured by sample (sample or pixel). The second preset size includes 8×8 (the first 8 indicates that the width of the current picture block is 8 samples, and the second 8 indicates that the height of the current picture block is 8 samples), 4×N (4 indicates that the width of the current picture block is 4 samples, N indicates that the height of the current picture block is N samples, and other sizes are deduced by analogy), 8×16, or 16×8. N is a power of 2 and is greater than or equal to 8. For example, a value of N may be 16, 32, 64, or the like.

In this embodiment of this application, the reference sample value corresponding to the first list and the reference sample value corresponding to the second list are respectively obtained through prediction based on a first motion vector (for example, Mv0_L0) corresponding to the first list (that is, list0) and a second motion vector (for example, Mv1_L1) corresponding to the second list (that is, list1). For example, the reference sample value corresponding to the first list (that is, list0) can be determined based on the first motion vector (for example, Mv0_L0) corresponding to the first list (that is, list0), and the reference sample value corresponding to the second list (that is, list1) can be determined based on the second motion vector (for example, Mv1_L1) corresponding to the second list (that is, list1).

The reconstruction unit is configured to determine a sample value of the current picture block based on at least the predicted sample value of the current picture block.

It should be understood that the current picture block (or a current block) herein may be understood as a picture block that is being processed. For example, in a decoding process, the current picture block is a picture block that is being decoded (a decoding block).

Further, the foregoing described case that the second preset size includes 8×8, 4×N, 8×16, or 16×8 may also be limited to the second preset size is 8×8, 4×N, 8×16, or 16×8. In other words, the BDOF is prohibited from being used for one of the sizes 8×8, 4×N, 8×16, and 16×8 that are listed above, or the BDOF may be prohibited from being used for a plurality of sizes thereof. The following uses examples for description.

Example 1: The second preset size includes (or is) 8×8. In other words, in this embodiment of this application, the BDOF is prohibited from being used for the size 8×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is 8×8, obtaining the predicted sample value of the current picture block through prediction in the first processing manner based on the reference sample value corresponding to the first list and the reference sample value corresponding to the second list.

Example 2: The second preset size includes (or is) 4×N. In other words, in this embodiment of this application, the BDOF is prohibited from being used for the size 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is 4×N, obtaining the predicted sample value of the current picture block through prediction in the first processing manner based on the reference sample value corresponding to the first list and the reference sample value corresponding to the second list, where N is greater than or equal to 8.

Example 3: The second preset size includes (or is) 8×8 or 4×N. In other words, in this embodiment of this application, the BDOF is prohibited from being used for the sizes 8×8 and 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is either of 8×8 and 4×N, obtaining the predicted sample value of the current picture block through prediction in the first processing manner based on the reference sample value corresponding to the first list and the reference sample value corresponding to the second list, where N is greater than or equal to 8.

Example 4: The second preset size includes (or is) 8×8, 4×N, 8×16, or 16×8, where N is greater than or equal to 8. In other words, in this embodiment of this application, the BDOF is prohibited from being used for the sizes 8×8, 4×N, 8×16, and 16×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is any one of 8×8, 4×N, 8×16, and 16×8, obtaining the predicted sample value of the current picture block through prediction in the first processing manner based on the reference sample value corresponding to the first list and the reference sample value corresponding to the second list.

Example 5: The second preset size includes (or is) N×8, where N is greater than or equal to 4. In other words, in this embodiment of this application, the BDOF is prohibited from being used for the size N×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is N×8, obtaining the predicted sample value of the current picture block through prediction in the first processing manner based on the reference sample value corresponding to the first list and the reference sample value corresponding to the second list.

Example 6: The second preset size includes (or is) N×8 or 4×N, where N is greater than or equal to 4. In other words, in this embodiment of this application, the BDOF is prohibited from being used for the size N×8 or 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is N×8 or 4×N, obtaining the predicted sample value of the current picture block through prediction in the first processing manner based on the reference sample value corresponding to the first list and the reference sample value corresponding to the second list.

In addition, because the BDOF is also prohibited from being used for a size M×4 in some scenarios, in this application, when the BDOF is prohibited from being used for the second preset size, the BDOF may be further prohibited from being used for the size M×4, where M is an integer greater than or equal to 4.

It may be understood that another case may be further obtained with reference to the foregoing cases, and the another case also falls within the protection scope of this application.

According to the foregoing method, features of current picture blocks of various sizes are fully considered when the BDOF technology is used. When the size of the current picture block is the second preset size, the predicted sample value of the current picture block is determined according to a technology other than the BDOF technology. This significantly reduces coding complexity, and improves coding efficiency.

In an optional solution, in a process of obtaining the predicted sample value of the current picture block through prediction in the first processing manner based on the reference sample value corresponding to the first list and the reference sample value corresponding to the second list, the inter prediction unit is configured to perform weighted calculation on sample values having a same location in the reference sample value corresponding to the first list and the reference sample value corresponding to the second list, to obtain the predicted sample value of the current picture block, or obtain the predicted sample value of the current picture block through prediction based on the reference sample value corresponding to the first list and the reference sample value corresponding to the second list according to an MMVD technology, or obtain the predicted sample value of the current picture block through prediction based on the reference sample value corresponding to the first list and the reference sample value corresponding to the second list according to a CIIP technology, or obtain the predicted sample value of the current picture block through prediction based on the reference sample value corresponding to the first list and the reference sample value corresponding to the second list according to a DMVR technology.

In this embodiment of this application, whether the weighted calculation manner, the MMVD technology, or the CIIP technology is used may be determined by using a corresponding condition, or may be indicated by using corresponding indication information.

It should be noted that the BDOF technology is equivalent to a patch optimization technology for a conventional technology for predicting a predicted sample value of a current picture block. In many scenarios, a predicted sample value closer to a real sample value of the current picture block can be obtained according to the BDOF technology. Therefore, a sample residual obtained based on the predicted sample value is smaller, so that coding efficiency can be improved. Thus, the BDOF technology is usually used on an encoder side. To more accurately restore a predicted sample value, the BDOF technology is also correspondingly used on a decoder side. The foregoing weighted calculation manner may be considered as a conventional technology for obtaining a predicted sample value of a current picture block, and the foregoing MMVD technology, CIIP technology, and DMVR technology each may be considered as a patch optimization technology for a conventional technology. In this embodiment of this application, when the size of the current picture block is the second preset size, the predicted sample value of the current picture block is determined according to a conventional technology (for example, the weighted calculation manner) or another patch optimization technology (for example, MMVD, CIIP, or DMVR) rather than the BDOF technology. This can significantly reduce decoding complexity, and improve decoding efficiency.

In an optional solution, the inter prediction unit is further configured to, when a plurality of preset conditions are satisfied, perform BDOF processing on a current picture block, to obtain a predicted sample value of the current picture block, where the plurality of preset conditions include at least a condition that a size of the current picture block satisfies a first preset size.

That a size of the current picture block satisfies a first preset size includes (or is): the height H of the current picture block is greater than or equal to 8, and when a product of the width W and the height H of the current picture block is equal to 64, the width W is not equal to the height H.

Alternatively, that a size of the current picture block satisfies a first preset size includes (or is): the height H of the current picture block is greater than or equal to 8, and the width W of the current picture block is greater than or equal to 8.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes (or is): the height H of the current picture block is greater than 8.

Alternatively, that a size of the current picture block satisfies a first preset size includes (or is): the height H of the current picture block is greater than 8, and the width W of the current picture block is greater than or equal to 8.

The reconstruction unit is further configured to reconstruct the current picture block based on at least the predicted sample value of the current picture block.

To be specific, a condition for enabling or using the BDOF technology in this solution is different from a condition for enabling or using the BDOF technology in the other approaches, and in particular, requirements for the size of the current picture block are different. The BDOF technology is used for the current picture block having the first preset size, so that a predicted sample value closer to an original sample value can be obtained, and coding complexity can be properly controlled. This balances encoding/decoding complexity and prediction accuracy to some extent, thereby improving coding efficiency.

It should be noted that before whether to determine (or obtain through prediction) the predicted sample value of the current picture block based on the reference sample value corresponding to the first list and the reference sample value corresponding to the second list according to the BDOF technology is determined, there may be another reference condition in addition to the size of the current picture block. The another reference condition is not limited herein. For ease of understanding, the following uses examples for description.

Condition A: There is a high-level syntax identifier sps_bdof_enabled_flag indicating that the BDOF technology is allowed to be used for a current video sequence.

Condition B: Prediction direction indication information predFlagL0 corresponding to a first list (list1) is equal to 1, and prediction direction indication information predFlagL1 corresponding to a second list (list0) is equal to 1.

Condition C: A picture order count POC_L0 of a reference frame corresponding to a first list (list0), a picture order count POC_L1 of a reference frame corresponding to a second list (list1), and a picture order count POC_Cur of a picture in which the current picture block is located satisfy the following relationship: $(POC\_L0-POC\_Cur) \times (POC\_L1-POC\_Cur)<0$. In other words, the picture including the current picture block is between two reference pictures.

Condition D: MotionModelIdc[xCb][yCb] is equal to 0. MotionModelIdc is a motion model index for motion compensation. The MotionModelIdc[xCb][yCb] equal to 0 indicates that a motion model for motion compensation of the current block is translational motion.

Condition E: merge_subblock_flag[x0][y0] is equal to 0, where merge_subblock_flag[x0][y0] equal to 0 indicates that a subblock merge mode is not applied for the current picture block.

Condition F: sym_mvd_flag[x0][y0] is equal to 0. sym_mvd_flag[x0][y0] equal to 0 indicates that mvd_coding (x0, y0, refList, cpIdx) syntax structure is present for the current block.

Condition G: bcwIdx[xCb][yCb] is equal to 0. bcwIdx indicates a bi-directional prediction weight index for the current picture block.

Condition H: cIdx is equal to 0. cIdx represents a colour component index of the current picture block.

Condition I: The size of the current picture block is the first preset size.

Condition J: Both luma_weight_l0_flag[refIdxL0] and luma_weight_l1_flag[refIdxL1] are equal to 0, where luma_weight_l0_flag equal to 0 indicates that weighting factors for a luma component of list0 prediction are not present, and luma_weight_l1_flag equal to 0 indicates that weighting factors for a luma component of list1 prediction are not present.

For example, when all of the conditions A to J are satisfied, it is determined that the BDOF technology may be used to predict the predicted sample value of the current picture block. For example, bdofFlag is set to true. It should be noted that the foregoing conditions are merely examples, and another condition may be further added, or one or more of the foregoing conditions may be replaced, or one or more of the foregoing conditions may be removed.

In an optional solution, the syntax element includes an index (for example, merge_idx[xCb][yCb]) of target candidate motion information, the target candidate motion information includes target candidate motion vectors, reference frame indices, and prediction direction indication information (for example, predFlagL0=1 and predFlagL1=1), the prediction direction indication information is used to indicate that bi-directional prediction is applied, the target candidate motion vectors include the first motion vector corresponding to the first list (that is, list0) and the second motion vector corresponding to the second list (that is, list1), and the reference frame indices include an index (for example, refIdxL0) of a first reference frame corresponding to the first list and an index (for example, refIdxL1) of a second reference frame corresponding to the second list.

In this embodiment of this application, the reference frame index is used to identify a reference picture corresponding to a used motion vector (for example, the first motion vector or the second motion vector) in a specified reference picture list (the first list list0 or the second list list1). The picture may be referred to as a frame, and the reference picture may be referred to as a reference frame.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, the syntax element includes first indices, second indices, prediction direction indication information, and an MVD, the first indices (for example, mvp_lX_flag[xCb][yCb]) are used to indicate target candidate motion vector predictors, the target candidate motion vector predictors include a first motion vector predictor corresponding to the first list (for example, list0) and a second motion vector predictor corresponding to the second list (for example, list1), and the MVD includes a first MVD corresponding to the first list and/or a second MVD corresponding to the second list (optionally, when the MMVD technology is used, only one MVD may be transmitted, and an MVD that is in another direction and that needs to be used by a decoder side may be derived based on the transmitted MVD). The second indices (which are also referred to as reference frame indices) are used to indicate reference frames of the current picture block, and the reference frames include a first reference frame corresponding to the first list and a second reference frame corresponding to the second list. For example, the second indices are refIdxL0 and refIdxL1, refIdxL0 is an index of the first reference frame corresponding to the first list, and refIdxL1 is an index of the second reference frame corresponding to the second list. The prediction direction indication information (for example, predFlagL0=1 and predFlagL1=1) is used to indicate that bi-directional prediction is applied.

The first motion vector (for example, Mv0_L0) corresponding to the first list is obtained based on the first motion vector predictor (for example, Mvp0_L0) corresponding to the first list and the first MVD (for example, MVD0) corresponding to the first list. For example, Mv0_L0=Mvp0_L0+MVD0.

The second motion vector (for example, Mv1_L1) corresponding to the second list is obtained based on the second motion vector predictor (for example, Mvp1_L1) corresponding to the second list and the second MVD (for example, MVD1) corresponding to the second list. For example, Mv1_L1=Mvp1_L1+MVD1.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In an optional solution, the entropy decoding unit is configured to parse the bitstream to obtain a sample residual and the syntax element, and the reconstruction unit is configured to determine the sample value of the current picture block based on the sample residual and the predicted sample value of the current picture block.

According to a tenth aspect, an embodiment of this application provides an inter prediction apparatus (for example, an inter prediction unit), and the inter prediction apparatus includes a determining unit configured to determine whether a current picture block satisfies a plurality of preset conditions, and an inter prediction processing unit configured to, when the plurality of preset conditions is satisfied, perform BDOF processing on the current picture block, to obtain a predicted sample value of the current picture block, where the plurality of preset conditions include at least a condition that a size of the current picture block satisfies a first preset size. The size of the current picture block is usually represented by a width and a height (briefly written as W×H), and the width and the height are measured by sample (sample or pixel). For example, if the size of the current picture block is 8×8, the first 8 indicates that the width of the current picture block is 8 samples, and the second 8 indicates that the height of the current picture block is 8 samples. For another example, if the size of the current picture block is 8×16, 8 indicates that the width of the current picture block is 8 samples, and 16 indicates that the height of the current picture block is 16 samples.

That a size of the current picture block satisfies a first preset size includes (or is): the height H of the current picture block is greater than or equal to 8, and when a product of the width W and the height H of the current picture block is equal to 64, the width W is not equal to the height H.

Alternatively, that a size of the current picture block satisfies a first preset size includes (or is): the height H of the current picture block is greater than or equal to 8, and the width W of the current picture block is greater than or equal to 8.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes: the height H of the current picture block is greater than 8.

Alternatively, that a size of the current picture block satisfies a first preset size includes: the height H of the current picture block is greater than 8, and the width W of the current picture block is greater than or equal to 8.

It should be noted that before whether to determine (or obtain through prediction) the predicted sample value of the current picture block based on a reference sample value corresponding to a first list and a reference sample value corresponding to a second list according to the BDOF technology is determined, there may be another reference condition in addition to the size of the current picture block. The another reference condition is not limited herein. For ease of understanding, the following uses examples for description.

Condition A: There is a high-level syntax identifier sps_bdof_enabled_flag indicating that the BDOF technology is allowed to be used for a current video sequence.

Condition B: Prediction direction indication information predFlagL0 corresponding to a first list (list1) is equal to 1, and prediction direction indication information predFlagL1 corresponding to a second list (list0) is equal to 1.

Condition C: A picture order count POC_L0 of a reference frame corresponding to a first list (list0), a picture order count POC_L1 of a reference frame corresponding to a second list (list1), and a picture order count POC_Cur of a picture in which the current picture block is located satisfy the following relationship: (POC_L0−POC_Cur)× (POC_L1−POC_Cur)<0. In other words, the picture including the current picture block is between two reference pictures.

Condition D: MotionModelIdc[xCb][yCb] is equal to 0. MotionModelIdc is a motion model index for motion compensation. The MotionModelIdc[xCb][yCb] equal to 0 indicates that a motion model for motion compensation of the current block is translational motion.

Condition E: merge_subblock_flag[x0][y0] is equal to 0, where merge_subblock_flag[x0][y0] equal to 0 indicates that a subblock merge mode is not applied for the current picture block.

Condition F: sym_mvd_flag[x0][y0] is equal to 0. sym_mvd_flag[x0][y0] equal to 0 indicates that mvd_coding (x0, y0, refList, cpIdx) syntax structure is present for the current block.

Condition G: bcwIdx[xCb][yCb] is equal to 0. bcwIdx indicates a bi-directional prediction weight index for the current picture block.

Condition H: cIdx is equal to 0. cIdx represents a colour component index of the current picture block.

Condition I: The size of the current picture block is the first preset size.

Condition J: Both luma_weight_l0_flag[refIdxL0] and luma_weight_l1_flag[refIdxL1] are equal to 0, where luma_weight_l0_flag equal to 0 indicates that weighting factors for a luma component of list0 prediction are not present, and luma_weight_l1_flag equal to 0 indicates that weighting factors for a luma component of list1 prediction are not present.

For example, when all of the conditions A to J are satisfied, it is determined that the BDOF technology may be used to predict the predicted sample value of the current picture block. For example, bdofFlag is set to true. It should be noted that the foregoing conditions are merely examples, and another condition may be further added, or one or more of the foregoing conditions may be replaced, or one or more of the foregoing conditions may be removed.

It should be understood that the current picture block (or a current block) herein may be understood as a picture block that is being processed. For example, in an encoding process, the current picture block is a picture block that is being encoded (an encoding block). Certainly, the current picture block herein may be alternatively understood as a picture block that is being processed. For example, in a decoding process, the current picture block is a picture block that is being decoded (a decoding block).

In an optional solution, the inter prediction processing unit is further configured to, when at least one of the plurality of preset conditions is not satisfied, skip performing BDOF processing on the current picture block.

It may be understood that another case may be further obtained with reference to the foregoing cases, and the another case also falls within the protection scope of this application.

It should be understood that the method in this embodiment of this application may be performed by a video encoder or an electronic device having a video encoding function, or may be performed by a video decoder or an electronic device having a video decoding function. For example, the method may be performed by an inter prediction unit in these devices.

To be specific, a condition for enabling or using the BDOF technology in this solution is different from a condition for enabling or using the BDOF technology in the other approaches, and in particular, requirements for the size of the current picture block are different. The BDOF technology is used for the current picture block having the first preset size, so that a predicted sample value closer to an original sample value can be obtained, and coding complexity can be properly controlled. This balances encoding/decoding complexity and prediction accuracy to some extent, thereby improving coding efficiency.

According to an eleventh aspect, an embodiment of this application provides a video data decoding device, and the device includes a memory configured to store video data in a form of a bitstream, and a video decoder configured to decode the bitstream to obtain a syntax element, where the syntax element is at least used to indicate that bi-directional prediction is applied, and when a plurality of preset conditions are satisfied, perform BDOF processing on a current picture block, to obtain a predicted sample value of the current picture block, where the plurality of preset conditions include at least a condition that a size of the current picture block satisfies a first preset size.

That a size of the current picture block satisfies a first preset size includes: the height H of the current picture block is greater than or equal to 8, and when a product of the width W and the height H of the current picture block is equal to 64, the width W is not equal to the height H.

Alternatively, that a size of the current picture block satisfies a first preset size includes: the height H of the current picture block is greater than or equal to 8, and the width W of the current picture block is greater than or equal to 8.

Alternatively, that a size of the current picture block satisfies a first preset size includes: the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes: the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes: the height H of the current picture block is greater than 8.

Alternatively, that a size of the current picture block satisfies a first preset size includes: the height H of the current picture block is greater than 8, and the width W of the current picture block is greater than or equal to 8.

According to a twelfth aspect, an embodiment of this application provides a video data encoding device, and the device includes a memory configured to store video data, where the video data includes one or more picture blocks, and a video encoder configured to, when a plurality of preset conditions are satisfied, perform BDOF processing on a current picture block, to obtain a predicted sample value of the current picture block, where the plurality of preset conditions include at least a condition that a size of the current picture block satisfies a first preset size.

That a size of the current picture block satisfies a first preset size includes: the height H of the current picture block is greater than or equal to 8, and when a product of the width W and the height H of the current picture block is equal to 64, the width W is not equal to the height H.

Alternatively, that a size of the current picture block satisfies a first preset size includes: the height H of the current picture block is greater than or equal to 8, and the width W of the current picture block is greater than or equal to 8.

Alternatively, that a size of the current picture block satisfies a first preset size includes: the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes: the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes: the height H of the current picture block is greater than 8.

Alternatively, that a size of the current picture block satisfies a first preset size includes: the height H of the current picture block is greater than 8, and the width W of the current picture block is greater than or equal to 8.

The video encoder is further configured to encode a syntax element into a to-be-transmitted bitstream, where the syntax element is at least used to indicate that bi-directional prediction is applied.

According to a thirteenth aspect, an embodiment of this application provides an encoding device, including a non-volatile memory and a processor that are coupled to each other.

The processor invokes program code stored in the memory to perform some or all steps of any method in the first aspect.

According to a fourteenth aspect, an embodiment of this application provides a decoding device, including a non-volatile memory and a processor that are coupled to each other. The processor invokes program code stored in the memory to perform some or all steps of any method in the third aspect.

According to a fifteenth aspect, an embodiment of this application provides a computer-readable storage medium. The computer-readable storage medium stores program code, and the program code includes an instruction used to perform some or all steps of any method in the first aspect.

According to a sixteenth aspect, an embodiment of this application provides a computer program product. When the computer program product is run on a computer, the computer is enabled to perform some or all steps of any method in the first aspect.

It should be understood that technical solutions in the second to the sixteenth aspects of this application are consistent with technical solutions in the first aspect of this application, and beneficial effects achieved by the aspects and corresponding feasible implementations are similar. Details are not described again.

BRIEF DESCRIPTION OF DRAWINGS

To describe the technical solutions in some of the embodiments of this application more clearly, the following describes the accompanying drawings for describing some of the embodiments of this application.

DESCRIPTION OF EMBODIMENTS

Figure 1A:
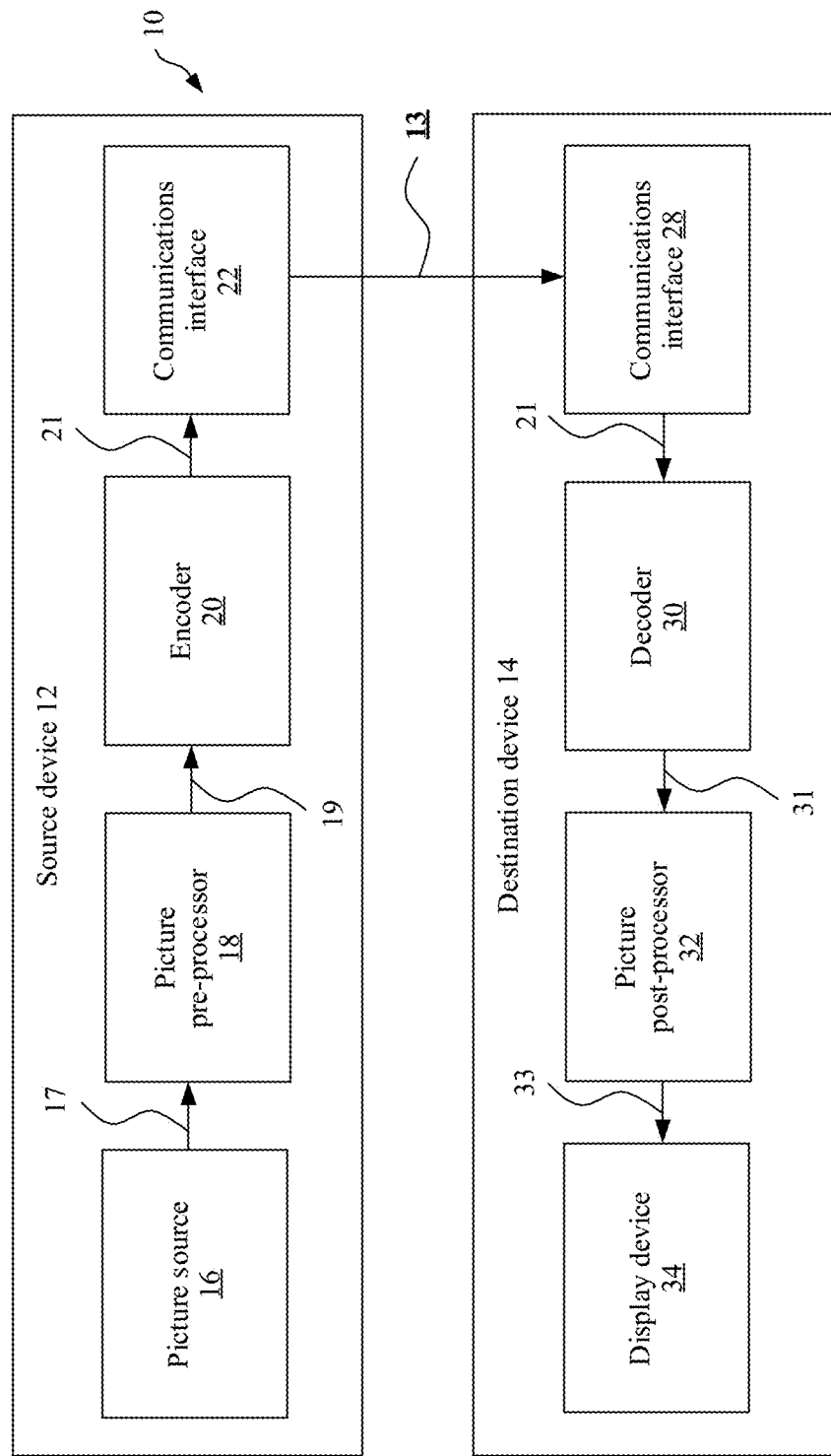
FIG. 1A is a block diagram of an example of a video encoding and decoding system for implementing an embodiment of this application.

The following describes the embodiments of this application with reference to the accompanying drawings in the embodiments of this application. In the following description, reference is made to the accompanying drawings that form a part of this disclosure and show, by way of illustration, specific aspects of the embodiments of this application or specific aspects in which the embodiments of this application may be used. It should be understood that the embodiments of this application may be used in other aspects, and may include structural or logical changes not depicted in the accompanying drawings. Therefore, the following detailed description shall not be taken in a limiting sense, and the scope of this application is defined by the appended claims. For example, it should be understood that disclosed content in combination with a described method may also hold true for a corresponding device or system configured to perform the method and vice versa. For example, if one or more specific method steps are described, a corresponding device may include one or more units such as function units, to perform the described one or more method steps (for example, one unit performing the one or more steps, or a plurality of units each performing one or more of the plurality of steps), even if such one or more units are not explicitly described or illustrated in the accompanying drawings. In addition, for example, if a specific apparatus is described based on one or more units such as function units, a corresponding method may include one step used to perform functionality of the one or more units (for example, one step used to perform the functionality of the one or more units, or a plurality of steps each used to perform functionality of one or more of a plurality of units), even if such one or more steps are not explicitly described or illustrated in the accompanying drawings. Further, it should be understood that features of the various example embodiments and/or aspects described in this specification may be combined with each other, unless noted otherwise.

The technical solutions in the embodiments of this application may not only be applied to existing video coding standards (for example, standards such as H.264 and HEVC), but also be applied to future video coding standards (for example, the H.266 standard). Terms used in implementations of this application are merely intended to explain specific embodiments of this application, and are not intended to limit this application. The following first briefly describes related concepts in the embodiments of this application.

Video coding usually refers to processing a sequence of pictures that constitute a video or a video sequence. In the field of video coding, the terms "picture", "frame", and "image" may be used as synonyms. Video coding used in this specification includes video encoding and video decoding. Video encoding is performed on a source side, and usually includes processing (for example, by compressing) an original video picture to reduce an amount of data for representing the video picture, for more efficient storage and/or transmission. Video decoding is performed on a destination side, and usually includes inverse processing relative to an encoder to reconstruct the video picture. "Coding" of a video picture in the embodiments should be understood as "encoding" or "decoding" of a video sequence. A combination of an encoding part and a decoding part is also referred to as coding (encoding and decoding).

A video sequence includes a series of pictures (picture), a picture is further partitioned into slices (slice), and a slice is further partitioned into blocks (block). Video coding is performed by block. In some new video coding standards, a concept "block" is further extended. For example, a macroblock (MB) is introduced in the H.264 standard. The macroblock may further be partitioned into a plurality of prediction blocks that can be used for predictive coding (partition). In the HEVC standard, basic concepts such as "coding unit" (CU), "prediction unit" (PU), and "transform unit" (TU) are used. A plurality of block units is obtained through function division, and are described by using a new tree-based structure. For example, a CU may be partitioned into smaller CUs based on a quadtree, and the smaller CU may further be partitioned, to generate a quadtree structure. The CU is a basic unit for partitioning and encoding a coded picture. A PU and a TU also have similar tree structures. The PU may correspond to a prediction block, and is a basic unit for predictive coding. The CU is further partitioned into a plurality of PUs in a partitioning mode. The TU may correspond to a transform block, and is a basic unit used for transforming a prediction residual. However, in essence, all of the CU, the PU, and the TU are conceptually blocks (or picture blocks).

For example, in HEVC, a CTU is partitioned into a plurality of CUs by using a quadtree structure represented as a coding tree. A decision on whether to encode a picture area through inter-picture (temporal) or intra-picture (spatial) prediction is made at a CU level. Each CU may be further partitioned into one, two, or four PUs based on a PU partitioning type. In one PU, a same prediction process is applied, and related information is transmitted to a decoder on a PU basis. After obtaining a residual block by applying the prediction process based on the PU partitioning type, the CU may be partitioned into transform units (TU) based on another quadtree structure similar to the coding tree used for the CU. In the recent development of video compression technologies, a quadtree plus binary tree (QTBT) partition frame is used to partition a coding block. In a QTBT block structure, the CU may be square or rectangular.

In this specification, for ease of description and understanding, a picture block to be processed in a current picture may be referred to as a current block or a to-be-processed picture block. For example, in encoding, the picture block is a block that is being encoded, and in decoding, the picture block is a block that is being decoded. A decoded picture block, in a reference picture, used to predict the current block is referred to as a reference block. To be specific, the reference block is a block that provides a reference signal for the current block, and the reference signal represents a sample value in the picture block. A block that provides a prediction signal for a current block in a reference picture may be referred to as a prediction block. The prediction signal represents a pixel value, a sampling value, or a sampling signal in the prediction block. For example, after a plurality of reference blocks are traversed, an optimal reference block is found. The optimal reference block provides prediction for the current block, and this block is referred to as a prediction block.

In a case of lossless video coding, original video pictures can be reconstructed. To be specific, reconstructed video pictures have same quality as the original video pictures (assuming that no transmission loss or other data loss occurs during storage or transmission). In a case of lossy video coding, further compression is performed through, for example, quantization, to reduce an amount of data required for representing video pictures, and the video pictures cannot be completely reconstructed at a decoder side. To be specific, quality of reconstructed video pictures is lower or poorer than that of the original video pictures.

Several H.261 video coding standards are for "lossy hybrid video coding" (to be specific, spatial and temporal prediction in a sample domain is combined with two-dimensional (2D) transform coding for applying quantization in a transform domain). Each picture of a video sequence is usually partitioned into a set of non-overlapping blocks, and coding is usually performed at a block level. To be specific, at an encoder side, a video is usually processed, that is, encoded, at a block (video block) level. For example, a prediction block is generated through spatial (intra-picture) prediction and temporal (inter-picture) prediction, the prediction block is subtracted from a current block (block being processed or to be processed) to obtain a residual block, and the residual block is transformed in the transform domain and quantized to reduce an amount of data that is to be transmitted (compressed). At a decoder side, an inverse processing part relative to the encoder is applied to an encoded block or a compressed block to reconstruct the current block for representation. Furthermore, the encoder duplicates a decoder processing loop, so that the encoder and the decoder generate same prediction (for example, intra prediction and inter prediction) and/or reconstruction, to process, that is, to encode, subsequent blocks.

The following describes a system architecture to which the embodiments of this application are applied. FIG. 1A is a schematic block diagram of an example of a video encoding and decoding system 10 to which the embodiments of this application are applied. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a random-access memory (RAM), a read-only memory (ROM), an electrically erasable programmable ROM (EEPROM), a flash memory, or any other medium that can be used to store desired program code in a form of an instruction or a data structure accessible to a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, an in-vehicle computer, a wireless communications device, or the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13. The destination device 14 may receive the encoded video data from the source device 12 through the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission cables. The one or more communications media may be a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20. Optionally, the source device 12 may further include a picture source 16, a picture preprocessor 18, and a communications interface 22. In a specific implementation form, the encoder 20, the picture source 16, the picture preprocessor 18, and the communications interface 22 may be hardware components in the source device 12, or may be software programs in the source device 12. Descriptions are separately provided as follows.

The picture source 16 may include or be any type of picture capturing device configured to, for example, capture a real-world picture, and/or any type of device for generating a picture or comment (for screen content encoding, some text on a screen is also considered as a part of a to-be-encoded picture or image), for example, a computer graphics processor configured to generate a computer animation picture, or any type of device configured to obtain and/or provide a real-world picture or a computer animation picture (for example, screen content or a virtual reality (VR) picture), and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or or a picture is obtained or received. When the picture source 16 is a camera, the picture source 16 may be, for example, a local camera, or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generating device. The external picture generating device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements (picture element). The picture element in the array may also be referred to as a sample. A quantity of samples in horizontal and vertical directions (or axes) of the array or the picture defines a size and/or resolution of the picture. For representation of color, three color components are usually employed, to be specific, the picture may be represented as or include three sample arrays. For example, in a red, green, and blue (RGB) format or a color space, a picture includes corresponding red, green, and blue sample arrays. However, in video coding, each sample is usually represented in a luminance/chrominance format or color space. For example, a picture in a luma, blue projection, and red projection (YUV) format includes a luminance component indicated by Y (sometimes indicated by L alternatively) and two chrominance components indicated by U and V. The luminance (luma) component Y represents brightness or gray level intensity (for example, both are the same in a gray-scale picture), and the two chrominance (chroma) components U and V represent chrominance or color information components. Correspondingly, the picture in the YUV format includes a luminance sample array of luminance sample values (Y) and two chrominance sample arrays of chrominance values (U and V). Pictures in an RGB format may be transformed or converted to a YUV format and vice versa. This process is also referred to as color conversion or transformation. If a picture is monochrome, the picture may include only a luminance sample array. In this embodiment of this application, a picture transmitted by the picture source 16 to the picture processor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from an RGB format to a YUV format), color correction, or de-noising.

The encoder 20 (also referred to as a video encoder 20) is configured to receive the preprocessed picture data 19, and process the preprocessed picture data 19 in a related prediction mode (such as a prediction mode in the embodiments of this specification), to provide encoded picture data 21 (structural details of the encoder 20 are further described below based on FIG. 2, FIG. 4, or FIG. 5A). In some embodiments, the encoder 20 may be configured to perform various embodiments described below, to implement encoder-side application of a chroma block prediction method described in this application.

The communications interface 22 may be configured to receive the encoded picture data 21, and transmit the encoded picture data 21 to the destination device 14 or any other device (for example, a memory) through the link 13 for storage or direct reconstruction. The other device may be any device used for decoding or storage. The communications interface 22 may be, for example configured to encapsulate the encoded picture data 21 into an appropriate format, for example, a data packet, for transmission over the link 13.

The destination device 14 includes a decoder 30. Optionally, the destination device 14 may further include a communications interface 28, a picture post-processor 32, and a display device 34. Descriptions are separately provided as follows.

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection. The any type of network is, for example, a wired or wireless network or any combination thereof, or any type of private or public network, or any combination thereof. The communications interface 28 may be, for example configured to decapsulate the data packet transmitted through the communications interface 22, to obtain the encoded picture data 21.

Both the communications interface 28 and the communications interface 22 may be configured as unidirectional communications interfaces or bi-directional communications interfaces, and may be configured to, for example, send and receive messages to establish a connection, and acknowledge and exchange any other information related to a communication link and/or data transmission such as encoded picture data transmission.

The decoder 30 is configured to receive the encoded picture data 21 and provide decoded picture data 31 or a decoded picture 31 (structural details of the decoder 30 are further described below based on FIG. 3, FIG. 4, or FIG. 5A). In some embodiments, the decoder 30 may be configured to perform various embodiments described below, to implement decoder-side application of a chroma block prediction method described in this application.

The picture post-processor 32 is configured to post-process the decoded picture data 31 (also referred to as reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or may include any type of display for presenting a reconstructed picture, for example, an integrated or external display or monitor. For example, the display may include a liquid-crystal display (LCD), an organic light-emitting diode (LED) (OLED) display, a plasma display, a projector, a micro LED display, a liquid crystal on silicon (LCoS), a digital light processor (DLP), or any type of other display.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, existence and (exact) division of functionalities of different units or functionalities of the source device 12 and/or the destination device 14 shown in FIG. 1A may vary depending on an actual device and application. The source device 12 and the destination device 14 may include any of a wide range of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any of various suitable circuits, for example, one or more microprocessors, digital signal processors (DSP), application-specific integrated circuits (ASIC), field-programmable gate arrays (FPGA), discrete logic, hardware, or any combination thereof. If the technologies are implemented partially by using software, a device may store a software instruction in a suitable non-transitory computer-readable storage medium and may execute the instruction by using hardware such as one or more processors, to perform the technologies of this disclosure. Any of the foregoing content (including hardware, software, a combination of hardware and software, and the like) may be considered as one or more processors.

In some cases, the video encoding and decoding system 10 shown in FIG. 1A is merely an example and the techniques of this application may be applied to video coding settings (for example, video encoding or video decoding) that do not necessarily include any data communication between an encoding device and a decoding device. In another example, data may be retrieved from a local memory, streamed over a network, or the like. A video encoding device may encode the data and store the data into a memory, and/or a video decoding device may retrieve the data from the memory and decode the data. In some examples, devices that only encode data and store the data in the memory and/or retrieve the data from the memory and decode the data and that do not communicate with each other perform encoding and decoding.

Figure 1B:
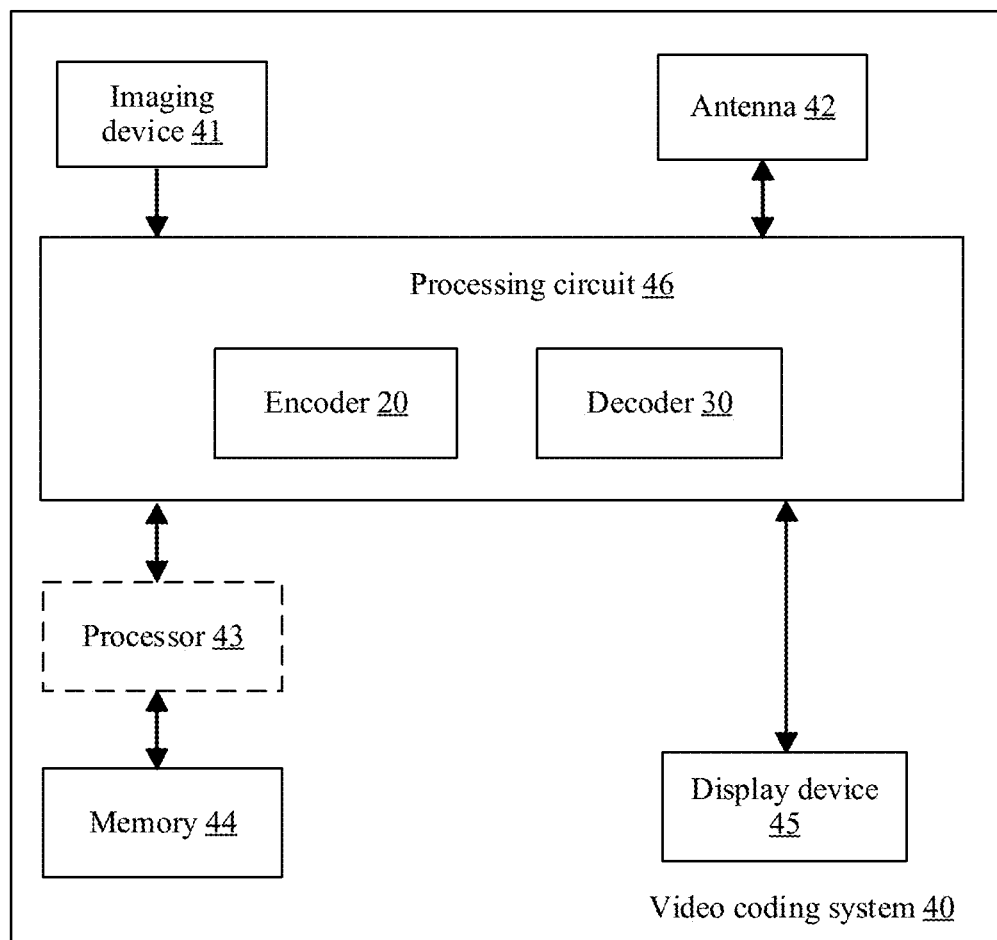
FIG. 1B is a block diagram of an example of a video coding system for implementing an embodiment of this application.
Figure 2:
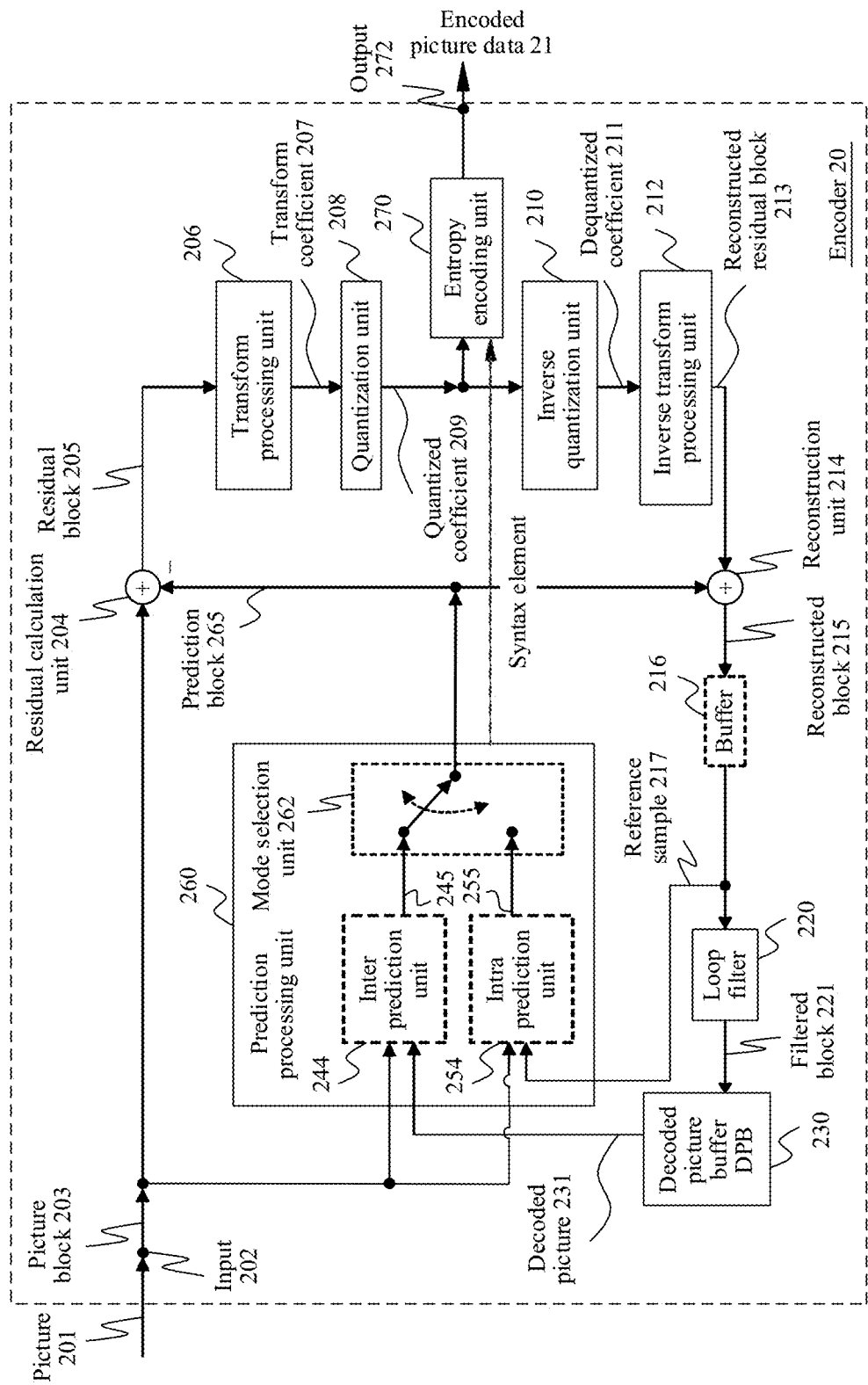
FIG. 2 is a block diagram of an example structure of an encoder for implementing an embodiment of this application.
Figure 3:
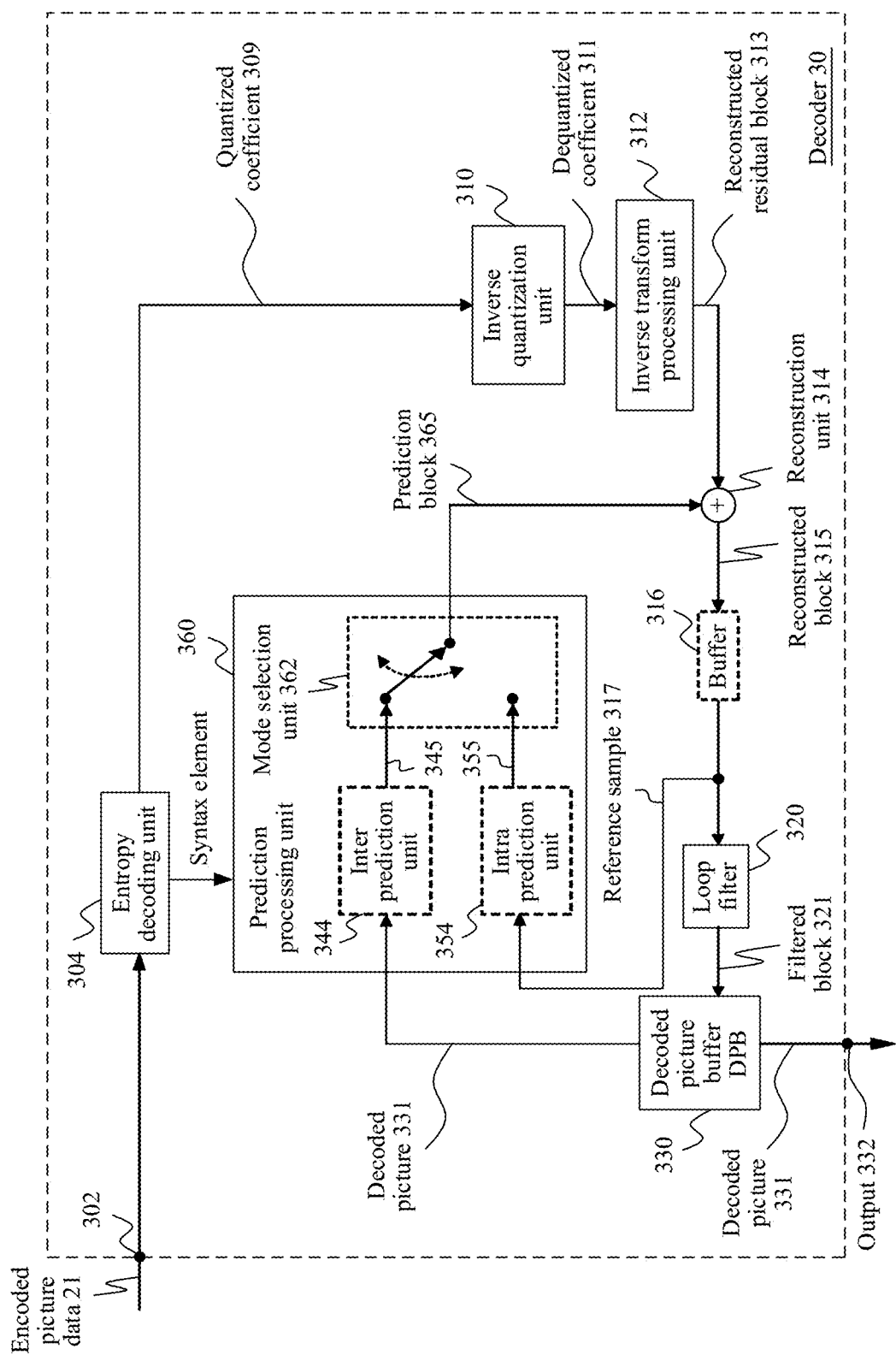
FIG. 3 is a block diagram of an example structure of a decoder for implementing an embodiment of this application.

FIG. 1B is an illustrative diagram of an example of a video coding system 40 including the encoder 20 in FIG. 2 and/or the decoder 30 in FIG. 3 according to an example embodiment. The video coding system 40 can implement a combination of various technologies in the embodiments of this application. In the illustrated implementation, the video coding system 40 may include an imaging device 41, the encoder 20, the decoder 30 (and/or a video encoder/decoder implemented by a logic circuit 47 of a processing circuit 46), an antenna 42, one or more processors 43, one or more memories 44, and/or a display device 45.

As shown in FIG. 1B, the imaging device 41, the antenna 42, the processing circuit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. Further, in some examples, the display device 45 may be configured to present the video data. In some examples, the logic circuit 47 may be implemented by the processing circuit 46. The processing circuit 46 may include ASIC logic, a graphics processor, a general-purpose processor, or the like. The video coding system 40 may also include the optional processor 43. The optional processor 43 may similarly include ASIC logic, a graphics processor, a general-purpose processor, or the like. In some examples, the logic circuit 47 may be implemented by hardware, for example, dedicated hardware for video coding. The processor 43 may be implemented by general-purpose software, an operating system, or the like. In addition, the memory 44 may be any type of memory, for example, a volatile memory (for example, a static RAM (SRAM) or a dynamic RAM (DRAM)), or a nonvolatile memory (for example, a flash memory). In a non-restrictive example, the memory 44 may be implemented by cache memory. In some examples, the logic circuit 47 may access the memory 44 (for example, for implementing a picture buffer). In other examples, the logic circuit 47 and/or the processing circuit 46 may include a memory (for example, a cache) for implementing a picture buffer.

In some examples, the video encoder 20 implemented by using the logic circuit may include a picture buffer (which is implemented by, for example, the processing circuit 46 or the memory 44) and a graphics processing unit (GPU) (which is implemented by, for example, the processing circuit 46). The graphics processing unit may be communicatively coupled to the picture buffer. The GPU may include the encoder 20 implemented by the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by using the logic circuit may include a picture buffer (which is implemented by the processing circuit 46 or the memory 44) and a graphics processing unit (which is implemented by, for example, the processing circuit 46). The graphics processing unit may be communicatively coupled to the picture buffer. The graphics processing unit may include the decoder 30 implemented by the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like that is related to video frame encoding and that is described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of this application, for the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy-encode the syntax element into an encoded video bitstream. In such examples, the decoder 30 may parse the syntax element and correspondingly decode the related video data.

It should be noted that the video picture encoding method described in the embodiments of this application is performed on the encoder 20, and the video picture decoding method described in the embodiments of this application is performed on the decoder 30. The encoder 20 and the decoder 30 in the embodiments of this application may be, for example, an encoder/a decoder corresponding to a video standard protocol such as H.263, H.264, HEVC, MPEG-2, MPEG-4, VP8, or VP9, or a next-generation video standard protocol (such as H.266).

FIG. 2 is a schematic/conceptual block diagram of an example of an encoder 20 configured to implement an embodiment of this application. In the example in FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a reverse signal path of the encoder. The reverse signal path of the encoder corresponds to a signal path of a decoder (refer to a decoder 30 in FIG. 3).

The encoder 20 receives, for example, via an input 202, a picture 201 or a picture block 203 of the picture 201, for example, a picture in a sequence of pictures forming a video or a video sequence. The picture block 203 may also be referred to as a current picture block or a to-be-encoded picture block, and the picture 201 may be referred to as a current picture or a to-be-encoded picture (particularly in video coding, to distinguish the current picture from other pictures, for example, previously encoded and/or decoded pictures in a same video sequence, namely, the video sequence that also includes the current picture).

An embodiment of the encoder 20 may include a partitioning unit (not depicted in FIG. 2) configured to partition the picture 201 into a plurality of blocks such as the picture block 203. The picture 201 is usually partitioned into a plurality of non-overlapping blocks. The partitioning unit may be configured to use a same block size for all pictures in a video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning technologies described above.

Like the picture 201, the picture block 203 is also or may be considered as a two-dimensional array or matrix of samples with sample values, although a size of the picture block 203 is smaller than a size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the picture block 203 defines a size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (further details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. Compared with an orthogonal DCT transform, such integer approximations are usually scaled based on a factor. To preserve a norm of a residual block which is processed by using forward and inverse transforms, an additional scale factor is applied as a part of the transform process. The scale factor is usually selected based on some constraints, for example, the scale factor being a power of two for a shift operation, a bit depth of the transform coefficient, and a tradeoff between accuracy and implementation costs. For example, a specific scale factor is specified for the inverse transform by, for example, the inverse transform processing unit 212 at the decoder 30 side (and a corresponding inverse transform by, for example, the inverse transform processing unit 212 at the encoder 20 side), and correspondingly, a corresponding scale factor may be specified for the forward transform by the transform processing unit 206 at the encoder 20 side.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step size corresponds to finer quantization, and a larger quantization step size corresponds to coarser quantization. An appropriate quantization step size may be indicated by a QP. For example, the quantization parameter may be an index to a predefined set of appropriate quantization step sizes. For example, a smaller quantization parameter may correspond to finer quantization (a smaller quantization step size) and a larger quantization parameter may correspond to coarser quantization (a larger quantization step size), and vice versa. The quantization may include division by a quantization step size and corresponding quantization or inverse quantization, for example, performed by the inverse quantization unit 210, or may include multiplication by a quantization step size. In embodiments according to some standards such as HEVC, a quantization parameter may be used to determine the quantization step size. Generally, the quantization step size may be calculated based on a quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization step size and the quantization parameter. In an example implementation, a scale of the inverse transform may be combined with a scale of the dequantization. Alternatively, a customized quantization table may be used and signaled from an encoder to a decoder, for example, in a bitstream. The quantization is a lossy operation, where a larger quantization step indicates a larger loss.

The inverse quantization unit 210 is configured to apply the inverse quantization of the quantization unit 208 to a quantized coefficient to obtain a dequantized coefficient 211, for example, apply, based on or by using a same quantization step size as the quantization unit 208, the inverse of a quantization scheme applied by the quantization unit 208. The dequantized coefficient 211 may also be referred to as a dequantized residual coefficient 211, and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse DCT or an inverse DST to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, a reconstructed residual block 213) to the prediction block 265, for example, by adding sample values of the reconstructed residual block 213 and the sample values of the prediction block 265, to obtain a reconstructed block 215 in the sample domain.

Optionally, a buffer unit 216 (or buffer 216) of, for example, a line buffer 216, is configured to buffer or store the reconstructed block 215 and a corresponding sample value, for example, for intra prediction. In other embodiments, the encoder may be configured to use unfiltered reconstructed blocks and/or corresponding sample values stored in the buffer unit 216 for any type of estimation and/or prediction, for example, intra prediction.

For example, in an embodiment, the encoder 20 may be configured so that the buffer unit 216 is configured to store the reconstructed block 215 not only used for the intra prediction unit 254 but also used for a unit (not shown in FIG. 2) in the loop filter 220, and/or so that, for example, the buffer unit 216 and the decoded picture buffer 230 form one buffer. In another embodiment, a filtered block 221 and/or a block or sample (not shown in FIG. 2) from the decoded picture buffer 230 are/is used as an input or a basis for the intra prediction unit 254.

The loop filter unit 220 (or loop filter 220) is configured to filter the reconstructed block 215 to obtain the filtered block 221, to smooth sample transition or improve video quality. The loop filter unit 220 is intended to represent one or more loop filters such as a deblocking filter, a sample-adaptive offset (SAO) filter, or another filter, for example, a bilateral filter, an adaptive loop filter (ALF), a sharpening or smoothing filter, or a collaborative filter. Although the loop filter unit 220 is shown as an in-loop filter in FIG. 2, in another implementation, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that the decoder 30 can receive and apply the same loop filter parameter for decoding.

The DPB 230 may be a reference picture memory that stores reference picture data for use in video data encoding by the encoder 20. The DPB 230 may include any one of a variety of memory devices such as a DRAM (including a synchronous DRAM (SDRAM), a magnetoresistive RAM (MRAM), or a resistive RAM (RRAM)), or other types of memory devices. The DPB 230 and the buffer 216 may be provided by a same memory device or separate memory devices. In an example, the DPB 230 is configured to store the filtered block 221. The decoded picture buffer 230 may further be configured to store other previously filtered blocks, for example, previously reconstructed and filtered blocks 221, of the same current picture or of different pictures, for example, previously reconstructed pictures, and may provide complete previously reconstructed, that is, decoded pictures (and corresponding reference blocks and samples) and/or a partially reconstructed current picture (and corresponding reference blocks and samples), for example, for inter prediction. In an example, if the reconstructed block 215 is reconstructed without in-loop filtering, the DPB 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230, and process such data for prediction, to be specific, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or in other words a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (RDO), to be specific, select a prediction mode that provides minimum rate-distortion optimization or select a prediction mode for which related rate distortion at least satisfies a prediction mode selection criterion.

The following describes in detail prediction processing (for example, performed by the prediction processing unit 260) and mode selection (for example, performed by the mode selection unit 262) performed by an example of the encoder 20

As described above, the encoder 20 is configured to determine or select the optimal or optimum prediction mode from a set of (pre-determined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In a possible implementation, a set of inter prediction modes depends on available reference pictures (that is, for example, at least some decoded pictures stored in the DBP 230, as described above) and other inter prediction parameters, for example, depends on whether the entire reference picture or only a part of the reference picture, for example, a search window area around an area of the current block, is used for searching for an optimal matching reference block, and/or for example, depends on whether sample interpolation such as half-sample and/or quarter-sample interpolation is applied. The set of inter prediction modes may include, for example, a skip mode and a merge mode. In specific implementation, the set of inter prediction modes may include a skip-based MMVD mode or a merge-based MMVD mode in the embodiments of this application. In an example, the intra prediction unit 254 may be configured to perform any combination of inter prediction technologies described below.

In addition to the foregoing prediction modes, a skip mode and/or a direct mode may also be applied in the embodiments of this application.

The prediction processing unit 260 may be further configured to partition the picture block 203 into smaller block partitions or subblocks, for example, by iteratively using quadtree (QT) partitioning, binary tree (BT) partitioning, ternary tree (TT) partitioning, or any combination thereof, and perform, for example, prediction on each of the block partitions or subblocks. Mode selection includes selection of a tree structure of the partitioned picture block 203 and selection of a prediction mode used for each of the block partitions or subblocks.

The inter prediction unit 244 may include a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and the previously decoded pictures 231, or in other words, the current picture and the previously decoded pictures 31 may be a part of or form a sequence of pictures forming the video sequence.

For example, the encoder 20 may be configured to select a reference block from a plurality of reference blocks of a same picture or different pictures of a plurality of other pictures and provide, to the motion estimation unit (not shown in FIG. 2), a reference picture and/or provide an offset (a spatial offset) between a position (coordinates X and Y) of the reference block and a position of the current block as an inter prediction parameter. The offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include fetching or generating the prediction block based on a motion/block vector determined through motion estimation (possibly performing interpolation in sub-pixel precision). Interpolation filtering may generate additional pixel samples from known pixel samples, thereby potentially increasing a quantity of candidate prediction blocks that may be used to code a picture block. Upon receiving a motion vector for a PU of the current picture block, the motion compensation unit 246 may locate a prediction block to which the motion vector points in one of the reference picture lists. The motion compensation unit 246 may also generate a syntax element associated with a block and a video slice, so that the decoder 30 uses the syntax element to decode the picture block in the video slice.

Further, the inter prediction unit 244 may transmit the syntax elements to the entropy encoding unit 270, and the syntax elements include the inter prediction parameter (such as indication information of selection of an inter prediction mode used for prediction of the current block after traversal of a plurality of inter prediction modes). In a possible application scenario, if there is only one inter prediction mode, the inter prediction parameter may alternatively not be carried in the syntax element. In this case, the decoder side 30 may directly perform decoding by using a default prediction mode. It can be understood that the inter prediction unit 244 may be configured to perform any combination of inter prediction technologies.

The intra prediction unit 254 is configured to obtain, for example, receive, a picture block 203 (the current picture block) and one or more previously reconstructed blocks, for example, reconstructed neighboring blocks, of a same picture for intra estimation. The encoder 20 may be, for example configured to select an intra prediction mode from a plurality of (predetermined) intra prediction modes.

In an embodiment, the encoder 20 configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra prediction mode for a block, the intra prediction unit 254 is further configured to provide the intra prediction parameter, namely, information indicating the selected intra prediction mode for the block, to the entropy encoding unit 270. In an example, the intra prediction unit 254 may be configured to perform any combination of intra prediction technologies.

Further, the intra prediction unit 254 may transmit the syntax elements to the entropy encoding unit 270, and the syntax elements include the intra prediction parameter (such as indication information of selection of an intra prediction mode used for prediction of the current block after traversal of a plurality of intra prediction modes). In a possible application scenario, if there is only one intra prediction mode, the intra prediction parameter may alternatively not be carried in the syntax element. In this case, the decoder side 30 may directly perform decoding in a default prediction mode.

The entropy encoding unit 270 is configured to apply (or not apply) an entropy encoding algorithm or scheme (for example, a variable-length coding (VLC) scheme, a context adaptive VLC (CAVLC) scheme, an arithmetic coding scheme, context adaptive binary arithmetic coding (CABAC), syntax-based CABAC (SBAC), probability interval partitioning entropy (PIPE) coding, or another entropy encoding methodology or technology) to one or all of the quantized residual coefficient 209, the inter prediction parameter, the intra prediction parameter, and/or the loop filter parameter, to obtain encoded picture data 21 that may be output via an output 272, for example, in a form of an encoded bitstream 21. The encoded bitstream may be transmitted to the video decoder 30, or archived for later transmission or retrieval by the video decoder 30. The entropy encoding unit 270 may further be configured to entropy-encode another syntax element for a current video slice being encoded.

Another structural variant of the video encoder 20 can be used to encode a video stream. For example, a non-transform based encoder 20 may directly quantize a residual signal without the transform processing unit 206 for some blocks or frames. In another implementation, the encoder 20 may have the quantization unit 208 and the inverse quantization unit 210 combined into a single unit.

Further, in the embodiments of this application, the encoder 20 may be configured to implement a video picture encoding method described in the following embodiments.

It should be understood that another structural variant of the video encoder 20 can be used to encode a video stream. For example, for some picture blocks or picture frames, the video encoder 20 may directly quantize a residual signal, processing by the transform processing unit 206 is not required, and correspondingly, processing by the inverse transform processing unit 212 is not required either. Alternatively, for some picture blocks or picture frames, the video encoder 20 does not generate residual data, and correspondingly, processing by the transform processing unit 206, the quantization unit 208, the inverse quantization unit 210, and the inverse transform processing unit 212 is not required. Alternatively, the video encoder 20 may directly store a reconstructed picture block as a reference block, and processing by the filter 220 is not required. Alternatively, the quantization unit 208 and the inverse quantization unit 210 in the video encoder 20 may be combined. The loop filter 220 is optional. In addition, in a case of lossless compression encoding, the transform processing unit 206, the quantization unit 208, the inverse quantization unit 210, and the inverse transform processing unit 212 are optional. It should be understood that in different application scenarios, the inter prediction unit 244 and intra prediction unit 254 may be used selectively.

FIG. 3 is a schematic/conceptual block diagram of an example of a decoder 30 configured to implement an embodiment of this application. The video decoder 30 is configured to receive encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block of an encoded video slice and an associated syntax element.

In the example in FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding process that is roughly inverse to the encoding process described with respect to the video encoder 20 in FIG. 2.

The entropy decoding unit 304 is configured to perform entropy decoding on the encoded picture data 21 to obtain, for example, a quantized coefficient 309 and/or a decoded encoding parameter (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 210. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may resemble the inter prediction unit 244 in function, and the intra prediction unit 354 may resemble the intra prediction unit 254 in function. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When the video slice is encoded into an intra-encoded (I) slice, the intra prediction unit 354 of the prediction processing unit 360 is configured to generate the prediction block 365 for a picture block of the current video slice based on a signaled intra prediction mode and data of a previously decoded block of a current frame or picture. When the video frame is encoded into an inter-encoded (namely, B or P) slice, the inter prediction unit 344 (for example, a motion compensation unit) in the prediction processing unit 360 is configured to generate a prediction block 365 of a video block in the current video slice based on a motion vector and the another syntax element that is received from the entropy decoding unit 304. For inter prediction, the prediction block may be generated from one of reference pictures in one reference picture list. The video decoder 30 may construct reference frame lists, a list0 and a list1, by using a default construction technology and based on reference pictures stored in the DPB 330.

The prediction processing unit 360 is configured to determine prediction information for a video block of the current video slice by parsing the motion vector and the other syntax elements, and use the prediction information to generate the prediction block for the current video block being decoded. In an example of this application, the prediction processing unit 360 determines, by using some received syntax elements, a prediction mode (for example, intra or inter prediction) for encoding the video block in the video slice, an inter prediction slice type (for example, a B slice, a P slice, or a generalized P or B (GPB) slice), construction information of one or more of the reference picture lists for the slice, a motion vector of each inter encoded video block for the slice, an inter prediction status of each inter encoded video block in the slice, and other information, to decode the video block in the current video slice. In another example of this disclosure, the syntax elements received by the video decoder 30 from a bitstream include syntax elements in one or more of an adaptive parameter set (APS), a sequence parameter set (SPS), a picture parameter set (PPS), or a slice header.

The inverse quantization unit 310 may be configured to perform inverse quantization (i.e., dequantization) on a quantized transform coefficient provided in the bitstream and decoded by the entropy decoding unit 304. An inverse quantization process may include using a quantization parameter calculated by the video encoder 20 for each video block in the video slice, to determine a quantization degree that should be applied and an inverse quantization degree that should be applied.

The inverse transform processing unit 312 is configured to apply an inverse transform (for example, an inverse DCT, an inverse integer transform, or a conceptually similar inverse transform process) to a transform coefficient, to generate a residual block in a sample domain.

The reconstruction unit 314 (for example, the summator 314) is configured to add an inverse transform block 313 (namely, a reconstructed residual block 313) to the prediction block 365, for example, by adding sample values of the reconstructed residual block 313 and sample values of the prediction block 365, to obtain a reconstructed block 315 in the sample domain.

The loop filter unit 320 (in a coding loop or after a coding loop) is configured to filter the reconstructed block 315 to obtain a filtered block 321, to smooth sample transition or improve video quality. In an example, the loop filter unit 320 may be configured to perform any combination of filtering technologies described below. The loop filter unit 320 is intended to represent one or more loop filters such as a deblocking filter, a SAO filter, or another filter, for example, a bilateral filter, an ALF, a sharpening or smoothing filter, or a collaborative filter. Although the loop filter unit 320 is shown as an in-loop filter in FIG. 3, in another implementation, the loop filter unit 320 may be implemented as a post-loop filter.

Then, a decoded video block 321 in a given frame or picture is stored in the decoded picture buffer 330 that stores a reference picture used for subsequent motion compensation.

The decoder 30 is configured to, for example, output the decoded picture 331 via an output 332, for presentation or viewing to a user.

Another variant of the video decoder 30 may be used to decode a compressed bitstream. For example, the decoder 30 may generate an output video stream without the loop filter unit 320. For example, a non-transform based decoder 30 can inverse-quantize a residual signal directly without the inverse transform processing unit 312 for some blocks or frames. In another implementation, the video decoder 30 may have the inverse quantization unit 310 and the inverse transform processing unit 312 combined into a single unit.

Further, in the embodiments of this application, the decoder 30 is configured to implement a video picture decoding method described in the following embodiments.

It should be understood that another structural variant of the video decoder 30 can be used to decode the encoded video bitstream. For example, the video decoder 30 may generate an output video stream without processing by the filter 320. Alternatively, for some picture blocks or picture frames, the entropy decoding unit 304 of the video decoder 30 does not obtain quantized coefficients through decoding, and correspondingly, there is no need for the inverse quantization unit 310 and the inverse transform processing unit 312 to perform processing. The loop filter 320 is optional. In addition, in a case of lossless compression, the inverse quantization unit 310 and the inverse transform processing unit 312 are also optional. It should be understood that in different application scenarios, the inter prediction unit and the intra prediction unit may be used selectively.

It should be understood that on the encoder 20 and the decoder 30 in this application, a processing result for a procedure may be output to a next procedure after being further processed. For example, after a procedure such as interpolation filtering, motion vector derivation, or loop filtering, an operation such as clip or shift is further performed on a processing result of a corresponding procedure.

For example, a motion vector of a control point of the current picture block or a motion vector of a subblock of the current picture block derived from a motion vector of a neighboring affine coding block may be further processed. This is not limited in this application. For example, a value of the motion vector is constrained to be within a specific bit width range. Assuming that an allowed bit width of the motion vector is bitDepth, the value of the motion vector ranges from $-2^{(bitDepth-1)}$ to $2^{(bitDepth-1)}-1$, where the symbol "^" represents exponentiation. If bitDepth is 16, the value ranges from $-32768$ to $32767$. If bitDepth is 18, the value ranges from $-131072$ to $131071$. For another example, the value of the motion vector (for example, motion vectors MVs of four 4×4 subblocks within one 8×8 picture block) is constrained so that a maximum difference between integer parts of the MVs of the four 4×4 subblocks does not exceed N samples, for example, not exceed 1 sample.

Figure 4:
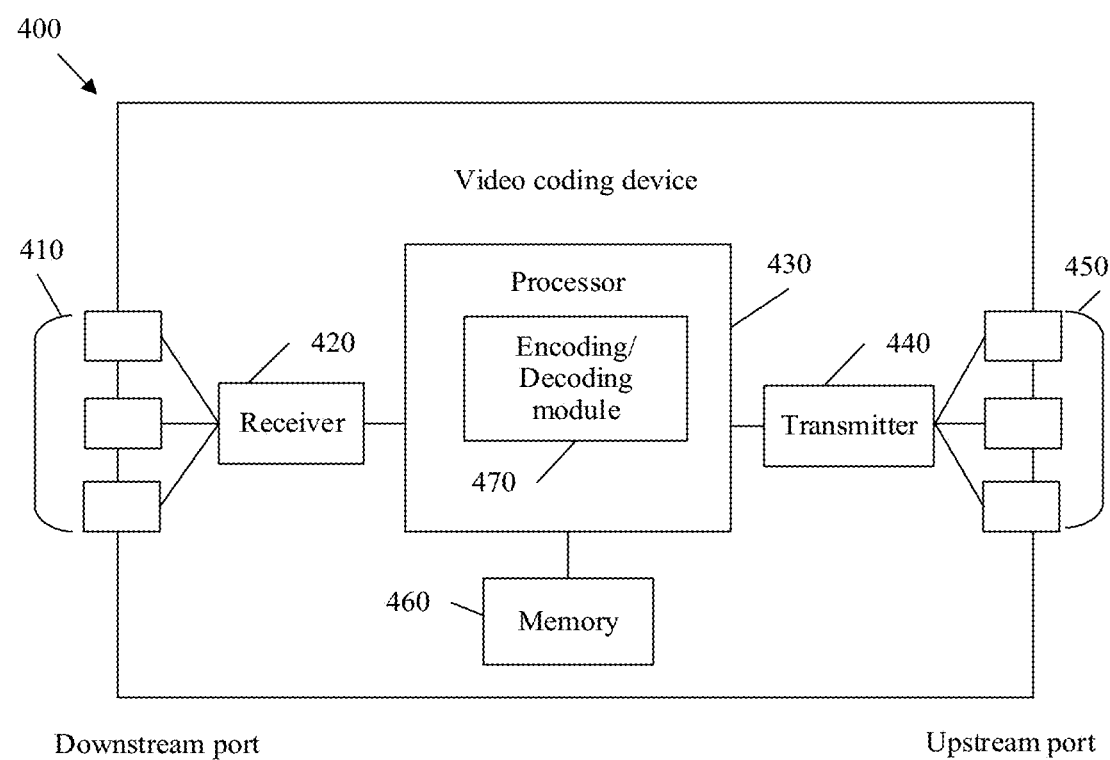
FIG. 4 is a block diagram of an example of a video coding device for implementing an embodiment of this application.

FIG. 4 is a schematic structural diagram of a video coding device 400 (for example, a video encoding device 400 or a video decoding device 400) according to an embodiment of this application. The video coding device 400 is suitable for implementing the embodiments described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes an ingress port 410 and a receiving unit (Rx) 420 for receiving data, a processor, a logic unit, or a central processing unit (CPU) 430 for processing data, a transmitter unit (Tx) 440 (or briefly referred to as a transmitter 440) and an egress port 450 for transmitting data, and a memory 460 (for example, memory 460) configured to store data. The video coding device 400 may further include an optical-to-electrical conversion component and an electrical-to-optical (EO) component coupled to the ingress port 410, the receiver unit 420 (or briefly referred to as a receiver 420), the transmitter unit 440, and the egress port 450 for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 communicates with the ingress ports 410, the receiver unit 420, the transmitter unit 440, the egress ports 450, and the memory 460. The processor 430 includes a coding module 470 (for example, an encoding module 470 or a decoding module 470). The encoding/decoding module 470 implements the embodiments disclosed in this specification, to implement the chrominance block prediction method provided in the embodiments of this application. For example, the encoding/decoding module 470 performs, processes, or provides various coding operations. Therefore, the encoding/decoding module 470 substantially improves functions of the video coding device 400 and affects transform of the video coding device 400 to a different state. Alternatively, the encoding/decoding module 470 is implemented as an instruction stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or nonvolatile, and may be a ROM, a RAM, a ternary content-addressable memory (TCAM), and/or an SRAM.

Figure 5A:
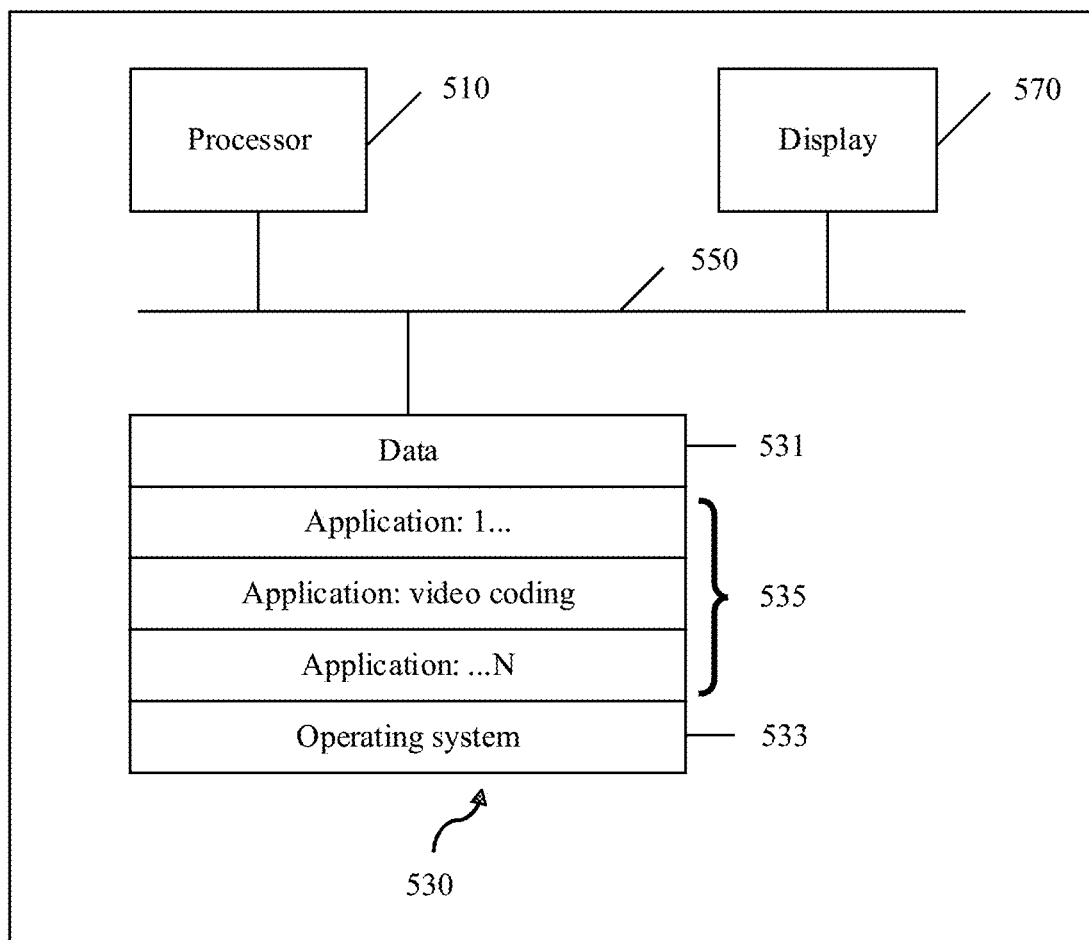
FIG. 5A is a block diagram of another example of an encoding apparatus or a decoding apparatus for implementing an embodiment of this application.

FIG. 5A is a simplified block diagram of an apparatus 500 that may be used as either or two of the source device 12 and the destination device 14 in FIG. 1A according to an example embodiment. The apparatus 500 can implement the technologies of this application. In other words, FIG. 5A is a schematic block diagram of an implementation of an encoding device or a decoding device (coding device 500) according to an embodiment of this application. The coding device 500 may include a processor 510, a memory 530, and a bus system 550. The processor and the memory are connected through the bus system. The memory is configured to store an instruction. The processor is configured to execute the instruction stored in the memory. The memory of the coding device stores program code, and the processor may invoke the program code stored in the memory to perform various video picture encoding or decoding methods described in this application, especially video encoding or decoding methods in various inter prediction modes or intra prediction modes. To avoid repetition, details are not described herein again.

In this embodiment of this application, the processor 510 may be a central processing unit (CPU). Alternatively, the processor 510 may be another general-purpose processor, a DSP, an ASIC, an FPGA or another programmable logic device, a discrete gate or transistor logic device, a discrete hardware component, or the like. The general-purpose processor may be a microprocessor, or the processor may be any conventional processor or the like.

The memory 530 may include a ROM device or a RAM device. Any other suitable type of storage device may alternatively be used as the memory 530. The memory 530 may include code and data 531 accessed by the processor 510 through the bus 550. The memory 530 may further include an operating system 533 and an application program 535. The application program 535 includes at least one program that allows the processor 510 to perform the video encoding or decoding method described in this application (particularly the video picture prediction method or the inter prediction method described in this application). For example, the application program 535 may include applications 1 to N, and further include a video encoding or decoding application (or a video coding application) that performs the video encoding or decoding method described in this application.

In addition to a data bus, the bus system 550 may further include a power bus, a control bus, a status signal bus, and the like. However, for clear description, various types of buses in the figure are marked as the bus system 550.

Optionally, the coding device 500 may further include one or more output devices, for example, a display 570. In an example, the display 570 may be a touch display that combines a display and a touch unit that operably senses a touch input. The display 570 may be connected to the processor 510 through the bus 550.

Figure 5B:
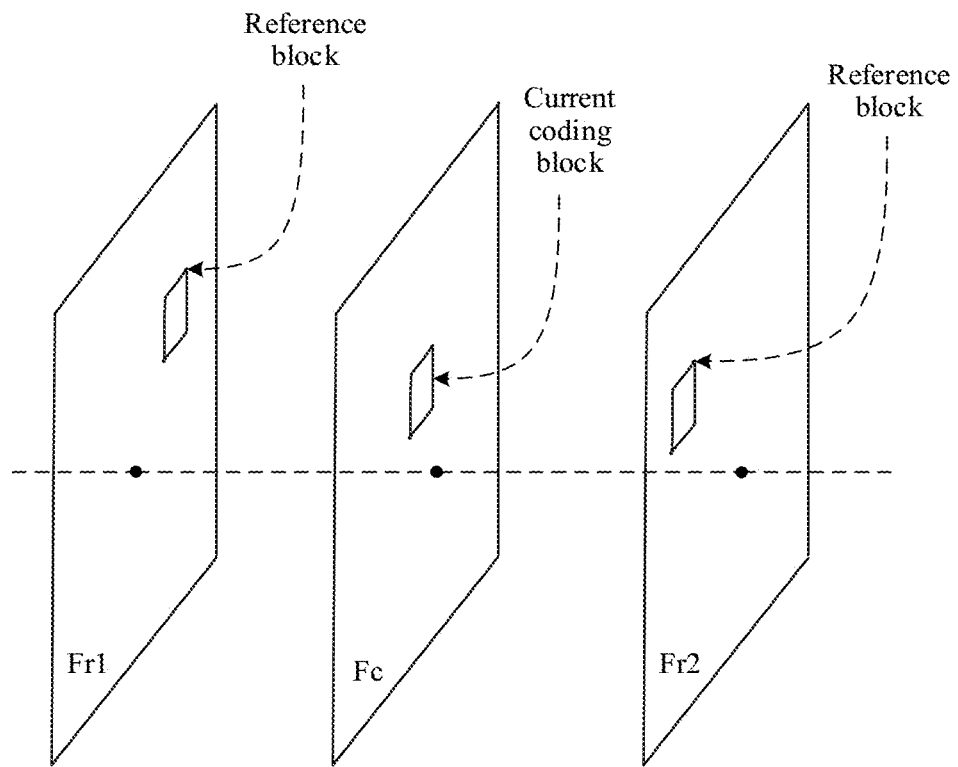
FIG. 5B is a schematic diagram of motion information of a current picture block and a reference block according to an embodiment of this application.

Inter prediction is an important step in the embodiments of this application. From a perspective of an encoder side, inter prediction is searching a reconstructed picture for a matched reference block for a current coding block in a current picture. As shown in FIG. 5B, a sample value of a sample in a reference block (for example, a reference block Fr1 or a reference block Fr2, where a sample value in a reference block may be understood as a reference sample value in this application) is used as predicted information or a predicted value ("information" and "value" are not distinguished below) of a sample value of a sample in a current coding block (that is, a current picture block) Fc. This process is referred to as ME. In addition, motion information of the current coding block is transmitted. From a perspective of a decoder side, the motion information needs to be obtained through parsing during inter prediction, a reference block is determined in the reconstructed picture based on the obtained motion information, and a sample value (that is, a reference sample value) of a sample in the reference block is used as predicted information. This process is referred to as MC. Reconstructed information can be obtained by combining the predicted information and residual information and performing a filtering operation on combined information. An idea in this application may be used in HEVC, or may be used in another video coding standard. The following describes a possible case of an inter prediction mode on the encoder side by using an example in which the idea is used in HEVC. A possible case of an inter prediction mode on the decoder side is similar, and therefore no additional description is provided.

In HEVC, there are two modes: an AMVP mode and a merge mode. The following separately describes the two modes.

In the AMVP mode, an affine candidate motion vector list is first constructed by using motion information of an encoded block that is spatially or temporally neighboring to a current coding block, and then an optimal motion vector is determined from the affine candidate motion vector list as a motion vector predictor (MVP) of the current coding block. Rate-distortion costs are calculated by using a formula (0-1), where J is the rate-distortion costs (RD costs), SAD is a sum of absolute differences between predicted sample values and original sample values that is obtained through motion estimation performed by using a candidate motion vector predictor, R is a bit rate, and k is a Lagrange multiplier. An encoder side transfers an index value of the selected motion vector predictor in the affine candidate motion vector list and a reference frame index value to a decoder side. Further, motion search is performed in an MVP-centered neighboring domain, to obtain an actual motion vector of the current coding block. The encoder side transfers a difference (MVD) between the MVP and the actual motion vector to the decoder side:

$$J=SAD+\lambda R(0-1).$$

Figure 5C:
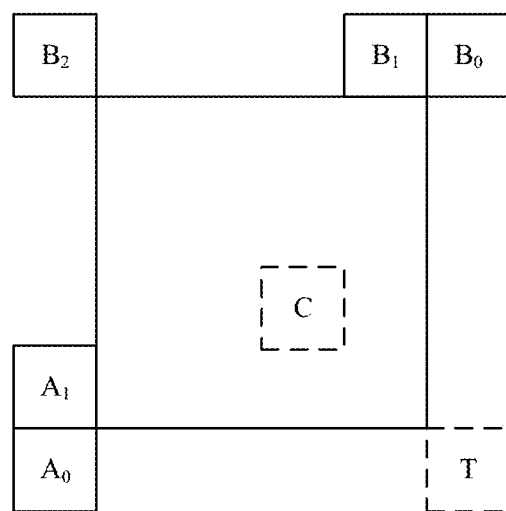
FIG. 5C is a schematic diagram of an inter prediction scenario according to an embodiment of this application.

In the merge mode, a candidate motion information list is first constructed by using motion information of an encoded block that is spatially or temporally neighboring to a current coding block, optimal motion information is then determined from the candidate motion information list based on rate-distortion costs and is used as motion information of the current coding block, and an index value (denoted as a merge index, the same below) of a location of the optimal motion information in the candidate motion information list is transferred to a decoder side. Spatial and temporal candidate motion information of the current coding block is shown in FIG. 5C. The spatial candidate motion information is from five spatially neighboring blocks (A0, A1, B0, B1, and B2). If a neighboring block is unavailable or is in an intra coding mode, the neighboring block is not added to the candidate motion information list. The temporal candidate motion information of the current coding block is obtained after an MV of a collocated block in a reference frame is scaled based on picture order counts (POC) of the reference frame and a current frame. Whether a block at a location T in the reference frame is available is first determined. If the block is not available, a block at a location C is selected.

Figure 5D:
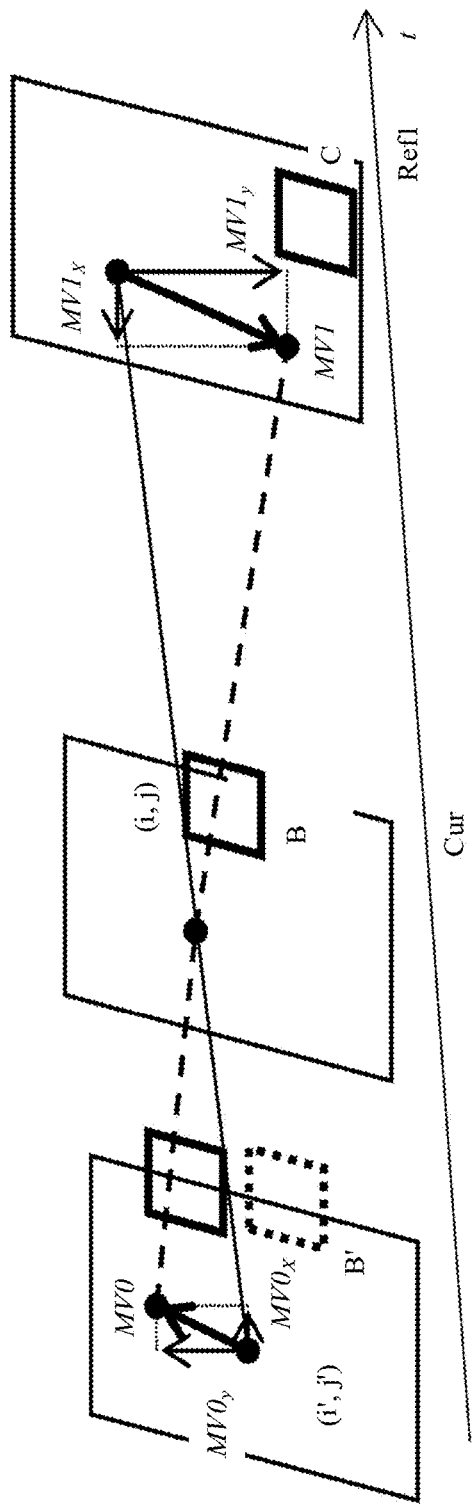
FIG. 5D is a schematic diagram of a scenario of inter neighboring blocks according to an embodiment of this application.

In inter prediction in HEVC, all samples in a current coding block use same motion information, and then motion compensation is performed based on the motion information, to obtain predicted sample values of the current coding block. The motion information mainly includes: (1) a prediction direction of the coding block including forward prediction, backward prediction, and bi-directional prediction, where the forward prediction indicates that the coding block is obtained through prediction based on a previous encoded frame, the backward prediction indicates that the coding block is obtained through prediction based on a subsequent encoded frame, and the bi-directional prediction indicates that the coding block is obtained through prediction with reference to a previous encoded frame and a subsequent encoded frame, (2) a reference frame index of the coding block, indicating a frame in which a reference block of the current coding block is located, and (3) an MV of the coding block, indicating motion displacement of the coding block relative to the reference block, where the MV includes a horizontal component (denoted as $MV_x$) and a vertical component (denoted as $MV_y$), which respectively represent motion displacement of the coding block relative to the reference block in a horizontal direction and motion displacement of the coding block relative to the reference block in a vertical direction. When forward prediction or backward prediction is performed for the coding block, there is only one MV. When bi-directional (that is, forward and backward) prediction is performed for the coding block, there are two MVs. FIG. 5D describes the foregoing motion information. In FIG. 5D and the following descriptions about the motion information and the predicted information, 0 represents forward prediction, and 1 represents backward prediction. For example, Ref0 represents a forward reference frame, Ref1 represents a backward reference frame, MV0 represents a forward motion vector, and MV1 represents a backward motion vector. A, B, and C respectively represent a forward reference block, the current coding block, and a backward reference block. Cur represents a current coding frame, and a dashed line represents a moving track of B.

A basic motion compensation process of forward prediction is as follows. As shown in FIG. 5D, the current coding block is the block B in the figure, and the height and the width of B are respectively H and W. In this case, it is learned based on the motion information that a forward reference frame of the current coding block B is the frame Ref0, and a forward motion vector MV0 of the current coding block B is ($MV0_x$, $MV0_y$). When the coding block B in the frame Cur is encoded, a same coordinate point is first found in the frame Ref0 based on coordinates (i, j) of a point in the top-left corner of B in the frame Cur, a block B' in Ref0 may be obtained based on the length and the width of the block B, and then B' is moved to the block A based on MV0 of the block B'. Finally, interpolation is performed on the block A to obtain a prediction block of the current coding block B. A sample value of each sample in the prediction block of the current coding block B is referred to as a predicted value of a corresponding sample in the block B. A motion compensation process of backward prediction is the same as that of forward prediction, but reference directions are different. It should be noted that prediction blocks obtained through motion compensation in backward prediction and forward prediction are respectively referred to as a forward prediction block and a backward prediction block. When no bi-directional prediction is performed for the coding block, the obtained forward prediction block and backward prediction block are prediction blocks of the current coding block.

For bi-directional prediction, a forward prediction block and a backward prediction block are first obtained based on motion information in a motion compensation process of forward prediction and a motion compensation process of backward prediction, and then weighted prediction or BDOF is performed on sample values at a same location in the forward prediction block and the backward prediction block, to obtain a prediction block of the coding block B.

In the BDOF technology, after motion compensation of bi-directional prediction is performed on the current coding block, the forward prediction block and the backward prediction block are obtained, and then a modified motion vector of each 4×4 subblock in the current coding block is derived based on sample values of the forward prediction block and the backward prediction block. Finally, compensation is performed again on each sample in the current coding block based on the modified motion vector, to obtain a final prediction block of the current coding block, so as to obtain a predicted value of the current coding block. The embodiments of this application focus on a specific condition under which BDOF is used to perform motion compensation, to reduce coding complexity and improve coding performance.

Figure 6A:
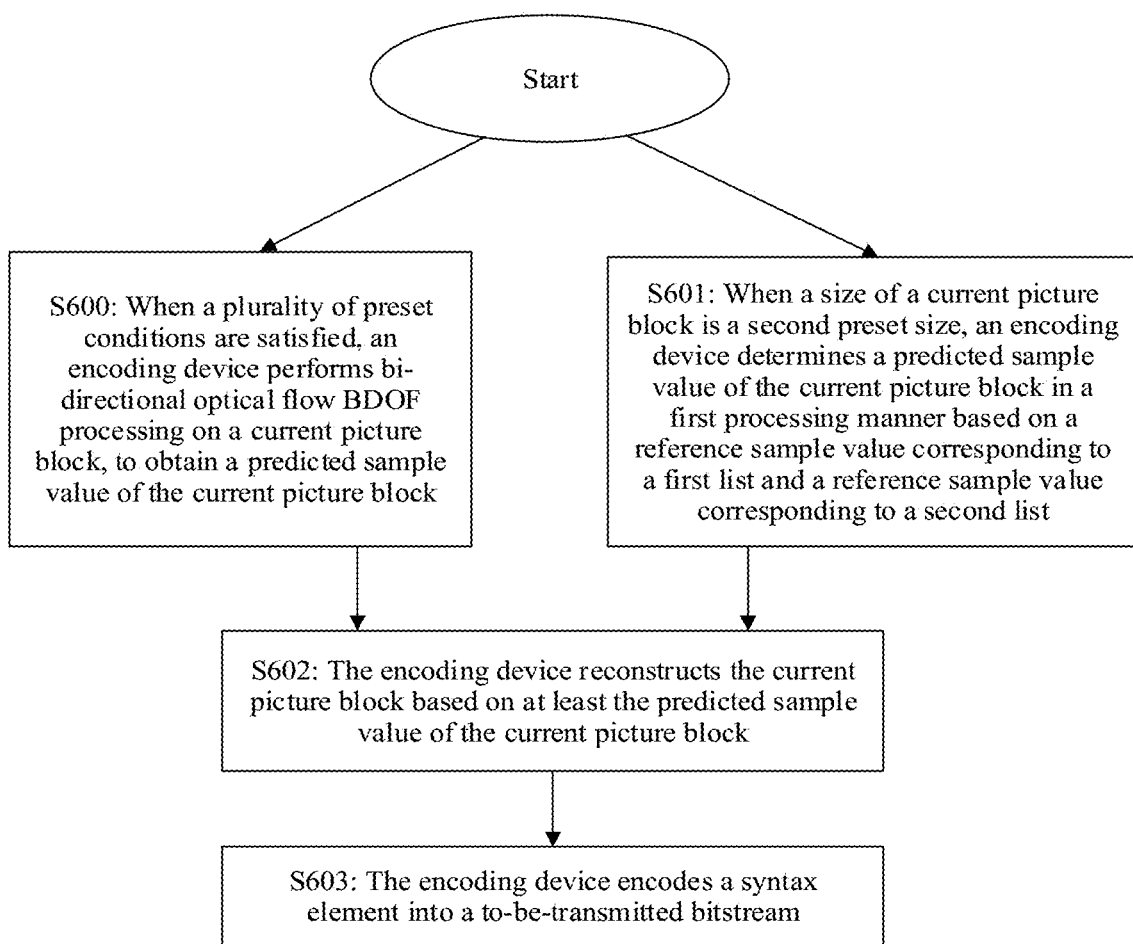
FIG. 6A is a schematic flowchart of an encoding method according to an embodiment of this application.

FIG. 6A is a schematic flowchart of an encoding method according to an embodiment of the present disclosure. This encoding procedure may be performed by a video encoding device. The video encoding device may be the foregoing video encoder 20 or a device including the video encoder 20. Further, the procedure may be performed by the inter prediction unit (also referred to as an inter predictor) 244, the entropy encoding unit (or an entropy encoder) 270, and the like in the video encoder 20. The foregoing procedure is described as a series of steps or operations. It should be understood that, the steps of the procedure may be performed in various orders and/or simultaneously, and are not limited to an execution order shown in FIG. 6A. Related descriptions of the procedure corresponding to FIG. 6A are as follows.

The encoding device first determines whether a plurality of preset conditions are satisfied, and if the plurality of preset conditions are satisfied, S600 is performed, or if the plurality of preset conditions are not satisfied, S601 is performed. For the case in which the plurality of preset conditions are not satisfied, only the case in S601 is used as a representative for detailed description herein. Other cases that are the same as those in the other approaches are not described in this application.

Step S600: When the plurality of preset conditions is satisfied, the encoding device performs BDOF processing on a current picture block, to obtain a predicted sample value of the current picture block.

The BDOF may further be referred to as BIO.

The plurality of preset conditions includes at least a condition that a size of the current picture block satisfies a first preset size. The size of the current picture block is usually represented by a width and a height (briefly written as W×H), and the width and the height are measured by sample (sample or pixel). For example, if the size of the current picture block is 8×8, the first 8 indicates that the width of the current picture block is 8 samples, and the second 8 indicates that the height of the current picture block is 8 samples. For another example, if the size of the current picture block is 8×16, 8 indicates that the width of the current picture block is 8 samples, and 16 indicates that the height of the current picture block is 16 samples.

That a size of the current picture block satisfies a first preset size includes (or is): the height H of the current picture block is greater than or equal to 8, and when a product of the width W and the height H of the current picture block is equal to 64, the width W is not equal to the height H.

Alternatively, that a size of the current picture block satisfies a first preset size includes (or is): the height H of the current picture block is greater than or equal to 8, and the width W of the current picture block is greater than or equal to 8.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes: the height H of the current picture block is greater than 8.

Alternatively, that a size of the current picture block satisfies a first preset size includes: the height H of the current picture block is greater than 8, and the width W of the current picture block is greater than or equal to 8.

It should be noted that before whether to determine (or obtain through prediction) the predicted sample value of the current picture block based on a reference sample value corresponding to a first list and a reference sample value corresponding to a second list according to the BDOF technology is determined, there may be another reference condition in addition to the size of the current picture block. The another reference condition is not limited herein. For ease of understanding, the following uses examples for description.

Condition A: There is a high-level syntax identifier sps_bdof_enabled_flag indicating that the BDOF technology is allowed to be used for a current video sequence.

Condition B: Prediction direction indication information predFlagL0 corresponding to a first list (list1) is equal to 1, and prediction direction indication information predFlagL1 corresponding to a second list (list0) is equal to 1.

Condition C: A picture order count POC_L0 of a reference frame corresponding to a first list (list0), a picture order count POC_L1 of a reference frame corresponding to a second list (list1), and a picture order count POC_Cur of a picture in which the current picture block is located satisfy the following relationship: (POC_L0−POC_Cur)×(POC_L1−POC_Cur)<0. In other words, the picture including the current picture block is between two reference pictures.

Condition D: MotionModelIdc[xCb][yCb] is equal to 0. MotionModelIdc is a motion model index for motion compensation. The MotionModelIdc[xCb][yCb] equal to 0 indicates that a motion model for motion compensation of the current block is translational motion.

Condition E: merge_subblock_flag[x0][y0] is equal to 0, where merge_subblock_flag[x0][y0] equal to 0 indicates that a subblock merge mode is not applied for the current picture block.

Condition F: sym_mvd_flag[x0][y0] is equal to 0. sym_mvd_flag[x0][y0] equal to 0 indicates that mvd_coding (x0, y0, refList, cpIdx) syntax structure is present for the current block.

Condition G: bcwIdx[xCb][yCb] is equal to 0. bcwIdx indicates a bi-directional prediction weight index for the current picture block.

Condition H: cIdx is equal to 0. cIdx represents a colour component index of the current picture block.

Condition I: The size of the current picture block is the first preset size.

Condition J: Both luma_weight_l0_flag[refIdxL0] and luma_weight_l1_flag[refIdxL1] are equal to 0, where luma_weight_l0_flag equal to 0 indicates that weighting factors for a luma component of list0 prediction are not present, and luma_weight_l1_flag equal to 0 indicates that weighting factors for a luma component of list1 prediction are not present.

For example, when all of the conditions A to J are satisfied, it is determined that the BDOF technology may be used to predict the predicted sample value of the current picture block. For example, bdofFlag is set to true. It should be noted that the foregoing conditions are merely examples, and another condition may be further added, or one or more of the foregoing conditions may be replaced, or one or more of the foregoing conditions may be removed.

It should be understood that the current picture block (or a current block) herein may be understood as a picture block that is being processed. For example, in an encoding process, the current picture block is a picture block that is being encoded (an encoding block).

It may be understood that another case may be further obtained with reference to the foregoing cases, and the another case also falls within the protection scope of this application.

It should be understood that the method in this embodiment of this application may be performed by a picture prediction apparatus such as a video encoder or an electronic device having a video encoding function, and may be performed by an inter prediction unit in the video encoder.

To be specific, a condition for using the BDOF technology in this solution is different from a condition for using the BDOF technology in the other approaches, and in particular, requirements for the size of the current picture block are different. The BDOF technology is used for the current picture block having the first preset size, so that a predicted sample value closer to a real sample value can be obtained, coding complexity can be properly controlled, and coding efficiency can be improved.

In this embodiment of this application, that the encoding device performs BDOF processing on the current picture block when the plurality of preset conditions are satisfied may be when the plurality of preset conditions are satisfied, the encoding device performs BDOF processing on the current picture block based on a reference sample value corresponding to a first list and a reference sample corresponding to a second list.

In this embodiment of this application, the reference sample value corresponding to the first list and the reference sample value corresponding to the second list are respectively obtained through prediction based on a first motion vector (for example, Mv0_L0) corresponding to the first list (that is, list0) and a second motion vector (for example, Mv1_L1) corresponding to the second list (that is, list1). For example, the reference sample value corresponding to the first list (that is, list0) can be determined based on the first motion vector (for example, Mv0_L0) corresponding to the first list (that is, list0), and the reference sample value corresponding to the second list (that is, list1) can be determined based on the second motion vector (for example, Mv1_L1) corresponding to the second list (that is, list1).

It may be understood that the first motion vector (for example, Mv0_L0) corresponding to the first list (that is, list0) and the second motion vector (for example, Mv1_L1) corresponding to the second list (that is, list1) are obtained in different manners in different inter prediction modes. A specific to-be-used inter prediction mode may be selected by using a mode selection unit. The following separately describes how to determine the first motion vector and the second motion vector in an AMVP mode, a merge mode, and a skip mode.

Possible case 1: The inter prediction mode is the AMVP mode.

The encoding device first constructs a candidate motion vector predictor MVP list.

Further, the video encoding device constructs the candidate motion vector predictor MVP list (or a candidate motion vector list) by using the inter prediction unit (or an inter prediction module). The constructed candidate motion vector predictor MVP list may be a triplet candidate motion vector predictor MVP list or a 2-tuple candidate motion vector predictor MVP list. In this embodiment of this application, the video encoding device performs inter prediction in a bi-directional prediction manner.

Then, the video encoding device determines target candidate motion information in the MVP list according to a rate-distortion cost criterion.

Further, the target candidate motion information may also be referred to as an optimal candidate motion vector, or may have another name. In conclusion, the target candidate motion information is an optimal candidate determined in the MVP list according to the rate-distortion cost criterion (for example, usage costs are minimized). The target candidate motion information corresponds to a unique index number in the candidate motion vector predictor MVP list.

Subsequently, the first motion vector and the second motion vector are determined based on the target candidate motion information. The target candidate motion information includes a first motion vector predictor (for example, Mvp0_L0) corresponding to the first list (that is, list0) and a second motion vector predictor (for example, Mvp1_L1) corresponding to the second list (that is, list1). For example, the first motion vector Mv0_L0 (forward) corresponding to the first list (list0) may be obtained based on a sum of the first motion vector predictor Mvp0_L0 and a MVD0. Likewise, the second motion vector Mv1_L1 may be obtained based on a sum of the second motion vector predictor Mvp1_L1 and an MVD1. Optionally, the first motion vector (for example, Mv0_L0) corresponding to the first list (that is, list0) herein may also be expressed as a first motion vector corresponding to a first direction (for example, a forward direction), and the second motion vector (for example, Mv1_L1) corresponding to the second list (that is, list1) may also be expressed as a second motion vector corresponding to a second direction (for example, a backward direction).

Possible case 2: The inter prediction mode is the merge mode.

The encoding device first constructs a candidate motion information list.

Further, the video encoding device constructs the candidate motion information list (or as a candidate motion vector list) by using the inter prediction unit (or an inter prediction module).

Then, the video encoding device determines target candidate motion information in the candidate motion information list according to a rate-distortion cost criterion.

Further, the target candidate motion information includes target candidate motion vectors, reference frame indices, and prediction direction indication information, the prediction direction indication information is used to indicate that bi-directional prediction is applied, the target candidate motion vectors include the first motion vector corresponding to the first list and the second motion vector corresponding to the second list, and the reference frame indices include an index of a first reference frame corresponding to the first list and an index of a second reference frame corresponding to the second list.

The target candidate motion information may also be referred to as optimal candidate motion information, or may have another name. In conclusion, the target candidate motion information is an optimal candidate determined in the candidate motion information list according to the rate-distortion cost criterion (for example, usage costs are minimized).

Possible case 3: The inter prediction mode is the skip mode. For related descriptions, refer to the descriptions of the merge mode in the foregoing case 2. A difference from the merge mode lies in that no sample residual needs to be transmitted in the skip mode.

Figure 6B:
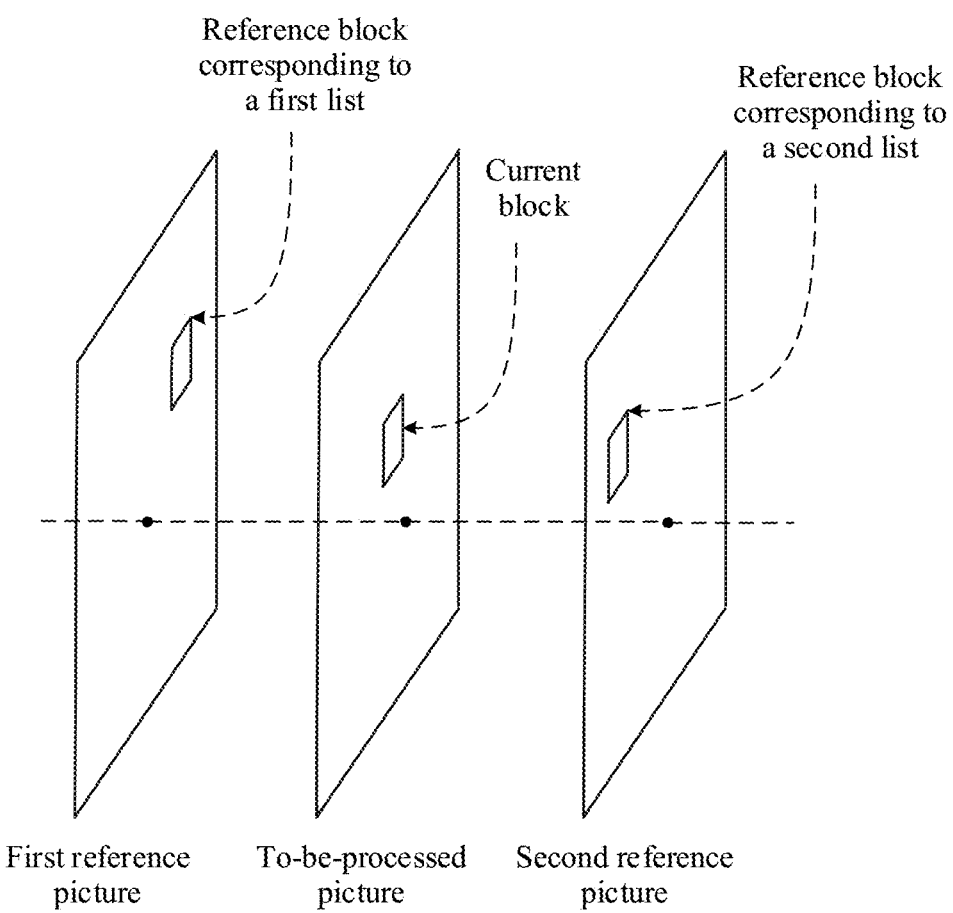
FIG. 6B is a schematic diagram of a forward reference picture and a backward reference picture for implementing an embodiment of this application.

Referring to FIG. 6B, in this embodiment of this application, a current picture to which the current picture block belongs has two reference pictures: a previous reference picture and a following reference picture, which are respectively a first reference picture (for example, a forward reference picture or a forward reference frame, where the "forward" herein may also be referred to as a first direction) and a second reference picture (for example, a backward reference picture or a backward reference frame, where the "backward" herein may also be referred to as a second direction). The reference sample corresponding to the first list is a reference sample on the first reference picture, and the reference sample corresponding to the second list is a reference sample on the second reference picture.

Optionally, obtaining the predicted sample value of the current block through prediction based on the reference sample value corresponding to the first list and the reference sample value corresponding to the second list according to the BDOF technology may include deriving a modified motion vector of each subblock of the current block based on the reference sample value corresponding to the first list and the reference sample value corresponding to the second list according to the BDOF technology, and then performing motion compensation on each subblock based on the modified motion vector, to obtain a predicted sample value of each subblock, so as to obtain the predicted sample value of the current block. For ease of understanding, the following provides an example for description.

A sample value in the reference sample value corresponding to the first list (list0) may be expressed as $I^{(0)}(i, j)$, and a sample value in the reference sample value corresponding to the second list (list1) may be expressed as $I^{(1)}(i, j)$. The two values may be collectively referred to as forward and backward predicted values $I^{(k)}(i,j)$, where i=0 . . . cuW−1, j=0 . . . cuH−1, and k may be 0 and 1. Herein, $I^{(k)}(i,j)$ may be obtained by using an 8-tap interpolation filter through interpolation, and a sample value at another location (expansion by one row and one column is performed) is obtained by using a bilinear interpolation filter through interpolation. It should be noted that a sample value of an expanded area may be alternatively obtained by using another method, for example, may be obtained by using an 8-tap interpolation filter, or may directly be a reference sample value at an integer sample location. This is not limited herein. Herein, cuW and cuH are respectively the width and the height of the current picture block. Obtaining the predicted sample value of the current picture block through prediction based on the reference sample value corresponding to the first list and the reference sample value corresponding to the second list according to the BDOF technology may include the following steps.

Step 1: Calculate a sum of absolute differences SAD between sample values in reference sample values corresponding to the first list and sample values in reference sample values corresponding to the second list, determine whether the SAD is less than a threshold TH_CU, and if the SAD is less than the threshold TH_CU, skip performing BDOF, or if the SAD is not less than the threshold TH_CU, perform BDOF. This step is optional.

A SAD calculation formula is as follows:

$$SAD = \sum_{j=0 \ldots cuH-1} \sum_{i=0 \ldots cuW-1} \text{abs}(I^{(1)}(i, j) - I^{(0)}(i, j)) \quad (2-1)$$

The threshold TH_CU may be set to (1<<(BD−8+shift))× cuW×cuH, and shift is Max(2, 14−BD).

Alternatively, TH_CU may be set to 1<<(BD−3+shift).

Optionally, whether to perform BDOF may be alternatively determined in other manners, and the other manners are not listed one by one herein.

When it is determined to perform BDOF, step 4 continues to be performed.

Step 2: Calculate a horizontal gradient value and a vertical gradient value of forward and backward predicted values of a current CU.

The horizontal gradient value $$\frac{\partial I^{(k)}}{\partial x}(i, j)$$

and the vertical gradient value $$\frac{\partial I^{(k)}}{\partial y}(i, j)$$

of the forward and backward predicted values of the current CU include a horizontal gradient value $$\frac{\partial I^{(0)}}{\partial x}(i, j)$$

and a vertical gradient value $$\frac{\partial I^{(0)}}{\partial y}(i, j)$$

at a sample location (i,j) in the reference sample values corresponding to the first list, and a horizontal gradient value $$\frac{\partial I^{(1)}}{\partial x}(i, j)$$

and a vertical gradient value $$\frac{\partial I^{(1)}}{\partial y}(i, j)$$

at a sample location (i,j) in the reference sample values corresponding to the second list where k is successively set to 0 and 1. The horizontal gradient value $$\frac{\partial I^{(k)}}{\partial x}(i, j)$$

and the vertical gradient value $$\frac{\partial I^{(k)}}{\partial y}(i, j)$$

may be obtained by using the following formulas:

$$\frac{\partial I^{(k)}}{\partial x}(i, j) = (I^{(k)}(i+1, j) - I^{(k)}(i-1, j)) \gg 4 \quad (2-2)$$

$$\frac{\partial I^{(k)}}{\partial y}(i, j) = (I^{(k)}(i, j+1) - I^{(k)}(i, j-1)) \gg 4$$

Herein, i=0 . . . cuW−1, and j=0 . . . cuH−1.

A cuW×cuH prediction matrix for the current picture block may be obtained in this step.

Step 4: Perform expansion on the forward and backward predicted values of the current CU, the horizontal gradient value, and the vertical gradient value through padding.

Calculating a modified motion vector of a 4×4 subblock requires forward and backward predicted values $I^{(k)}(x, y)$ of a 6×6 area in which the 4×4 subblock is located, a horizontal gradient value $$\frac{\partial I^{(k)}}{\partial x}(i, j)$$

of the forward and backward predicted values, and a vertical gradient value $$\frac{\partial I^{(k)}}{\partial y}(i, j)$$

of the forward and backward predicted values. Calculating a gradient value of the 6×6 area requires forward and backward predicted values of an 8×8 area. Therefore, when the forward and backward predicted values are to be obtained by using an interpolation filter, expansion by two rows and two columns needs to be performed around to obtain a prediction sample block whose size is (W+4)×(H+4), so as to calculate a gradient value of (W+2)×(H+2), where W is the width of the current CU, and H is the height of the current CU. To reduce complexity of BDOF, special processing may be performed on a boundary of the CU. Details are as follows.

A predicted value of a W×H area is first obtained by using an 8-tap filter, the area is expanded around by only one row and one column, and a predicted value of an expanded area is obtained by using a bilinear filter, so as to obtain a predicted value of a (W+2)×(H+2) area.

Then, a gradient value of the W×H area may be obtained through calculation based on the predicted value of the (W+2)×(H+2) area according to a formula.

Finally, according to a padding method, the gradient value of the W×H area is expanded around to obtain a horizontal gradient value and a vertical gradient value of the (W+2)×(H+2) area. The predicted value of the W×H area is expanded around to obtain the predicted value of the (W+2)×(H+2) area.

Figure 6C:
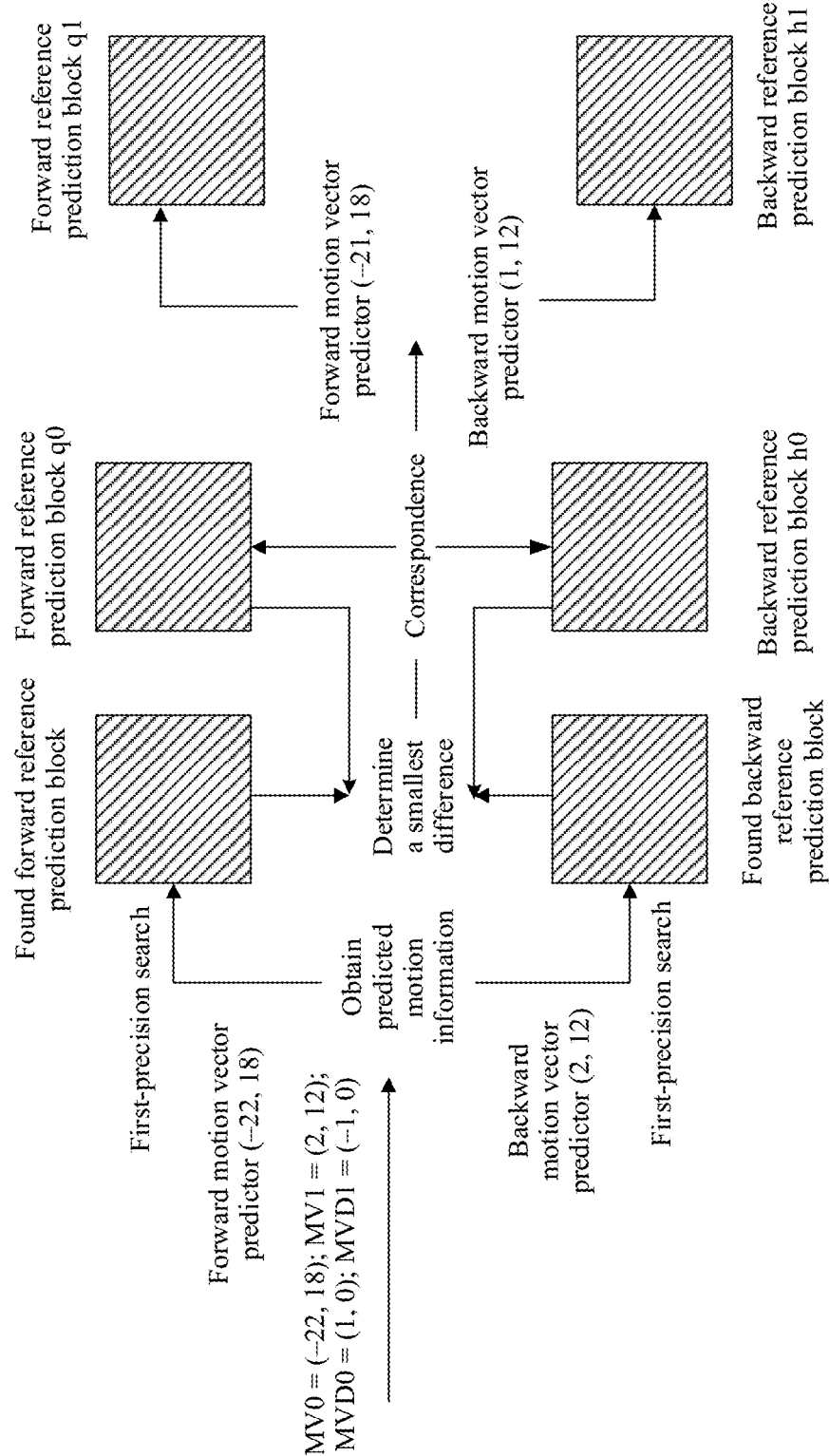
FIG. 6C is a schematic diagram of a motion vector refinement process for implementing an embodiment of this application.
Figure 6D:
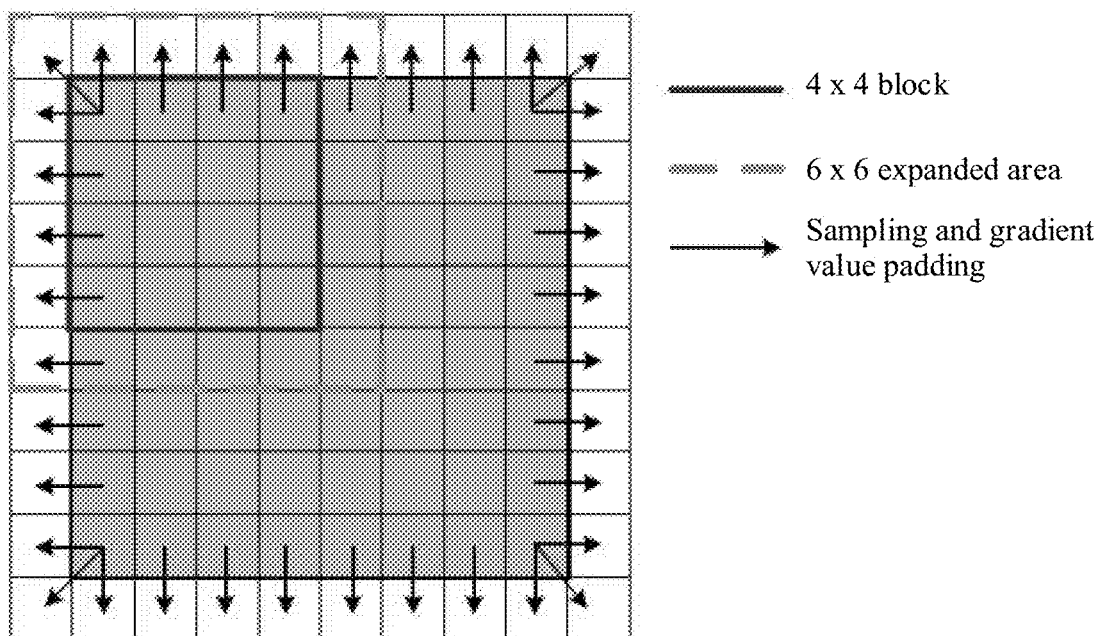
FIG. 6D is a schematic diagram of a scenario of a padding-based expansion manner according to an embodiment of this application.

Padding is shown in FIG. 6D. Padding is performed according to a method in FIG. 6D, to obtain $$I^{(k)}(i, j), \frac{\partial I^{(k)}}{\partial x}(i, j), \text{ and } \frac{\partial I^{(k)}}{\partial y}(i, j),$$

where i=−1 . . . cuW, and j=−1 . . . cuH. To be specific, a (cuW+2)×(cuH+2) prediction matrix, a horizontal gradient matrix, and a vertical gradient matrix are obtained.

Step 5: Derive a modified motion vector of each 4×4 subblock, and then perform weighting.

For each 4×4 subblock, the modified motion vector ($v_x$, $v_y$) is obtained according to formulas (2-3). Further, the modified motion vector ($v_x$, $v_y$) of each 4×4 subblock is obtained by applying BDOF to a 6×6 window Ω around the subblock to minimize predicted values of L0 and L1. Further, ($v_x$, $v_y$) is derived according to the following formulas:

$$v_x = S_1 > 0 ? \text{clip3}(-th'_{BIO}, th'_{BIO}, -((S_3 \cdot 2^3) >> \lfloor \log_2 S_1 \rfloor)) : 0 \quad (2\text{-}3)$$

$$v_y = S_5 > 0 ? \text{clip3}(-th'_{BIO}, th'_{BIO}, -((S_6 \cdot 2^3 - ((v_x S_{2,m}) << 12 + v_x S_{2,s})/2) >> \lfloor \log_2 S_5 \rfloor)) : 0.$$

Herein, H is a floor function (where floor(A) represents a maximum integer not greater than A). $th'_{BIO} = 2^{13-BD}$ and is a threshold for preventing error transfer caused due to an excessively large modified motion vector. $S_{2,m} = S_2 >> 12$, and $S_{2,s} = S_2 \& (2^{12} - 1)$. BD is a current sample bit width.

$S_1$, $S_2$, $S_3$, $S_5$, and $S_6$ are calculated according to the following formulas:

$$S_1 = \sum_{(i,j) \in \Omega} \psi_x(i, j) \cdot \psi_x(i, j) \quad (2\text{-}4)$$

$$S_3 = \sum_{(i,j) \in \Omega} \theta(i, j) \cdot \psi_x(i, j)$$

$$S_2 = \sum_{(i,j) \in \Omega} \psi_x(i, j) \cdot \psi_y(i, j)$$

$$S_5 = \sum_{(i,j) \in \Omega} \psi_y(i, j) \cdot \psi_y(i, j)$$

$$S_6 = \sum_{(i,j) \in \Omega} \theta(i, j) \cdot \psi_y(i, j)$$

Herein, $$\psi_x(i, j) = \left(\frac{\partial I^{(1)}}{\partial x}(i, j) + \frac{\partial I^{(0)}}{\partial x}(i, j)\right) >> 3 \quad (2\text{-}5)$$

$$\psi_y(i, j) = \left(\frac{\partial I^{(1)}}{\partial y}(i, j) + \frac{\partial I^{(0)}}{\partial y}(i, j)\right) >> 3$$

$$\theta(i, j) = \left(I^{(1)}(i, j) >> 6\right) - \left(I^{(0)}(i, j) >> 6\right)$$

Herein, $I^{(0)}(i, j)$ is a forward predicted value of the sample location (i,j) in the current CU, that is, a sample value of the sample location (i,j) in the reference sample values that are of the current CU and that correspond to the first list, and $I^{(1)}(i,j)$ is a backward predicted value of the sample location (i,j) in the current CU, that is, a sample value of the sample location (i,j) in the reference sample values that are of the current CU and that correspond to the second list.

After the modified motion vector is obtained according to the formulas (2-3), a final predicted value of each sample in the current picture block, that is, a sample value in a prediction block of the current picture block. may be determined according to the following formulas:

$$pred_{BIO}(i, j) = \left(I^{(0)}(i, j) + I^{(1)}(i, j) + b + o_{\mathit{offset}}\right) >> \text{shift} \quad (2\text{-}6)$$

$$b = rnd\left(\left(v_x\left(\frac{\partial I^{(1)}}{\partial x}(i, j) - \frac{\partial I^{(0)}}{\partial x}(i, j)\right)\right)/2\right) + rnd\left(\left(v_y\left(\frac{\partial I^{(1)}}{\partial y}(i, j) - \frac{\partial I^{(0)}}{\partial y}(i, j)\right)\right)/2\right)$$

Herein, shift and $o_{\mathit{offset}}$ are 15−BD and 1<<(14−BD)+2·(1<<13). rnd(.) is a rounding function (rounding off). $pred_{BIO}(i,j)$ is a predicted sample value of the sample location (i,j) of the current picture block.

Step S601: When a size of a current picture block is a second preset size, the encoding device determines a predicted sample value of the current picture block in a first processing manner based on a reference sample value corresponding to a first list and a reference sample value corresponding to a second list.

Further, the first processing manner is not BDOF. In other words, when the size of the current picture block is the second preset size, the BDOF is not allowed to be used to determine the predicted sample value of the current picture block based on the reference sample value corresponding to the first list and the reference sample value corresponding to the second list. The size of the current picture block is usually represented by a width and a height (briefly written as W×H), and the width and the height are measured by sample (sample or pixel). The second preset size includes 8×8 (the first 8 indicates that the width of the current picture block is 8 samples, and the second 8 indicates that the height of the current picture block is 8 samples), 4×N (4 indicates that the width of the current picture block is 4 samples, N indicates that the height of the current picture block is N samples, and other sizes are deduced by analogy), 8×16, or 16×8. N is a power of 2 and is greater than or equal to 8. For example, a value of N may be 16, 32, 64, or the like.

In this embodiment of this application, the reference sample value corresponding to the first list and the reference sample value corresponding to the second list are respectively obtained through prediction based on a first motion vector (for example, Mv0_L0) corresponding to the first list (that is, list0) and a second motion vector (for example, Mv1_L1) corresponding to the second list (that is, list1). For example, the reference sample value corresponding to the first list (that is, list0) can be determined based on the first motion vector (for example, Mv0_L0) corresponding to the first list (that is, list0), and the reference sample value corresponding to the second list (that is, list1) can be determined based on the second motion vector (for example, Mv1_L1) corresponding to the second list (that is, list1).

It should be noted that the first motion vector and the second motion vector are determined in different manners in different inter prediction modes. For details about how to determine the first motion vector and the second motion vector in the AMVP mode, the merge mode, and the skip mode, refer to the descriptions in step S600. Details are not described herein again.

It should be understood that the current picture block (which is also referred to as a current block) herein may be understood as a picture block that is being processed. For example, in an encoding process, the current picture block is a picture block that is being encoded (an encoding block).

Further, the foregoing described case that the second preset size includes 8×8, 4×N, 8×16, or 16×8 may also be limited to: the second preset size is 8×8, 4×N, 8×16, or 16×8. In other words, the BDOF is prohibited from being used for one of the sizes 8×8, 4×N, 8×16, and 16×8 that are listed above, or the BDOF may be prohibited from being used for a plurality of sizes thereof. The following uses examples for description.

Example 1: The second preset size includes (or is) 8×8. In other words, in this embodiment of this application, the BDOF is prohibited from being used for the size 8×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is 8×8, obtaining the predicted sample value of the current picture block through prediction in the first processing manner based on the reference sample value corresponding to the first list and the reference sample value corresponding to the second list.

Example 2: The second preset size includes (or is) 4×N. In other words, in this embodiment of this application, the BDOF is prohibited from being used for the size 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is 4×N, obtaining the predicted sample value of the current picture block through prediction in the first processing manner based on the reference sample value corresponding to the first list and the reference sample value corresponding to the second list, where N is greater than or equal to 8.

Example 3: The second preset size includes (or is) 8×8 or 4×N. In other words, in this embodiment of this application, the BDOF is prohibited from being used for the sizes 8×8 and 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is either of 8×8 and 4×N, obtaining the predicted sample value of the current picture block through prediction in the first processing manner based on the reference sample value corresponding to the first list and the reference sample value corresponding to the second list, where N is greater than or equal to 8.

Example 4: The second preset size includes (or is) 8×8, 4×N, 8×16, or 16×8, where N is greater than or equal to 8. In other words, in this embodiment of this application, the BDOF is prohibited from being used for the sizes 8×8, 4×N, 8×16, and 16×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is any one of 8×8, 4×N, 8×16, and 16×8, obtaining the predicted sample value of the current picture block through prediction in the first processing manner based on the reference sample value corresponding to the first list and the reference sample value corresponding to the second list.

Example 5: The second preset size includes (or is) N×8, where N is greater than or equal to 4. In other words, in this embodiment of this application, the BDOF is prohibited from being used for the size N×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is N×8, obtaining the predicted sample value of the current picture block through prediction in the first processing manner based on the reference sample value corresponding to the first list and the reference sample value corresponding to the second list.

Example 6: The second preset size includes (or is) N×8 or 4×N, where N is greater than or equal to 4. In other words, in this embodiment of this application, the BDOF is prohibited from being used for the size N×8 or 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is N×8 or 4×N, obtaining the predicted sample value of the current picture block through prediction in the first processing manner based on the reference sample value corresponding to the first list and the reference sample value corresponding to the second list.

In addition, because the BDOF is also prohibited from being used for a size M×4 in some scenarios, in this application, when the BDOF is prohibited from being used for the second preset size, the BDOF may be further prohibited from being used for the size M×4, where M is an integer greater than or equal to 4.

It may be understood that another case may be further obtained with reference to the foregoing cases, and the another case also falls within the protection scope of this application. It should be understood that the method in this embodiment of this application may be performed by a picture prediction apparatus such as a video encoder or an electronic device having a video encoding function, and may be performed by an inter prediction unit in the video encoder.

In an optional solution, the determining a predicted sample value of the current picture block in a first processing manner based on a reference sample value corresponding to a first list and a reference sample value corresponding to a second list includes performing weighted calculation on sample values having a same location in the reference sample value corresponding to the first list and the reference sample value corresponding to the second list, to obtain the predicted sample value of the current picture block, or obtaining the predicted sample value of the current picture block through prediction based on the reference sample value corresponding to the first list and the reference sample value corresponding to the second list according to an MMVD technology, or obtaining the predicted sample value of the current picture block through prediction based on the reference sample value corresponding to the first list and the reference sample value corresponding to the second list according to a CIIP technology.

In this embodiment of this application, whether the weighted calculation manner, the MMVD technology, or the CIIP technology is used may be determined by using a corresponding condition, or may be indicated by using corresponding indication information. Optionally, information subsequently encoded into a bitstream may further include a target identifier, and the target identifier is used to indicate a manner used to predict the predicted sample value of the current block. For example, the target identifier is mmvd_flag[x0][y0]. When mmvd_flag[x0][y0] is a preset value (for example, a value 1), it indicates that the MMVD manner is used for the current picture block.

Optionally, an MMVD implementation is provided below. As shown in FIG. 6C, predicted motion information of the current picture block is obtained. It is assumed that a forward motion vector predictor and a backward motion vector predictor (that is, the foregoing motion vector predictor corresponding to the first list and the foregoing motion vector predictor corresponding to the second list) of the current picture block are respectively MV0 (−22, 18) and MV1 (2, 12), and a forward and a backward are respectively MVD0 (1, 0) and MVD1 (−1, 0).

Forward prediction and backward prediction are separately performed on the current picture block to obtain a forward prediction block and a backward prediction block of the current picture block.

MV0 (−22, 18) and MV1 (2, 12) are used as reference input of the forward motion vector predictor and the backward motion vector predictor, and first-precision motion search is performed on a forward reference prediction block q0 and a backward reference prediction block h0. For example, the first precision is 1 sample.

The forward reference prediction block q0 and the backward reference prediction block h0 each are used as a start search point to perform first-precision motion search, and a difference between a new forward reference prediction block and a new backward reference prediction block that are found each time is determined. For example, differences between eight pairs of forward reference prediction blocks and backward reference prediction blocks around the forward reference prediction block and the backward reference prediction block are determined, and a difference between the forward reference prediction block q0 and the backward reference prediction block h0 is determined. It is assumed that motion vector predictors of a forward reference prediction block and a backward reference prediction block that have a smallest difference are respectively (−21, 18) and (1, 12). The search points are updated to (−21, 18) and (1, 12) that respectively correspond to a forward reference prediction block q1 and a backward reference prediction block h1, and first-precision motion search continues to be performed. The forward reference prediction block q1 and the backward reference prediction block h1 each are used as a start search point to perform first-precision motion search, and a difference between a forward reference prediction block and a backward reference prediction block that are found each time is determined. For example, differences between eight pairs of forward reference prediction blocks and backward reference prediction blocks around the forward reference prediction block q1 and the backward reference prediction block h1 are determined, and a difference between the forward reference prediction block q1 and the backward reference prediction block h1 is determined. It is assumed that motion vector predictors of a forward reference prediction block and a backward reference prediction block that have a smallest difference are respectively (−21, 18) and (1, 12). (−21, 18) and (1, 12) respectively correspond to a forward reference prediction block q2 and a backward reference prediction block h2.

In this embodiment of this application, a quantity of times of first-precision motion search may be configured, for example, one or two. Alternatively, a motion search range is determined. Search is stopped out of the range.

Using two times as an example, the motion vector predictor (−20, 18) of the forward reference prediction block q2 and the MVD0 (1, 0) are summed to obtain (−19, 18), and the motion vector predictor (0, 12) of the backward reference prediction block h2 and the MVD1 are summed to obtain (1, 12). Therefore, the current picture block is predicted based on the forward motion vector predictor (−19, 18) and the backward motion vector predictor (1, 12). FIG. 6C shows only one motion search process.

It should be noted that the BDOF technology is equivalent to a patch optimization technology for a conventional technology for predicting a predicted sample value of a current picture block. In many scenarios, a predicted sample value closer to a real sample value of the current picture block can be obtained according to the BDOF technology. Therefore, a sample residual obtained based on the predicted sample value is smaller, so that coding efficiency can be improved. The foregoing weighted calculation manner may be considered as a conventional technology for obtaining a predicted sample value of a current picture block, and the foregoing MMVD technology and CIIP technology each may be considered as a patch optimization technology for a conventional technology. In this embodiment of this application, when the size of the current picture block is the second preset size, the predicted sample value of the current picture block is determined according to a conventional technology (for example, the weighted calculation manner) or another patch optimization technology (for example, MMVD or CIIP) rather than the BDOF technology. This can significantly reduce coding complexity, and improve coding efficiency.

Step S602: The encoding device reconstructs the current picture block based on at least the predicted sample value of the current picture block.

It may be understood that the predicted sample value of the current picture block may be obtained in the foregoing step S600. The predicted sample value, of the current block, obtained in the step includes predicted sample values of one or more subblocks, and the one or more subblocks include a current subblock of the current picture block. A size of the subblock may be equal to that of the current block. If the current block includes only one subblock, it is equivalent to that a size of the subblock may be equal to that of the current block. The predicted sample value of the current picture block may be alternatively obtained in the foregoing step S601.

It should be noted that, in this embodiment of this application, a sample residual of the current picture block may be further obtained, and the sample residual of the current picture block may be 0. For example, a sample residual needs to be obtained in each of the merge mode and the AMVP mode. No sample residual needs to be considered in the skip mode, and therefore, no sample residual needs to be transmitted to a decoder side.

Step S603: The encoding device encodes a syntax element into a to-be-transmitted bitstream, where the syntax element is at least used to indicate that bi-directional prediction is applied.

Further, in different inter prediction modes, different syntax elements are encoded into the to-be-transmitted bitstream. Examples are as follows.

When the inter prediction mode is the AMVP mode, the syntax element includes first indices, second indices, prediction direction indication information, and an MVD, the first indices (for example, mvp_lX_flag[xCb][yCb]) are used to indicate target candidate motion vector predictors, the target candidate motion vector predictors include a first motion vector predictor corresponding to the first list (for example, list0) and a second motion vector predictor corresponding to the second list (for example, list1), and the MVD includes a first MVD corresponding to the first list and/or a second MVD corresponding to the second list. The second indices (which are also referred to as reference frame indices) are used to indicate reference frames of the current picture block, and the reference frames include a first reference frame corresponding to the first list and a second reference frame corresponding to the second list. For example, the second indices are refIdxL0 and refIdxL1, refIdxL0 is an index of the first reference frame corresponding to the first list, and refIdxL1 is an index of the second reference frame corresponding to the second list. The prediction direction indication information (for example, predFlagL0=1 and predFlagL1=1) is used to indicate that bi-directional prediction is applied.

The first motion vector (for example, Mv0_L0) corresponding to the first list is obtained based on the first motion vector predictor (for example, Mvp0_L0) corresponding to the first list and the first MVD (for example, MVD0) corresponding to the first list. For example, Mv0_L0=Mvp0_L0+MVD0.

The second motion vector (for example, Mv1_L1) corresponding to the second list is obtained based on the second motion vector predictor (for example, Mvp1_L1) corresponding to the second list and the second MVD (for example, MVD1) corresponding to the second list. For example, Mv1_L1=Mvp1_L1+MVD1.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture. Optionally, when the MMVD technology is used, only one MVD may be transmitted, and an MVD that is in another direction and that needs to be used by a decoder side may be derived based on the transmitted MVD.

When the inter prediction mode is the merge mode, the syntax element includes an index (for example, merge_idx [xCb][yCb]) of target candidate motion information, the target candidate motion information includes target candidate motion vectors, reference frame indices, and prediction direction indication information (for example, predFlagL0=1 and predFlagL1=1), the prediction direction indication information is used to indicate that bi-directional prediction is applied, the target candidate motion vectors include the first motion vector corresponding to the first list (that is, list0) and the second motion vector corresponding to the second list (that is, list1), and the reference frame indices include an index (for example, refIdxL0) of a first reference frame corresponding to the first list and an index (for example, refIdxL1) of a second reference frame corresponding to the second list.

In this embodiment of this application, the reference frame index is used to identify a reference picture corresponding to a used motion vector (for example, the first motion vector or the second motion vector) in a specified reference picture list (the first list list0 or the second list list1). The picture may be referred to as a frame, and the reference picture may be referred to as a reference frame.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In this embodiment of this application, the method further includes determining a sample residual based on a sample value of the current picture block and the predicted sample value of the current picture block, and encoding a syntax element into a to-be-transmitted bitstream includes encoding the syntax element and the sample residual into the to-be-transmitted bitstream. In other words, in addition to the syntax element, the sample residual may be further encoded into the to-be-transmitted bitstream (the sample residual may be obtained through calculation by using a residual calculation unit). This solution may be applied to the AMVP mode and the merge mode. In addition, there is also a case in which no sample residual needs to be encoded into a to-be-transmitted bitstream. For example, in the skip mode, no sample residual needs to be encoded into a to-be-transmitted bitstream.

Figure 7:
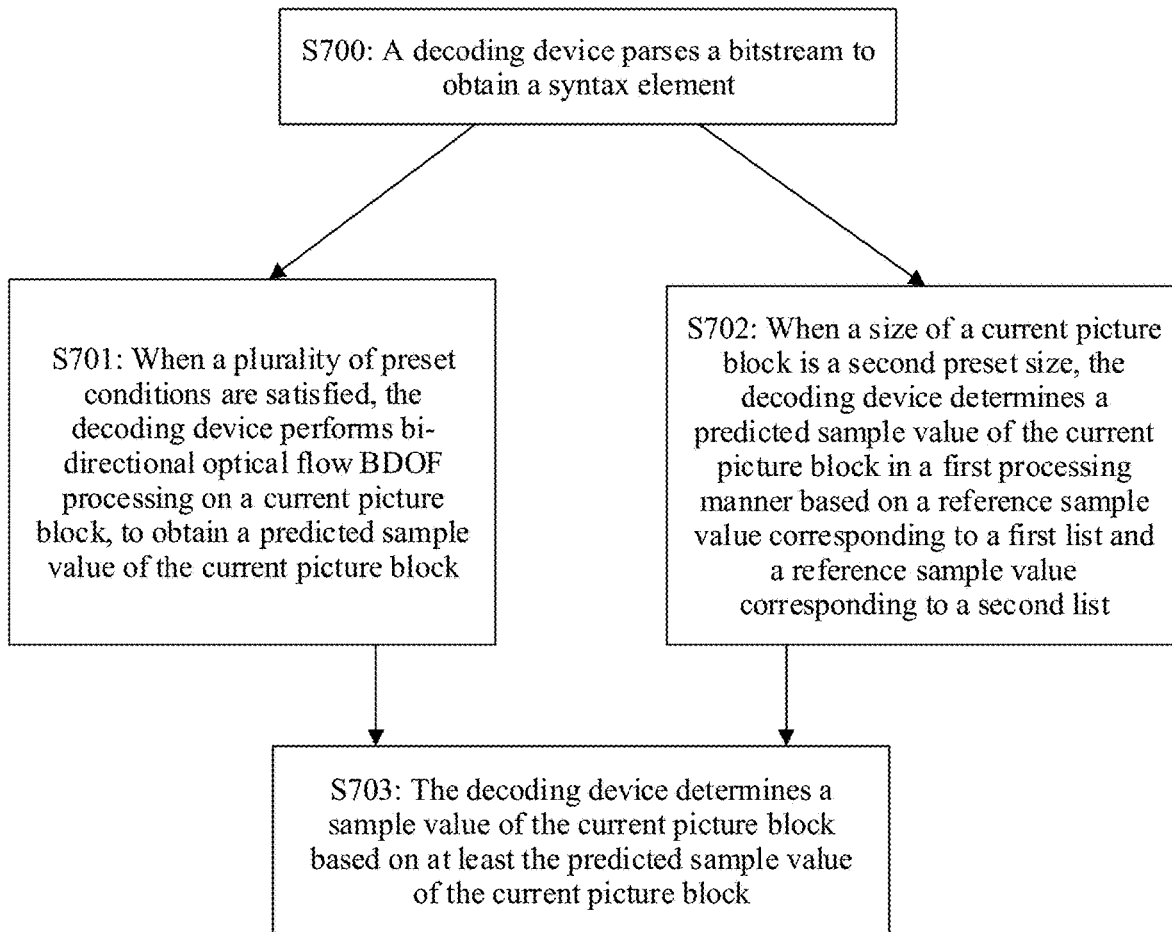
FIG. 7 is a schematic flowchart of a decoding method according to an embodiment of this application.

FIG. 7 is a flowchart of a decoding method according to an embodiment of this application. This procedure may be performed by a video decoding device. The video decoding device may be the foregoing video decoder 30, or may be a device including the video decoder 30. Further, the procedure may be performed by the inter prediction unit (or an inter predictor) 344, the entropy decoding unit (or an entropy decoder) 304, and the like of the video decoder 30. The procedure is described as a series of steps or operations. The steps or operations of the procedure may be performed in various sequences and/or simultaneously, and are not limited to an execution sequence shown in FIG. 7. Related descriptions of the procedure shown in FIG. 7 are as follows.

Step S700: The decoding device parses a bitstream to obtain a syntax element, where the syntax element is at least used to indicate that bi-directional prediction is applied.

Further, if an encoder side uses different inter prediction modes in an encoding process, the decoding device may obtain different syntax elements by parsing the bitstream. The following provides detailed descriptions with reference to an AMVP mode, a merge mode, and a skip mode.

In the AMVP mode, the syntax element includes first indices, second indices, prediction direction indication information, and a MVD, the first indices (for example, mvp_lX_flag[xCb][yCb]) are used to indicate target candidate motion vector predictors, the target candidate motion vector predictors include a first motion vector predictor corresponding to a first list (for example, list0) and a second motion vector predictor corresponding to a second list (for example, list1), and the MVD includes a first MVD corresponding to the first list and/or a second MVD corresponding to the second list (for example, when only one MVD is included, an MVD that is not transmitted may be derived based on the transmitted MVD). The second indices (or reference frame indices) are used to indicate reference frames of a current picture block, and the reference frames include a first reference frame corresponding to the first list and a second reference frame corresponding to the second list. For example, the second indices are refIdxL0 and refIdxL1, refIdxL0 is an index of the first reference frame corresponding to the first list, and refIdxL1 is an index of the second reference frame corresponding to the second list. The prediction direction indication information (for example, predFlagL0=1 and predFlagL1=1) is used to indicate that bi-directional prediction is applied.

A first motion vector (for example, Mv0_L0) corresponding to the first list is obtained based on the first motion vector predictor (for example, Mvp0_L0) corresponding to the first list and the first MVD (for example, MVD0) corresponding to the first list. For example, Mv0_L0=Mvp0_L0+MVD0.

A second motion vector (for example, Mv1_L1) corresponding to the second list is obtained based on the second motion vector predictor (for example, Mvp1_L1) corresponding to the second list and the second MVD (for example, MVD1) corresponding to the second list. For example, Mv1_L1=Mvp1_L1+MVD1.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In the merge mode, the syntax element includes an index (for example, merge_idx[xCb][yCb]) of target candidate motion information, the target candidate motion information includes target candidate motion vectors, reference frame indices, and prediction direction indication information (for example, predFlagL0=1 and predFlagL1=1), the prediction direction indication information is used to indicate that bi-directional prediction is applied, the target candidate motion vectors include a first motion vector corresponding to a first list (that is, list0) and a second motion vector corresponding to a second list (that is, list1), and the reference frame indices include an index (for example, refIdxL0) of a first reference frame corresponding to the first list and an index (for example, refIdxL1) of a second reference frame corresponding to the second list.

In this embodiment of this application, the reference frame index is used to identify a reference picture corresponding to a used motion vector (for example, the first motion vector or the second motion vector) in a specified reference picture list (the first list list0 or the second list list1). The picture may be referred to as a frame, and the reference picture may be referred to as a reference frame.

In the video coding field, inter prediction modes include forward prediction, backward prediction, and bi-directional prediction (including forward prediction and backward prediction), and a specific prediction mode used by an encoder side is usually indicated by prediction direction indication information. For example, the prediction direction indication information may include syntax elements predFlagL0 and predFlagL1. When predFlagL0=1, and predFlagL1=1, the prediction direction indication information indicates that bi-directional prediction is applied. When predFlagL0=1, and predFlagL1=0, the prediction direction indication information indicates that forward prediction is used. When predFlagL0=0, and predFlagL1=1, the prediction direction indication information indicates that backward prediction is used. It may be understood that "forward" and "backward" respectively correspond to a reference picture list0 (list0, namely, the foregoing first list) and a reference picture list1 (list1, namely, the foregoing second list) of a current picture.

In the skip mode, content included in the syntax element is the same as content included in the syntax element in the merge mode, and a difference lies in that no sample residual needs to be transmitted in the skip mode.

In this embodiment of this application, in one case, for example, in the AMVP mode and the merge mode, the syntax element and a sample residual are obtained by parsing the bitstream. In another case, for example, in the skip mode, the syntax element is obtained by parsing the bitstream, but no sample residual is obtained through parsing.

After the bitstream is parsed, whether a plurality of preset conditions is satisfied is first determined, and if the plurality of preset conditions or all preset conditions are satisfied, S701 is performed, or if the plurality of preset conditions are not satisfied, S702 is performed. For the case in which the plurality of preset conditions is not satisfied, only the case in S702 is used as a representative for detailed description herein. Other cases that are the same as those in the other approaches are not described in this application.

Step S701: When the plurality of preset conditions is satisfied, the decoding device performs BDOF processing on a current picture block, to obtain a predicted sample value of the current picture block.

The BDOF may further be referred to as BIO.

The plurality of preset conditions includes at least a condition that a size of the current picture block satisfies a first preset size. The size of the current picture block is usually represented by a width and a height (briefly written as W×H), and the width and the height are measured by sample (sample or pixel). For example, if the size of the current picture block is 8×8, the first 8 indicates that the width of the current picture block is 8 samples, and the second 8 indicates that the height of the current picture block is 8 samples. For another example, if the size of the current picture block is 8×16, 8 indicates that the width of the current picture block is 8 samples, and 16 indicates that the height of the current picture block is 16 samples.

That a size of the current picture block satisfies a first preset size includes (or is): the height H of the current picture block is greater than or equal to 8, and when a product of the width W and the height H of the current picture block is equal to 64, the width W is not equal to the height H.

Alternatively, that a size of the current picture block satisfies a first preset size includes (or is): the height H of the current picture block is greater than or equal to 8, and the width W of the current picture block is greater than or equal to 8.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes (or is): the height H of the current picture block is greater than 8.

Alternatively, that a size of the current picture block satisfies a first preset size includes (or is): the height H of the current picture block is greater than 8, and the width W of the current picture block is greater than or equal to 8.

It should be noted that before whether to determine (or obtain through prediction) the predicted sample value of the current picture block based on a reference sample value corresponding to a first list and a reference sample value corresponding to a second list according to the BDOF technology is determined, there may be another reference condition in addition to the size of the current picture block. The another reference condition is not limited herein. For ease of understanding, the following uses examples for description.

Condition A: There is a high-level syntax identifier sps_bdof_enabled_flag indicating that the BDOF technology is allowed to be used for a current video sequence.

Condition B: Prediction direction indication information predFlagL0 corresponding to a first list (list1) is equal to 1, and prediction direction indication information predFlagL1 corresponding to a second list (list0) is equal to 1.

Condition C: A picture order count POC_L0 of a reference frame corresponding to a first list (list0), a picture order count POC_L1 of a reference frame corresponding to a second list (list1), and a picture order count POC_Cur of a picture in which the current picture block is located satisfy the following relationship: (POC_L0−POC_Cur)×(POC_L1−POC_Cur)<0. In other words, the picture including the current picture block is between two reference pictures.

Condition D: MotionModelIdc[xCb][yCb] is equal to 0. MotionModelIdc is a motion model index for motion compensation. The MotionModelIdc[xCb][yCb] equal to 0 indicates that a motion model for motion compensation of the current block is translational motion.

Condition E: merge_subblock_flag[x0][y0] is equal to 0, where merge_subblock_flag[x0][y0] equal to 0 indicates that a subblock merge mode is not applied for the current picture block.

Condition F: sym_mvd_flag[x0][y0] is equal to 0. sym_mvd_flag[x0][y0] equal to 0 indicates that mvd_coding (x0, y0, refList, cpIdx) syntax structure is present for the current block.

Condition G: bcwIdx[xCb][yCb] is equal to 0. bcwIdx indicates a bi-directional prediction weight index for the current picture block.

Condition H: cIdx is equal to 0. cIdx represents a colour component index of the current picture block.

Condition I: The size of the current picture block is the first preset size.

Condition J: Both luma_weight_l0_flag[refIdxL0] and luma_weight_l1_flag[refIdxL1] are equal to 0, where luma_weight_l0_flag equal to 0 indicates that weighting factors for a luma component of list0 prediction are not present, and luma_weight_l1_flag equal to 0 indicates that weighting factors for a luma component of list1 prediction are not present.

For example, when all of the conditions A to J are satisfied, it is determined that the BDOF technology may be used to predict the predicted sample value of the current picture block. For example, bdofFlag is set to true. It should be noted that the foregoing conditions are merely examples, and another condition may be further added, or one or more of the foregoing conditions may be replaced, or one or more of the foregoing conditions may be removed.

It should be understood that the current picture block (or a current block) herein may be understood as a picture block that is being processed. For example, in a decoding process, the current picture block is a picture block that is being decoded (a decoding block).

It may be understood that another case may be further obtained with reference to the foregoing cases, and the another case also falls within the protection scope of this application.

It should be understood that the method in this embodiment of this application may be performed by a picture prediction apparatus such as a video decoder or an electronic device having a video decoding function, and may be performed by a motion compensation unit in the video decoder.

To be specific, a condition for using the BDOF technology in this solution is different from a condition for using the BDOF technology in the other approaches, and in particular, requirements for the size of the current picture block are different. The BDOF technology is used for the current picture block having the first preset size, so that a predicted sample value closer to a real sample value can be obtained, coding complexity can be properly controlled, and coding efficiency can be improved.

In this embodiment of this application, that the decoding device performs BDOF processing on the current picture block when the plurality of preset conditions are satisfied may be when the plurality of preset conditions are satisfied, the decoding device performs BDOF processing on the current picture block based on a reference sample value corresponding to a first list and a reference sample value corresponding to a second list.

In this embodiment of this application, the reference sample value corresponding to the first list and the reference sample value corresponding to the second list are respectively obtained through prediction based on a first motion vector (for example, Mv0_L0) corresponding to the first list (that is, list0) and a second motion vector (for example, Mv1_L1) corresponding to the second list (that is, list1). For example, the reference sample value corresponding to the first list (that is, list0) can be determined based on the first motion vector (for example, Mv0_L0) corresponding to the first list (that is, list0), and the reference sample value corresponding to the second list (that is, list1) can be determined based on the second motion vector (for example, Mv1_L1) corresponding to the second list (that is, list1).

It may be understood that the first motion vector (for example, Mv0_L0) corresponding to the first list (that is, list0) and the second motion vector (for example, Mv1_L1) corresponding to the second list (that is, list1) are obtained in different manners in different inter prediction modes. A specific to-be-used inter prediction mode may be selected by using a mode selection unit. The following separately describes how to determine the first motion vector and the second motion vector in the AMVP mode, the merge mode, and the skip mode.

Possible case 1: The inter prediction mode is the AMVP mode.

The decoding device first constructs a candidate motion vector predictor MVP list.

Further, the decoding device constructs the candidate motion vector predictor MVP list (or a candidate motion vector list) by using the inter prediction unit (or an inter prediction module). The constructed candidate motion vector predictor MVP list may be a triplet candidate motion vector predictor MVP list or a 2-tuple candidate motion vector predictor MVP list. In this embodiment of this application, the decoding device performs inter prediction in a bi-directional prediction manner.

Then, the decoding device determines target candidate motion information in the MVP list based on an index corresponding to the target candidate motion information.

Further, the target candidate motion information may also be referred to as an optimal candidate motion vector, or may have another name.

Subsequently, the first motion vector and the second motion vector are determined based on the target candidate motion information. The target candidate motion information includes a first motion vector predictor (for example, Mvp0_L0) corresponding to the first list (that is, list0) and a predictor (for example, Mvp1_L1) corresponding to the second list (that is, list1). For example, the first motion vector Mv0_L0 (forward) corresponding to the first list (list0) may be obtained based on a sum of the first motion vector predictor Mvp0_L0 and a MVD0. Likewise, the second motion vector Mv1_L1 may be obtained based on a sum of the second motion vector predictor Mvp1_L1 and a MVD1. Optionally, the first motion vector (for example, Mv0_L0) corresponding to the first list (that is, list0) herein may also be expressed as a first motion vector corresponding to a first direction (for example, a forward direction), and the second motion vector (for example, Mvp_L1) corresponding to the second list (that is, list1) may also be expressed as a second motion vector corresponding to a second direction (for example, a backward direction).

Possible case 2: The inter prediction mode is the merge mode.

The decoding device first constructs a candidate motion information list.

Further, the decoding device constructs the candidate motion information list (or a candidate motion vector list) by using the inter prediction unit (or an inter prediction module).

Then, the decoding device determines target candidate motion information in the candidate motion information list based on an index corresponding to the target candidate motion information.

Further, the target candidate motion information includes target candidate motion vectors, reference frame indices, and prediction direction indication information, the prediction direction indication information is used to indicate that bi-directional prediction is applied, the target candidate motion vectors include the first motion vector corresponding to the first list and the second motion vector corresponding to the second list, and the reference frame indices include an index of a first reference frame corresponding to the first list and an index of a second reference frame corresponding to the second list.

The target candidate motion information may also be referred to as optimal candidate motion information, or may have another name.

Possible case 3: The inter prediction mode is the skip mode. For related descriptions, refer to the descriptions of the merge mode in the foregoing case 2. A difference from the merge mode lies in that no sample residual needs to be transmitted in the skip mode.

Referring to FIG. 6B, in this embodiment of this application, a current picture to which the current picture block belongs has two reference pictures: a previous reference picture and a following reference picture, which are respectively a first reference picture (for example, a forward reference picture or a forward reference frame, where the "forward" herein may also be referred to as a first direction) and a second reference picture (for example, a backward reference picture or a backward reference frame, where the "backward" herein may also be referred to as a second direction). The reference sample value corresponding to the first list is a reference sample value on the first reference picture, and the reference sample value corresponding to the second list is a reference sample value on the second reference picture.

Optionally, obtaining the predicted sample value of the current picture block through prediction based on the reference sample value corresponding to the first list and the reference sample value corresponding to the second list according to the BDOF technology may include deriving a modified motion vector of each subblock of the current picture block based on the reference sample value corresponding to the first list and the reference sample value corresponding to the second list according to the BDOF technology, and then performing motion compensation on each subblock based on the modified motion vector, to obtain a predicted sample value of each subblock, so as to obtain the predicted sample value of the current block. For ease of understanding, the following provides an example for description.

A sample value in the reference sample value corresponding to the first list (list0) may be expressed as $I^{(0)}(i, j)$, and a sample value in the reference sample value corresponding to the second list (list1) may be expressed as $I^{(1)}(i, j)$. The two values may be collectively referred to as forward and backward predicted values $I^{(k)}(i,j)$, where $i=0 \ldots cuW-1$, $j=0 \ldots cuH-1$, and k may be 0 and 1. Herein, $I^{(k)}(i,j)$ may be obtained by using an 8-tap interpolation filter through interpolation, and a sample value at another location (expansion by one row and one column is performed) is obtained by using a bilinear interpolation filter through interpolation. It should be noted that a sample value of an expanded area may be alternatively obtained by using another method, for example, may be obtained by using an 8-tap interpolation filter, or may directly be a reference sample value at an integer sample location. This is not limited herein. Herein, cuW and cuH are respectively the width and the height of the current picture block. The obtaining the predicted sample value of the current picture block through prediction based on the reference sample value corresponding to the first list and the reference sample value corresponding to the second list according to the BDOF technology may include the following steps.

Step 1: Calculate a sum of absolute differences SAD between sample values in reference sample values corresponding to the first list and sample values in reference sample values corresponding to the second list, determine whether the SAD is less than a threshold TH_CU, and if the SAD is less than the threshold TH_CU, skip performing BDOF, or if the SAD is not less than the threshold TH_CU, perform BDOF. This step is optional.

A SAD calculation formula is as follows:

$$SAD = \sum_{j=0\ldots cuH-1} \sum_{i=0\ldots cuW-1} abs(I^{(1)}(i, j) - I^{(0)}(i, j)) \quad (2\text{-}1)$$

The threshold TH_CU may be set to $(1<<(BD-8+shift))\times cuW\times cuH$, and shift is $Max(2, 14-BD)$.

Alternatively, TH_CU may be set to $1<<(BD-3+shift)$.

Optionally, whether to perform BDOF may be alternatively determined in other manners, and the other manners are not listed one by one herein.

When it is determined to perform BDOF, step 4 continues to be performed.

Step 2: Calculate a horizontal gradient value and a vertical gradient value of forward and backward predicted values of a current CU.

The horizontal gradient value $$\frac{\partial I^{(k)}}{\partial x}(i, j)$$

and the vertical gradient value $$\frac{\partial I^{(k)}}{\partial y}(i, j)$$

of the forward and backward predicted values of the current CU include a horizontal gradient value $$\frac{\partial I^{(0)}}{\partial x}(i, j)$$

and a vertical gradient value $$\frac{\partial I^{(0)}}{\partial y}(i, j)$$

at a sample location (i,j) in the reference sample values corresponding to the first list, and a horizontal gradient value $$\frac{\partial I^{(1)}}{\partial x}(i, j)$$

and a vertical gradient value $$\frac{\partial I^{(1)}}{\partial y}(i, j)$$

at a sample location (i,j) in the reference sample values corresponding to the second list, where k is successively set to 0 and 1. The horizontal gradient value $$\frac{\partial I^{(k)}}{\partial x}(i, j)$$

and the vertical gradient value $$\frac{\partial I^{(k)}}{\partial y}(i, j)$$

may be obtained by using the following formulas:

$$\frac{\partial I^{(k)}}{\partial x}(i, j) = (I^{(k)}(i+1, j) - I^{(k)}(i-1, j)) \gg 4 \quad (2\text{-}2)$$

$$\frac{\partial I^{(k)}}{\partial y}(i, j) = (I^{(k)}(i, j+1) - I^{(k)}(i, j-1)) \gg 4$$

Herein, $i=0 \ldots cuW-1$, and $j=0 \ldots cuH-1$.

A cuW×cuH prediction matrix for the current picture block may be obtained in this step.

Step 4 Perform expansion on the forward and backward predicted values of the current CU, the horizontal gradient value, and the vertical gradient value through padding.

Calculating a modified motion vector of a 4×4 subblock requires forward and backward predicted values $I^{(k)}(x, y)$ of a 6×6 area in which the 4×4 subblock is located, a horizontal gradient value $$\frac{\partial I^{(k)}}{\partial x}(i,j)$$

of the forward and backward predicted values, and a vertical gradient value $$\frac{\partial I^{(k)}}{\partial y}(i,j)$$

of the forward and backward predicted values. Calculating a gradient value of the 6×6 area requires forward and backward predicted values of an 8×8 area. Therefore, when the forward and backward predicted values are to be obtained by using an interpolation filter, expansion by two rows and two columns needs to be performed around to obtain a prediction sample block whose size is (W+4)×(H+4), so as to calculate a gradient value of (W+2)×(H+2), where W is the width of the current CU, and H is the height of the current CU. To reduce complexity of BDOF, special processing may be performed on a boundary of the CU. Details are as follows.

A predicted value of a W×H area is first obtained by using an 8-tap filter, the area is expanded around by only one row and one column, and a predicted value of an expanded area is obtained by using a bilinear filter, so as to obtain a predicted value of a (W+2)×(H+2) area.

Then, a gradient value of the W×H area may be obtained through calculation based on the predicted value of the (W+2)×(H+2) area according to a formula.

Finally, according to a padding method, the gradient value of the W×H area is expanded around to obtain a horizontal gradient value and a vertical gradient value of the (W+2)×(H+2) area. The predicted value of the W×H area is expanded around to obtain the predicted value of the (W+2)×(H+2) area.

Padding is shown in FIG. 6D. Padding is performed according to a method in FIG. 6D, to obtain $I^{(k)}(i,j)$, $$\frac{\partial I^{(k)}}{\partial x}(i,j), \text{ and } \frac{\partial I^{(k)}}{\partial y}(i,j),$$

where i=−1 . . . cuW, and j=−1 . . . cuH. To be specific, a (cuW+2)×(cuH+2) prediction matrix, a horizontal gradient matrix, and a vertical gradient matrix are obtained.

Step 5: Derive a modified motion vector of each 4×4 subblock, and then perform weighting.

For each 4×4 subblock, the modified motion vector ($v_x$, $v_y$) is obtained according to formulas (2-3). Further, the modified motion vector ($v_x$, $v_y$) of each 4×4 subblock is obtained by applying BDOF to a 6×6 window D. around the subblock to minimize predicted values of L0 and L1. Further, ($v_x$, $v_y$) is derived according to the following formulas:

$$v_x = S_1 > 0 ? \text{clip3}(-th'_{BIO}, th'_{BIO}, -((S_3 \cdot 2^3) >> \lfloor \log_2 S_1 \rfloor)) : 0$$

$$v_y = S_5 > 0 ? \text{clip3}(-th'_{BIO}, th'_{BIO}, -((S_6 \cdot 2^3 - ((v_x S_{2,m}) << 12 + v_x S_{2,s})/2) >> \lfloor \log_2 S_5 \rfloor)) : 0. \quad (2\text{-}3)$$

Herein, $\lfloor \cdot \rfloor$ is a floor function (where floor(A) represents a maximum integer not greater than A). $th'_{BIO} = 2^{13-BD}$ and is a threshold for preventing error transfer caused due to an excessively large modified motion vector. $S_{2,m} = S_2 >> 12$, and $S_{2,s} = S_2 \& (2^{12}-1)$. BD is a current sample bit width.

$S_1$, $S_2$, $S_3$, $S_5$, and $S_6$ are calculated according to the following formulas:

$$S_1 = \sum_{(i,j)\in\Omega} \psi_x(i,j) \cdot \psi_x(i,j) \quad (2\text{-}4)$$

$$S_3 = \sum_{(i,j)\in\Omega} \theta(i,j) \cdot \psi_x(i,j)$$

$$S_2 = \sum_{(i,j)\in\Omega} \psi_x(i,j) \cdot \psi_y(i,j)$$

$$S_5 = \sum_{(i,j)\in\Omega} \psi_y(i,j) \cdot \psi_y(i,j)$$

$$S_6 = \sum_{(i,j)\in\Omega} \theta(i,j) \cdot \psi_y(i,j)$$

Herein, $$\psi_x(i,j) = \left(\frac{\partial I^{(1)}}{\partial x}(i,j) + \frac{\partial I^{(0)}}{\partial x}(i,j)\right) \gg 3 \quad (2\text{-}5)$$

$$\psi_y(i,j) = \left(\frac{\partial I^{(1)}}{\partial y}(i,j) + \frac{\partial I^{(0)}}{\partial y}(i,j)\right) \gg 3$$

$$\theta(i,j) = (I^{(1)}(i,j) \gg 6) - (I^{(0)}(i,j) \gg 6)$$

Herein, $I^{(0)}(i,j)$ is a forward predicted value of the sample location (i,j) in the current CU, that is, a sample value of the sample location (i,j) in the reference sample values that are of the current CU and that correspond to the first list, and $I^{(1)}(i,j)$ is a backward predicted value of the sample location (i,j) in the current CU, that is, a sample value of the sample location (i,j) in the reference sample values that are of the current CU and that correspond to the second list.

After the modified motion vector is obtained according to the formulas (2-3), a final predicted value of each sample in the current picture block, that is, a sample value in a prediction block of the current picture block, may be determined according to the following formulas:

$$pred_{BIO}(i,j) = (I^{(0)}(i,j) + I^{(1)}(i,j) + b + o_{offset}) \gg \text{shift} \quad (2\text{-}6)$$

$$b = rnd\left(\left(v_x\left(\frac{\partial I^{(1)}}{\partial x}(i,j) - \frac{\partial I^{(0)}}{\partial x}(i,j)\right)\right)/2\right) + rnd\left(\left(v_y\left(\frac{\partial I^{(1)}}{\partial y}(i,j) - \frac{\partial I^{(0)}}{\partial y}(i,j)\right)\right)/2\right)$$

Herein, shift and $o_{offset}$ are 15−BD and 1<<(14−BD)+2·(1<<13). rnd(.) is a rounding function (rounding off). $pred_{BIO}(i,j)$ is a sample value of a sample location (i,j) in the prediction block.

Step S702: When a size of a current picture block is a second preset size, the decoding device determines a predicted sample value of the current picture block in a first processing manner based on a reference sample value corresponding to a first list and a reference sample value corresponding to a second list.

Further, the first processing manner is not BDOF. In other words, when the size of the current picture block is the second preset size, the BDOF is not allowed to be used to determine the predicted sample value of the current picture block based on the reference sample value corresponding to the first list and the reference sample value corresponding to the second list. The size of the current picture block is usually represented by a width and a height (briefly written as W×H), and the width and the height are measured by sample (sample or pixel). The second preset size includes 8×8 (the first 8 indicates that the width of the current picture block is 8 samples, and the second 8 indicates that the height of the current picture block is 8 samples), 4×N (4 indicates that the width of the current picture block is 4 samples, N indicates that the height of the current picture block is N samples, and other sizes are deduced by analogy), 8×16, or 16×8. N is a power of 2 and is greater than or equal to 8. For example, a value of N may be 16, 32, 64, or the like.

In this embodiment of this application, the reference sample value corresponding to the first list and the reference sample value corresponding to the second list are respectively obtained through prediction based on a first motion vector (for example, Mv0_L0) corresponding to the first list (that is, list0) and a second motion vector (for example, Mv1_L1) corresponding to the second list (that is, list1). For example, the reference sample value corresponding to the first list (that is, list0) can be determined based on the first motion vector (for example, Mv0_L0) corresponding to the first list (that is, list0), and the reference sample value corresponding to the second list (that is, list1) can be determined based on the second motion vector (for example, Mv1_L1) corresponding to the second list (that is, list1).

It should be noted that the first motion vector and the second motion vector are determined in different manners in different inter prediction modes. For details about how to determine the first motion vector and the second motion vector in the AMVP mode, the merge mode, and the skip mode, refer to the descriptions in step S701. Details are not described herein again.

It should be understood that the current picture block (which is also referred to as a current block) herein may be understood as a picture block that is being processed. For example, in an encoding process, the current picture block is a picture block that is being encoded (an encoding block).

Further, the foregoing described case that the second preset size includes 8×8, 4×N, 8×16, or 16×8 may also be limited to the second preset size is 8×8, 4×N, 8×16, or 16×8. In other words, the BDOF is prohibited from being used for one of the sizes 8×8, 4×N, 8×16, and 16×8 that are listed above, or the BDOF may be prohibited from being used for a plurality of sizes thereof. The following uses examples for description.

Example 1: The second preset size includes (or is) 8×8. In other words, in this embodiment of this application, the BDOF is prohibited from being used for the size 8×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is 8×8, obtaining the predicted sample value of the current picture block through prediction in the first processing manner based on the reference sample value corresponding to the first list and the reference sample value corresponding to the second list.

Example 2: The second preset size includes (or is) 4×N. In other words, in this embodiment of this application, the BDOF is prohibited from being used for the size 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is 4×N, obtaining the predicted sample value of the current picture block through prediction in the first processing manner based on the reference sample value corresponding to the first list and the reference sample value corresponding to the second list, where N is greater than or equal to 8.

Example 3: The second preset size includes (or is) 8×8 or 4×N. In other words, in this embodiment of this application, the BDOF is prohibited from being used for the sizes 8×8 and 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is either of 8×8 and 4×N, obtaining the predicted sample value of the current picture block through prediction in the first processing manner based on the reference sample value corresponding to the first list and the reference sample value corresponding to the second list, where N is greater than or equal to 8.

Example 4: The second preset size includes (or is) 8×8, 4×N, 8×16, or 16×8, where N is greater than or equal to 8. In other words, in this embodiment of this application, the BDOF is prohibited from being used for the sizes 8×8, 4×N, 8×16, and 16×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is any one of 8×8, 4×N, 8×16, and 16×8, obtaining the predicted sample value of the current picture block through prediction in the first processing manner based on the reference sample value corresponding to the first list and the reference sample value corresponding to the second list.

Example 5: The second preset size includes (or is) N×8, where N is greater than or equal to 4. In other words, in this embodiment of this application, the BDOF is prohibited from being used for the size N×8. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is N×8, obtaining the predicted sample value of the current picture block through prediction in the first processing manner based on the reference sample value corresponding to the first list and the reference sample value corresponding to the second list.

Example 6: The second preset size includes (or is) N×8 or 4×N, where N is greater than or equal to 4. In other words, in this embodiment of this application, the BDOF is prohibited from being used for the size N×8 or 4×N. In this case, the obtaining a predicted sample value of a current picture block through prediction in a first processing manner based on a reference sample value corresponding to a first list and a reference sample value corresponding to a second list when a size of the current picture block is a second preset size may be expressed as: when the size of the current picture block is N×8 or 4×N, obtaining the predicted sample value of the current picture block through prediction in the first processing manner based on the reference sample value corresponding to the first list and the reference sample value corresponding to the second list.

In addition, because the BDOF is also prohibited from being used for a size M×4 in some scenarios, in this application, when the BDOF is prohibited from being used for the second preset size, the BDOF may be further prohibited from being used for the size M×4, where M is an integer greater than or equal to 4.

It may be understood that another case may be further obtained with reference to the foregoing cases, and the another case also falls within the protection scope of this application. It should be understood that the method in this embodiment of this application may be performed by a picture prediction apparatus such as a video decoder or an electronic device having a video decoding function, and may be performed by an inter prediction unit in the video decoder.

In an optional solution, the determining a predicted sample value of the current picture block in a first processing manner based on a reference sample value corresponding to a first list and a reference sample value corresponding to a second list includes performing weighted calculation on sample values having a same location in the reference sample value corresponding to the first list and the reference sample value corresponding to the second list, to obtain the predicted sample value of the current picture block, or obtaining the predicted sample value of the current picture block through prediction based on the reference sample value corresponding to the first list and the reference sample value corresponding to the second list according to an MMVD technology, or obtaining the predicted sample value of the current picture block through prediction based on the reference sample value corresponding to the first list and the reference sample value corresponding to the second list according to a CIIP technology, or obtaining the predicted sample value of the current picture block through prediction based on the reference sample value corresponding to the first list and the reference sample value corresponding to the second list according to a DMVR technology.

In this embodiment of this application, whether the weighted calculation manner, the MMVD technology, the CIIP technology, or the DMVR technology is used may be determined by using a corresponding condition, or may be indicated by using corresponding indication information.

In this embodiment of this application, whether the weighted calculation manner, the MMVD technology, or the CIIP technology is used may be determined by using a corresponding condition, or may be indicated by using corresponding indication information. Optionally, information subsequently encoded into a bitstream may further include a target identifier, and the target identifier is used to indicate a manner used to predict the predicted sample value of the current block. For example, the target identifier is mmvd_flag[x0][y0]. When mmvd_flag[x0][y0] is a preset value (for example, a value 1), it indicates that the MMVD manner is used for the current picture block.

Optionally, an MMVD implementation is provided below. As shown in FIG. 6C, predicted motion information of the current picture block is obtained. It is assumed that a forward motion vector predictor and a backward motion vector predictor (that is, the foregoing motion vector predictor corresponding to the first list and the foregoing motion vector predictor corresponding to the second list) of the current picture block are respectively MV0 (−22, 18) and MV1 (2, 12), and a forward and a backward are respectively MVD0 (1, 0) and MVD1 (−1, 0).

Forward prediction and backward prediction are separately performed on the current picture block to obtain a forward prediction block and a backward prediction block of the current picture block.

MV0 (−22, 18) and MV1 (2, 12) are used as reference input of the forward motion vector predictor and the backward motion vector predictor, and first-precision motion search is performed on a forward reference prediction block q0 and a backward reference prediction block h0. For example, the first precision is 1 sample.

The forward reference prediction block q0 and the backward reference prediction block h0 each are used as a start search point to perform first-precision motion search, and a difference between a new forward reference prediction block and a new backward reference prediction block that are found each time is determined. For example, differences between eight pairs of forward reference prediction blocks and backward reference prediction blocks around the forward reference prediction block and the backward reference prediction block are determined, and a difference between the forward reference prediction block q0 and the backward reference prediction block h0 is determined. It is assumed that motion vector predictors of a forward reference prediction block and a backward reference prediction block that have a smallest difference are respectively (−21, 18) and (1, 12). The search points are updated to (−21, 18) and (1, 12) that respectively correspond to a forward reference prediction block q1 and a backward reference prediction block h1, and first-precision motion search continues to be performed. The forward reference prediction block q1 and the backward reference prediction block h1 each are used as a start search point to perform first-precision motion search, and a difference between a forward reference prediction block and a backward reference prediction block that are found each time is determined. For example, differences between eight pairs of forward reference prediction blocks and backward reference prediction blocks around the forward reference prediction block q1 and the backward reference prediction block h1 are determined, and a difference between the forward reference prediction block q1 and the backward reference prediction block h1 is determined. It is assumed that motion vector predictors of a forward reference prediction block and a backward reference prediction block that have a smallest difference are respectively (−21, 18) and (1, 12). (−21, 18) and (1, 12) respectively correspond to a forward reference prediction block q2 and a backward reference prediction block h2.

In this embodiment of this application, a quantity of times of first-precision motion search may be configured, for example, one or two. Alternatively, a motion search range is determined. Search is stopped out of the range.

Using two times as an example, the motion vector predictor (−20, 18) of the forward reference prediction block q2 and the MVD0 (1, 0) are summed to obtain (−19, 18), and the motion vector predictor (0, 12) of the backward reference prediction block h2 and the MVD1 are summed to obtain (1, 12). Therefore, the current picture block is predicted based on the forward motion vector predictor (−19, 18) and the backward motion vector predictor (1, 12). FIG. 6C shows only one motion search process.

It should be noted that the BDOF technology is equivalent to a patch optimization technology for a conventional technology for predicting a predicted sample value of a current picture block. In many scenarios, a predicted sample value closer to a real sample value of the current picture block can be obtained according to the BDOF technology. Therefore, a sample residual obtained based on the predicted sample value is smaller, so that coding efficiency can be improved. The foregoing weighted calculation manner may be considered as a conventional technology for obtaining a predicted sample value of a current picture block, and the foregoing MMVD technology and CIIP technology each may be considered as a patch optimization technology for a conventional technology. In this embodiment of this application, when the size of the current picture block is the second preset size, the predicted sample value of the current picture block is determined according to a conventional technology (for example, the weighted calculation manner) or another patch optimization technology (for example, MMVD or CIIP) rather than the BDOF technology. This can significantly reduce coding complexity, and improve coding efficiency.

Step S703: The decoding device determines a sample value of the current picture block based on at least the predicted sample value of the current picture block.

For example, in the AMVP mode and the merge mode, a sample residual is added to the predicted sample value of the current block to obtain the sample value of the current block. In the skip mode, no sample residual is required when the sample value of the current block is determined.

Figure 8:
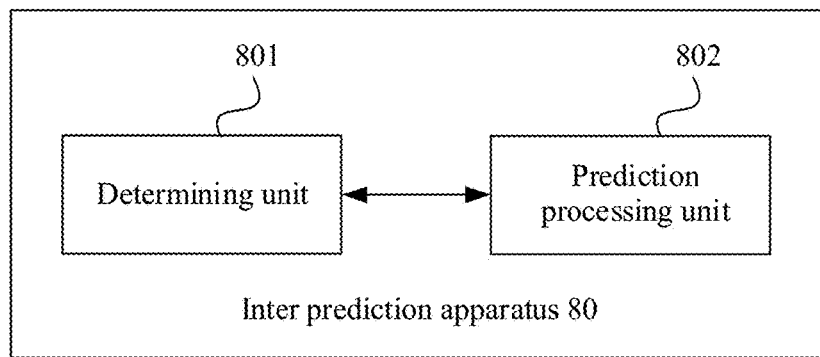
FIG. 8 is a schematic structural diagram of an inter prediction apparatus according to an embodiment of this application.

FIG. 8 is a schematic block diagram of an inter prediction apparatus 80 according to an embodiment of this application. It should be noted that the inter prediction apparatus 80 is not only applicable to inter prediction for decoding a video picture, but also applicable to inter prediction for encoding a video picture. It should be understood that the inter prediction apparatus 80 herein may correspond to the inter prediction unit 244 in FIG. 2, or may correspond to the inter prediction unit 344 in FIG. 3. The inter prediction apparatus 80 may include a determining unit 801 and an inter prediction processing unit 802.

The determining unit 801 is configured to determine whether a current picture block satisfies a plurality of preset conditions.

The inter prediction processing unit 802 is configured to, when the plurality of preset conditions are satisfied, perform BDOF processing on the current picture block, to obtain a predicted sample value of the current picture block, where the plurality of preset conditions include at least a condition that a size of the current picture block satisfies a first preset size. The size of the current picture block is usually represented by a width and a height (briefly written as W×H), and the width and the height are measured by sample (sample or pixel). For example, if the size of the current picture block is 8×8, the first 8 indicates that the width of the current picture block is 8 samples, and the second 8 indicates that the height of the current picture block is 8 samples. For another example, if the size of the current picture block is 8×16, 8 indicates that the width of the current picture block is 8 samples, and 16 indicates that the height of the current picture block is 16 samples.

That a size of the current picture block satisfies a first preset size includes (or is): the height H of the current picture block is greater than or equal to 8, and when a product of the width W and the height H of the current picture block is equal to 64, the width W is not equal to the height H.

Alternatively, that a size of the current picture block satisfies a first preset size includes (or is): the height H of the current picture block is greater than or equal to 8, and the width W of the current picture block is greater than or equal to 8.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 64.

Alternatively, that a size of the current picture block satisfies a first preset size includes (or is): the height H of the current picture block is greater than or equal to 8, the width W of the current picture block is greater than or equal to 8, and a product of the width W of the current picture block and the height H of the current picture block is greater than 128.

Alternatively, that a size of the current picture block satisfies a first preset size includes: the height H of the current picture block is greater than 8.

Alternatively, that a size of the current picture block satisfies a first preset size includes: the height H of the current picture block is greater than 8, and the width W of the current picture block is greater than or equal to 8.

It should be noted that before whether to determine (or obtain through prediction) the predicted sample value of the current picture block based on a reference sample value corresponding to a first list and a reference sample value corresponding to a second list according to the BDOF technology is determined, there may be another reference condition in addition to the size of the current picture block. The another reference condition is not limited herein. For ease of understanding, the following uses examples for description.

Condition A: There is a high-level syntax identifier sps_bdof_enabled_flag indicating that the BDOF technology is allowed to be used for a current video sequence.

Condition B: Prediction direction indication information predFlagL0 corresponding to a first list (list1) is equal to 1, and prediction direction indication information predFlagL1 corresponding to a second list (list0) is equal to 1.

Condition C: A picture order count POC_L0 of a reference frame corresponding to a first list (list0), a picture order count POC_L1 of a reference frame corresponding to a second list (list1), and a picture order count POC_Cur of a picture in which the current picture block is located satisfy the following relationship: (POC_L0−POC_Cur)× (POC_L1−POC_Cur)<0. In other words, the picture including the current picture block is between two reference pictures.

Condition D: MotionModelIdc[xCb][yCb] is equal to 0. MotionModelIdc is a motion model index for motion compensation. The MotionModelIdc[xCb][yCb] equal to 0 indicates that a motion model for motion compensation of the current block is translational motion.

Condition E: merge_subblock_flag[x0][y0] is equal to 0, where merge_subblock_flag[x0][y0] equal to 0 indicates that a subblock merge mode is not applied for the current picture block.

Condition F: sym_mvd_flag[x0][y0] is equal to 0. sym_mvd_flag[x0][y0] equal to 0 indicates that mvd_coding (x0, y0, refList, cpIdx) syntax structure is present for the current block.

Condition G: bcwIdx[xCb][yCb] is equal to 0. bcwIdx indicates a bi-directional prediction weight index for the current picture block.

Condition H: cIdx is equal to 0. cIdx represents a colour component index of the current picture block.

Condition I: The size of the current picture block is the first preset size.

Condition J: Both luma_weight_l0_flag[refIdxL0] and luma_weight_l1_flag[refIdxL1] are equal to 0, where luma_weight_l0_flag equal to 0 indicates that weighting factors for a luma component of list0 prediction are not present, and luma_weight_l1_flag equal to 0 indicates that weighting factors for a luma component of list1 prediction are not present.

For example, when all of the conditions A to J are satisfied, it is determined that the BDOF technology may be used to predict the predicted sample value of the current picture block. For example, bdofFlag is set to true. It should be noted that the foregoing conditions are merely examples, and another condition may be further added, or one or more of the foregoing conditions may be replaced, or one or more of the foregoing conditions may be removed.

It should be understood that the current picture block (which is also referred to as a current block) herein may be understood as a picture block that is being processed. For example, in an encoding process, the current picture block is a picture block that is being encoded (an encoding block). Certainly, the current picture block herein may be alternatively understood as a picture block that is being processed. For example, in a decoding process, the current picture block is a picture block that is being decoded (a decoding block).

It may be understood that another case may be further obtained with reference to the foregoing cases, and the another case also falls within the protection scope of this application.

It should be understood that the method in the embodiments of this application may be performed by a video encoder or an electronic device having a video encoding function, or may be performed by a video encoder or an electronic device having a video encoding function. For example, the method may be performed by an inter prediction unit in these devices.

It should be noted that, for specific implementations of the determining unit 801 and the prediction processing unit 802 in the foregoing inter prediction apparatus 80, refer to related descriptions in the method embodiments shown in FIG. 6A and FIG. 7.

In steps of the foregoing method procedure, a description order of the steps does not represent an execution order of the steps. The steps may be or may not be performed according to the foregoing description order.

A person skilled in the art can understand that, the functions described with reference to various illustrative logical blocks, modules, and algorithm steps disclosed and described in this specification can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a compact disc (CD) ROM (CD-ROM) or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a CD, a laser disc, an optical disc, a DIGITAL VERSATILE DISC (DVD), and a BLU-RAY disc. The disks usually reproduce data magnetically, whereas the discs reproduce data optically by using lasers. Combinations of the foregoing items should also be included in the scope of the computer-readable media.

An instruction may be executed by one or more processors such as one or more DSP, general-purpose microprocessors, ASIC, FPGA, or other equivalent integrated or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An encoding device comprising:
a memory configured to store instructions; and
at least one processor coupled to the memory and configured to execute the instructions to cause the encoding device to:

determine whether a plurality of preset conditions is satisfied for a current picture block;
perform bi-directional optical flow (BDOF) processing on a current picture block to obtain a predicted sample value of the current picture block when the plurality of preset conditions is satisfied, wherein the plurality of preset conditions comprises:
first prediction direction indication information (predFlagL0) corresponding to a first list (list1) is equal to 1 and second prediction direction indication information (predFlagL1) corresponding to a second list (list0) is equal to 1, wherein the predFlagL0 and the predFlagL1 being equal to 1 indicate that the bi-directional prediction is applied to the current picture block;
MotionModelIdc is equal to 0, wherein the MotionModelIdc being equal to 0 indicates that a motion model for a motion compensation of the current picture block is a translational motion;
merge_subblock_flag comprised in the syntax element is equal to 0, wherein the merge_subblock_flag being equal to 0 indicates that a subblock merge mode is not applied to the current picture block;
sym_mvd_flag comprised in the syntax element is equal to 0, wherein the sym_mvd_flag being equal to 0 indicates that an mvd_coding syntax structure is present for the current picture block;
bcwIdx comprised in the syntax element is equal to 0, wherein the bcwIdx indicates a bi-directional prediction weight index for the current picture block;
cIdx is equal to 0, wherein the cIdx represents a color component index of the current picture block;
a height (H) of the current picture block is greater than or equal to 8;
a width (W) of the current picture block is greater than or equal to 8;
a product of W and H is greater than 64 or the product of W and H is greater than 128; and
a luma_weight_l0_flag[refIdxL0] and a luma_weight_l1_flag[refIdxL1] that are both comprised in the syntax element are equal to 0, wherein the luma_weight_l0_flag being equal to 0 indicates that first weighting factors for a first luma component of list0 prediction are not present, and wherein the luma_weight_l1_flag being equal to 0 indicates that second weighting factors for a second luma component of list1 prediction are not present;
skip performing the BDOF processing on the current picture block, and obtain the predicted sample value of the current picture block through prediction based on the reference sample value corresponding to the first list and the reference sample value corresponding to the second list according to a decoder-side motion vector refinement (DMVR) technology when the plurality of preset conditions is not satisfied;
obtain a reconstructed sample value of the current picture block based on the predicted sample value of the current picture block; and
encode a syntax element associated with the current picture block into a to-be-transmitted bitstream,
wherein the syntax element indicates that bi-directional prediction is applied,
wherein each of W and H is equal to $2^n$, and
wherein n is an integer.

2. The encoding device of claim 1, wherein the syntax element comprises an index of target candidate motion information, and wherein the target candidate motion information comprises:
target candidate motion vectors comprising a first motion vector corresponding to a first list and a second motion vector corresponding to a second list;
reference frame indices comprising a first reference frame index corresponding to the first list and a second reference frame index corresponding to the second list; and
prediction direction indication information indicating that the bi-directional prediction is applied to the current picture block.

3. The encoding device of claim 1, wherein the syntax element comprises:
first indices indicating target candidate motion vector predictors, wherein the target candidate motion vector predictors comprise a first motion vector predictor corresponding to a first list and a second motion vector predictor corresponding to a second list;
a motion vector difference (MVD) comprising a first MVD corresponding to the first list or a second MVD corresponding to the second list;
second indices indicating reference frames of the current picture block, wherein the reference frames comprise a first reference frame corresponding to the first list and a second reference frame corresponding to the second list; and
prediction direction indication information indicating that the bi-directional prediction is applied to the current picture block, and
wherein a first motion vector corresponding to the first list is obtained based on the first motion vector predictor and the first MVD, and wherein a second motion vector corresponding to the second list is obtained based on the second motion vector predictor and the second MVD.

4. The encoding device of claim 1, wherein the at least one processor is further configured to execute the instructions to cause the encoding device to:
determine a sample residual based on a sample value of the current picture block and the predicted sample value; and
encode the sample residual into the to-be-transmitted bitstream.

5. The encoding device of claim 1, wherein the instructions to skip performance of the BDOF processing on the current picture block, and obtain the predicted sample value of the current picture block through prediction further comprises instructions that when executed by the at least one processor further cause the encoding device to:
obtain the predicted sample value of the current picture block through prediction based on the reference sample value corresponding to the first list and the reference sample value corresponding to the second list according to the decoder-side motion vector refinement DMVR technology, when a size of the current picture block is a second preset size,
wherein the second preset size is 8×8, 4×N, 8×16, or 16×8,
wherein 8×8 indicates that the width of the current picture block is 8 samples and the height of the current picture block is 8 samples,
wherein 4×N indicates that the width of the current picture block is 4 samples and the height of the current picture block is N samples, wherein 8×16 indicates that the width of the current picture block is 8 samples and the height of the current picture block is 16 samples, and wherein 16×8 indicates that the width of the current picture block is 16 samples and the height of the current picture block is 8 samples, and wherein N is a power of 2 and is greater than or equal to 8.

6. A decoding device comprising:

a memory configured to store instructions; and at least one processor coupled to the memory and configured to execute the instructions to cause the decoding device to:

parse a bitstream to obtain a syntax element indicating that bi-directional prediction is applied to a current picture block;

determine whether a plurality of preset conditions is satisfied for the current picture block;

perform bi-directional optical flow (BDOF) processing on the current picture block to obtain a predicted sample value of the current picture block when the plurality of preset conditions is satisfied, wherein the plurality of the preset conditions comprises:

first prediction direction indication information (predFlagL0) corresponding to a first list (list1) being equal to 1 and second prediction direction indication information (predFlagL1) corresponding to a second list (list0) being equal to 1, wherein predFlagL0 and predFlagL1 both being equal to 1 indicates that the bi-directional prediction is applied to the current picture block;

MotionModelIdc being equal to 0, wherein MotionModelIdc being equal to 0 indicates that a motion model for a motion compensation of the current picture block is a translational motion;

merge_subblock_flag comprised in the syntax element being equal to 0, wherein merge_subblock_flag being equal to 0 indicates that a subblock merge mode is not applied to the current picture block;

sym_mvd_flag comprised in the syntax element being equal to 0, wherein sym_mvd_flag being equal to 0 indicates that an mvd_coding syntax structure is present for the current picture block;

bcwIdx comprised in the syntax element being equal to 0, wherein bcwIdx indicates a bi-directional prediction weight index for the current picture block;

cIdx being equal to 0, wherein cIdx represents a color component index of the current picture block;

a height (H) of the current picture block is greater than or equal to 8;

a width (W) of the current picture block is greater than or equal to 8;

a product of W and H is greater than 64 or the product of W and H is greater than 128; and a luma_weight_l0_flag[refIdxL0] and a luma_weight_l1_flag[refIdxL1] that are both comprised in the syntax element are equal to 0, wherein the luma_weight_l0_flag being equal to 0 indicates that first weighting factors for a first luma component of list0 prediction are not present, and wherein the luma_weight_l1_flag being equal to 0 indicates that second weighting factors for a second luma component of list1 prediction are not present;

skip performing the BDOF processing on the current picture block, and obtain the predicted sample value of the current picture block through prediction based on the reference sample value corresponding to the first list and the reference sample value corresponding to the second list according to a decoder-side motion vector refinement (DMVR) technology when the plurality of preset conditions are not satisfied; and obtain a reconstructed sample value of the current picture block based on the predicted sample value, wherein each of W and H is equal to $2^n$, and wherein n is an integer.

7. The decoding device of claim 6, wherein the syntax element comprises an index of target candidate motion information, and wherein the target candidate motion information comprises:

target candidate motion vectors comprising a first motion vector corresponding to a first list and a second motion vector corresponding to a second list;

reference frame indices comprising a first reference frame index corresponding to the first list and a second reference frame index corresponding to the second list; and prediction direction indication information indicating that the bi-directional prediction is applied to the current picture block.

8. The decoding device of claim 6, wherein the syntax element comprises:

first indices indicating target candidate motion vector predictors, wherein the target candidate motion vector predictors comprise a first motion vector predictor corresponding to a first list and a second motion vector predictor corresponding to a second list;

a motion vector difference (MVD) comprising a first MVD corresponding to the first list or a second MVD corresponding to the second list;

second indices indicating reference frames of the current picture block, wherein the reference frames comprise a first reference frame corresponding to the first list and a second reference frame corresponding to the second list; and prediction direction indication information indicating that the bi-directional prediction is applied to the current picture block, and wherein a first motion vector corresponding to the first list is obtained based on the first motion vector predictor and the first MVD, and wherein a second motion vector corresponding to the second list is obtained based on the second motion vector predictor and the second MVD.

9. The decoding device of claim 6, wherein the at least one processor is further configured to execute the instructions to cause the decoding device to:

further parse the bitstream to obtain a sample residual; and determine the reconstructed sample value based on the sample residual and the predicted sample value of the current picture block.

10. The decoding device of claim 6, wherein the instructions to skip BDOF processing on the current picture block and obtain the predicted sample value of the current picture block through prediction based on the reference sample value further comprises instructions that when executed by the at least one processor further cause the decoding device to:

obtain the predicted sample value of the current picture block through prediction based on the reference sample value corresponding to the first list and the reference sample value corresponding to the second list according to the decoder-side motion vector refinement DMVR technology, when a size of the current picture block is a second preset size, wherein the second preset size is 8×8, 4×N, 8×16, or 16×8, wherein 8×8 indicates that the width of the current picture block is 8 samples and the height of the current picture block is 8 samples, wherein 4×N indicates that the width of the current picture block is 4 samples and the height of the current picture block is N samples, wherein 8×16 indicates that the width of the current picture block is 8 samples and the height of the current picture block is 16 samples, wherein 16×8 indicates that the width of the current picture block is 16 samples and the height of the current picture block is 8 samples, and wherein N is a power of 2 and is greater than or equal to 8.

11. An encoding method comprising:

determining whether a plurality of preset conditions is satisfied for a current picture block;

performing bi-directional optical flow (BDOF) processing on a current picture block to obtain a predicted sample value of the current picture block when the plurality of preset conditions is satisfied, wherein the plurality of preset conditions comprises:

first prediction direction indication information (predFlagL0) corresponding to a first list (list1) is equal to 1 and second prediction direction indication information (predFlagL1) corresponding to a second list (list0) is equal to 1, wherein the predFlagL0 and the predFlagL1 being equal to 1 indicate that the bi-directional prediction is applied to the current picture block;

a motion model index for motion compensation (MotionModelIdc) being equal to 0, wherein the MotionModelIdc being equal to 0 indicates that a motion model for a motion compensation of the current picture block is a translational motion;

a merge_subblock_flag comprised in the syntax element is equal to 0, wherein the merge_subblock_flag being equal to 0 indicates that a subblock merge mode is not applied to the current picture block;

a sym_mvd_flag comprised in the syntax element is equal to 0, wherein the sym_mvd_flag being equal to 0 indicates that an mvd_coding syntax structure is present for the current picture block;

a bcwIdx comprised in the syntax element is equal to 0, wherein the bcwIdx indicates a bi-directional prediction weight index for the current picture block;

a cIdx is equal to 0, wherein the cIdx represents a color component index of the current picture block;

a height (H) of the current picture block is greater than or equal to 8;

a width (W) of the current picture block is greater than or equal to 8;

a product of W and H is greater than 64 or the product of W and H is greater than 128; and a luma_weight_l0_flag[refIdxL0] and a luma_weight_l1_flag[refIdxL1] that are both comprised in the syntax element are equal to 0, wherein the luma_weight_l0_flag being equal to 0 indicates that first weighting factors for a first luma component of list0 prediction are not present, and wherein the luma_weight_l1_flag being equal to 0 indicates that second weighting factors for a second luma component of list1 prediction are not present;

skipping performance of the BDOF processing on the current picture block, and obtaining the predicted sample value of the current picture block through prediction based on the reference sample value corresponding to the first list and the reference sample value corresponding to the second list according to a decoder-side motion vector refinement (DMVR) technology when the plurality of preset conditions is not satisfied;

obtaining a reconstructed sample value of the current picture block based on the predicted sample value; and encoding a syntax element associated with the current picture block into a to-be-transmitted bitstream, wherein the syntax element indicates that a bi-directional prediction is applied, wherein each of W and H is equal to $2^n$, and wherein n is an integer.

12. The encoding method of claim 11, wherein skipping performance of the BDOF processing on the current picture block, and obtaining the predicted sample value of the current picture block through prediction based on the reference sample value further comprises obtaining the predicted sample value of the current picture block through prediction based on the reference sample value corresponding to the first list and the reference sample value corresponding to the second list according to the decoder-side motion vector refinement DMVR technology, when a size of the current picture block is a second preset size, wherein the second preset size is 8×8, 4×N, 8×16, or 16×8, wherein 8×8 indicates that the width of the current picture block is 8 samples and the height of the current picture block is 8 samples, wherein 4×N indicates that the width of the current picture block is 4 samples and the height of the current picture block is N samples, wherein 8×16 indicates that the width of the current picture block is 8 samples and the height of the current picture block is 16 samples, wherein 16×8 indicates that the width of the current picture block is 16 samples and the height of the current picture block is 8 samples, and wherein N is a power of 2 and is greater than or equal to 8.

13. The encoding method of claim 11, wherein the syntax element comprises an index of target candidate motion information, and wherein the target candidate motion information comprises:

target candidate motion vectors comprising a first motion vector corresponding to a first list and a second motion vector corresponding to a second list;

reference frame indices comprising a first reference frame index corresponding to the first list and a second reference frame index corresponding to the second list; and prediction direction indication information indicating that the bi-directional prediction is applied to the current picture block.

14. The encoding method of claim 11, wherein the syntax element comprises:

first indices indicating target candidate motion vector predictors, wherein the target candidate motion vector predictors comprise a first motion vector predictor corresponding to a first list and a second motion vector predictor corresponding to a second list;

a motion vector difference (MVD) comprising a first MVD corresponding to the first list or a second MVD corresponding to the second list;

second indices indicating reference frames of the current picture block, wherein the reference frames comprise a first reference frame corresponding to the first list and a second reference frame corresponding to the second list; and prediction direction indication information indicating that the bi-directional prediction is applied to the current picture block, and wherein a first motion vector corresponding to the first list is obtained based on the first motion vector predictor and the first MVD, and wherein a second motion vector corresponding to the second list is obtained based on the second motion vector predictor and the second MVD.

15. The encoding method of claim 11, further comprising:

determining a sample residual based on a sample value of the current picture block and the predicted sample value; and encoding the sample residual into the to-be-transmitted bitstream.

16. A decoding method comprising:

parsing a bitstream to obtain a syntax element, wherein the syntax element indicates that bi-directional prediction is applied to a current picture block;

determining whether a plurality of preset conditions is satisfied for the current picture block;

performing bi-directional optical flow (BDOF) processing on the current picture block to obtain a predicted sample value of the current picture block when the plurality of preset conditions is satisfied, wherein the plurality of the preset conditions comprises:

first prediction direction indication information (pred-FlagL0) corresponding to a first list (list1) is equal to 1 and second prediction direction indication information (predFlagL1) corresponding to a second list (list0) is equal to 1, wherein the predFlagL0 and the predFlagL1 being equal to 1 indicates that the bi-directional prediction is applied to the current picture block;

MotionModelIdc is equal to 0, wherein the MotionModelIdc being equal to 0 indicates that a motion model for a motion compensation of the current picture block is a translational motion;

merge_subblock_flag comprised in the syntax element is equal to 0, wherein the merge_subblock_flag being equal to 0 indicates that a subblock merge mode is not applied to the current picture block;

sym_mvd_flag comprised in the syntax element is equal to 0, wherein the sym_mvd_flag being equal to 0 indicates that an mvd_coding syntax structure is present for the current picture block;

bcwIdx comprised in the syntax element is equal to 0, wherein the bcwIdx indicates a bi-directional prediction weight index for the current picture block;

cIdx is equal to 0, wherein the cIdx represents a color component index of the current picture block;

a height (H) of the current picture block is greater than or equal to 8;

a width (W) of the current picture block is greater than or equal to 8;

a product of W and H is greater than 64 or the product of W and H is greater than 128; and a luma_weight_l0_flag[refIdxL0] and a luma_weight_l1_flag[refIdxL1] that are both comprised in the syntax element are equal to 0, wherein the luma_weight_l0_flag being equal to 0 indicates that first weighting factors for a first luma component of list0 prediction are not present, and wherein the luma_weight_l1_flag being equal to 0 indicates that second weighting factors for a second luma component of list1 prediction are not present;

skipping performance of the BDOF processing on the current picture block, and obtaining the predicted sample value of the current picture block through prediction based on the reference sample value corresponding to the first list and the reference sample value corresponding to the second list according to a decoder-side motion vector refinement (DMVR) technology when the plurality of preset conditions is not satisfied; and obtaining a reconstructed sample value of the current picture block based on the predicted sample value, wherein each of W and H is equal to $2^n$, and wherein n is an integer.

17. The decoding method of claim 16, wherein skipping performance of the BDOF processing on the current picture block, and obtaining the predicted sample value of the current picture block through prediction based on the reference sample value further comprises obtaining the predicted sample value of the current picture block through prediction based on the reference sample value corresponding to the first list and the reference sample value corresponding to the second list according to the DMVR technology when a size of the current picture block is a second preset size, wherein the second preset size is 8×8, 4×N, 8×16, or 16×8, wherein 8×8 indicates that the width of the current picture block is 8 samples and the height of the current picture block is 8 samples, wherein 4×N indicates that the width of the current picture block is 4 samples and the height of the current picture block is N samples, wherein 8×16 indicates that the width of the current picture block is 8 samples and the height of the current picture block is 16 samples, wherein 16×8 indicates that the width of the current picture block is 16 samples and the height of the current picture block is 8 samples, and wherein N is a power of 2 and is greater than or equal to 8.

18. A computer program product comprising computer-executable instructions that are stored on a non-transitory computer-readable medium and that, when executed by at least one processor, cause an apparatus to:

determine whether a current picture block satisfies a plurality of preset conditions; and perform bi-directional optical flow (BDOF) processing on the current picture block to obtain a predicted sample value of the current picture block when the plurality of preset conditions is satisfied, wherein the plurality of preset conditions comprises:

first prediction direction indication information (pred-FlagL0) corresponding to a first list (list1) is equal to 1 and second prediction direction indication information (predFlagL1) corresponding to a second list (list0) is equal to 1, wherein the predFlagL0 and the predFlagL1 being equal to 1 indicates that the bi-directional prediction is applied to the current picture block;

MotionModelIdc is equal to 0, wherein the MotionModelIdc being equal to 0 indicates that a motion model for a motion compensation of the current picture block is a translational motion;

merge_subblock_flag comprised in the syntax element is equal to 0, wherein the merge_subblock_flag being equal to 0 indicates that a subblock merge mode is not applied to the current picture block;

sym_mvd_flag comprised in the syntax element is equal to 0, wherein the sym_mvd_flag being equal to 0 indicates that an mvd_coding syntax structure is present for the current picture block;

bcwIdx comprised in the syntax element is equal to 0, wherein the bcwIdx indicates a bi-directional prediction weight index for the current picture block;

cIdx is equal to 0, wherein the cIdx represents a color component index of the current picture block;

a height (H) of the current picture block is greater than or equal to 8;

a width (W) of the current picture block is greater than or equal to 8;

a product of W and H is greater than 64 or the product of W and H is greater than 128, and a luma_weight_l0_flag[refIdxL0] and a luma_weight_l1_flag[refIdxL1] that are both comprised in the syntax element are equal to 0, wherein the luma_weight_l0_flag being equal to 0 indicates that first weighting factors for a first luma component of list0 prediction are not present, and wherein the luma_weight_l1_flag being equal to 0 indicates that second weighting factors for a second luma component of list1 prediction are not present; and skip performing the BDOF processing on the current picture block, and obtaining the predicted sample value of the current picture block through prediction based on the reference sample value corresponding to the first list and the reference sample value corresponding to the second list according to a decoder-side motion vector refinement (DMVR) technology, when the plurality of preset conditions is not satisfied, wherein each of W and H is equal to $2^n$, and wherein n is an integer.

19. The computer program product of claim 18, wherein the computer-executable instructions to skip performing the BDOF processing on the current picture block, and obtain the predicted sample value of the current picture block through prediction further comprises instructions that when executed by the at least one processor further cause the apparatus to:

obtain the predicted sample value of the current picture block through prediction based on the reference sample value corresponding to the first list and the reference sample value corresponding to the second list according to the decoder-side motion vector refinement DMVR technology, when a size of the current picture block is a second preset size, wherein the second preset size is 8×8, 4×N, 8×16, or 16×8, wherein 8×8 indicates that the width of the current picture block is 8 samples and the height of the current picture block is 8 samples, wherein 4×N indicates that the width of the current picture block is 4 samples and the height of the current picture block is N samples, wherein 8×16 indicates that the width of the current picture block is 8 samples and the height of the current picture block is 16 samples, and wherein 16×8 indicates that the width of the current picture block is 16 samples and the height of the current picture block is 8 samples, and wherein N is a power of 2 and is greater than or equal to 8.

* * * * *